United States Patent [19]

Dumanoir

[11] Patent Number: 4,495,604
[45] Date of Patent: Jan. 22, 1985

[54] MACHINE METHOD FOR DETERMINING THE PRESENCE AND LOCATION OF HYDROCARBON DEPOSITS WITHIN A SUBSURFACE EARTH FORMATION

[75] Inventors: Chrestion M. Clavier; Jean L. Dumanoir, both of Ridgefield, Conn.

[73] Assignee: Schlumberger Technology Corp., New York, N.Y.

[21] Appl. No.: 19,491

[22] Filed: Mar. 12, 1979

Related U.S. Application Data

[63] Continuation of Ser. No. 7,716.

[51] Int. Cl.³ .......................... B23K 9/18; G01V 3/00
[52] U.S. Cl. ........................................ 367/25; 367/86; 73/152; 250/256; 364/422
[58] Field of Search .............. 364/422; 73/152; 250/256, 265; 367/86, 25

[56] References Cited

U.S. PATENT DOCUMENTS

| | | | |
|---|---|---|---|
| 3,175,639 | 3/1965 | Liben | 73/152 |
| 3,180,141 | 4/1965 | Alger | 324/1 |
| 3,453,433 | 7/1969 | Alger et al. | 73/152 |
| 3,490,279 | 1/1970 | Alger | 73/152 |
| 3,500,683 | 3/1970 | Hoyle | 73/152 |

*Primary Examiner*—Nelson Moskowitz
*Attorney, Agent, or Firm*—Amster, Rothstein & Engelberg

[57] ABSTRACT

In accordance with illustrative embodiments of the present invention, methods for processing well logging data comprises deriving measurements of a plurality of earth formations parameters and combining these measurements in a new manner to enable interpretation of shales and shaly sand type formations. More particularly, measurements of a plurality of the hydrogen index, bulk density, radially deep and shallow resistivity, spontaneous potential, acoustic travel time and natural formation radioactivity content are made and combined in a manner to produce data useful in evaluating shales and shaly sand type formations.

61 Claims, 26 Drawing Figures

CLEAN SAND
EFF. POROSITY = FRAMEWORK POROSITY
($\phi_e = \phi_Z$)

SAND OF SAME FRAMEWORK BUT CONTAINING DISPERSED SHALE $\phi_e = \phi_Z - V_D$

SAND OF SAME FRAMEWORK BUT CONTAINING STRUCTURAL SHALE POROSITY
$\phi_e = O_Z$

SAND OF SAME FRAMEWORK BUT CONTAINING LAMINATED SHALE $\phi_e = O_Z(1 - V_L)$

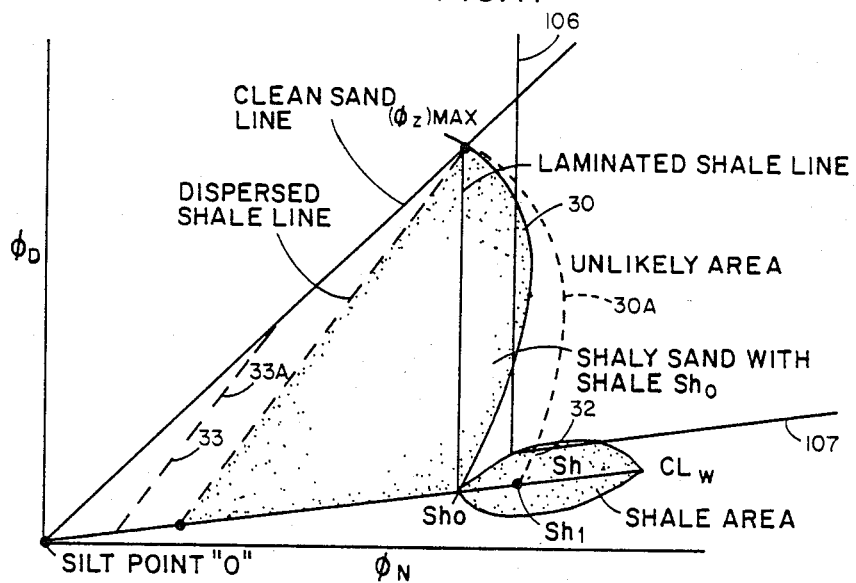
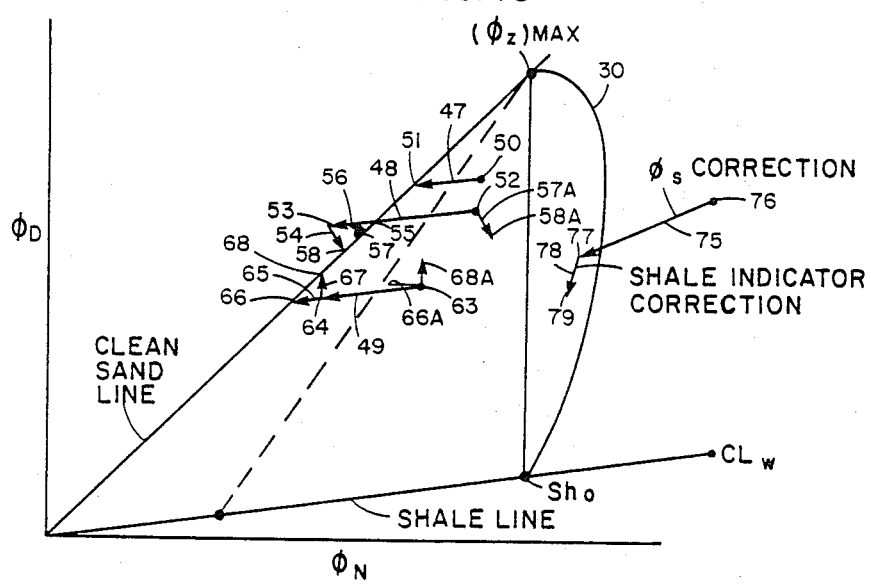

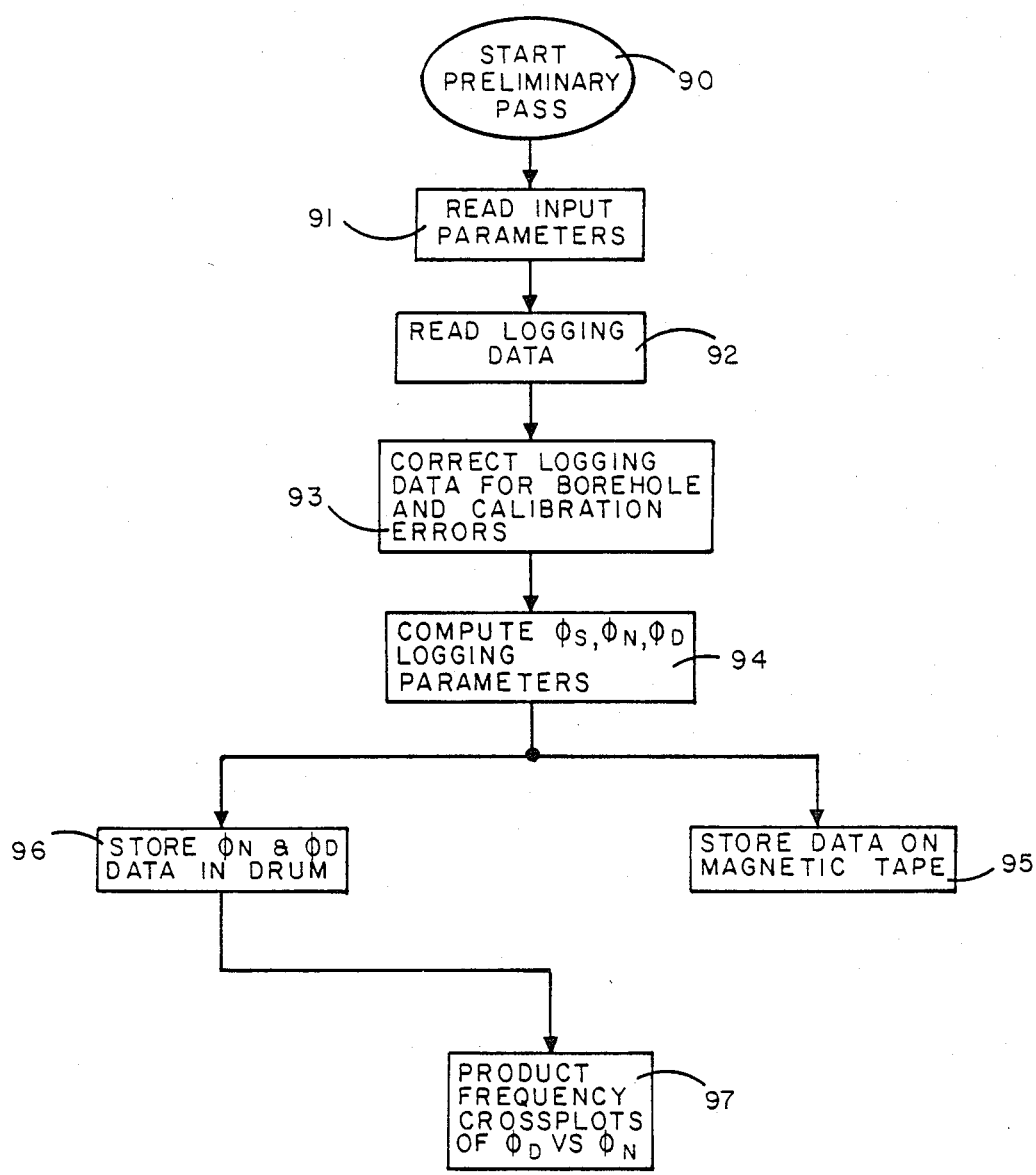

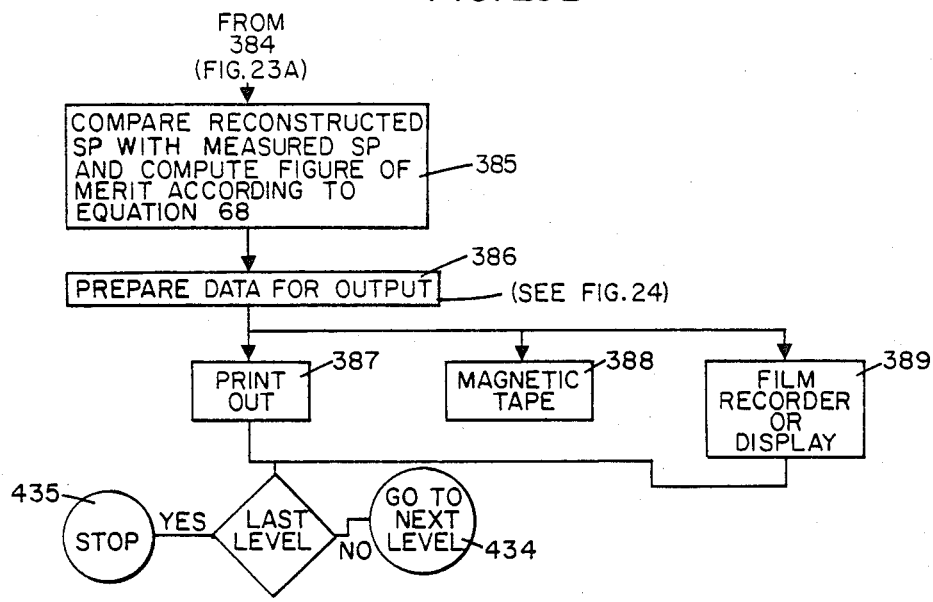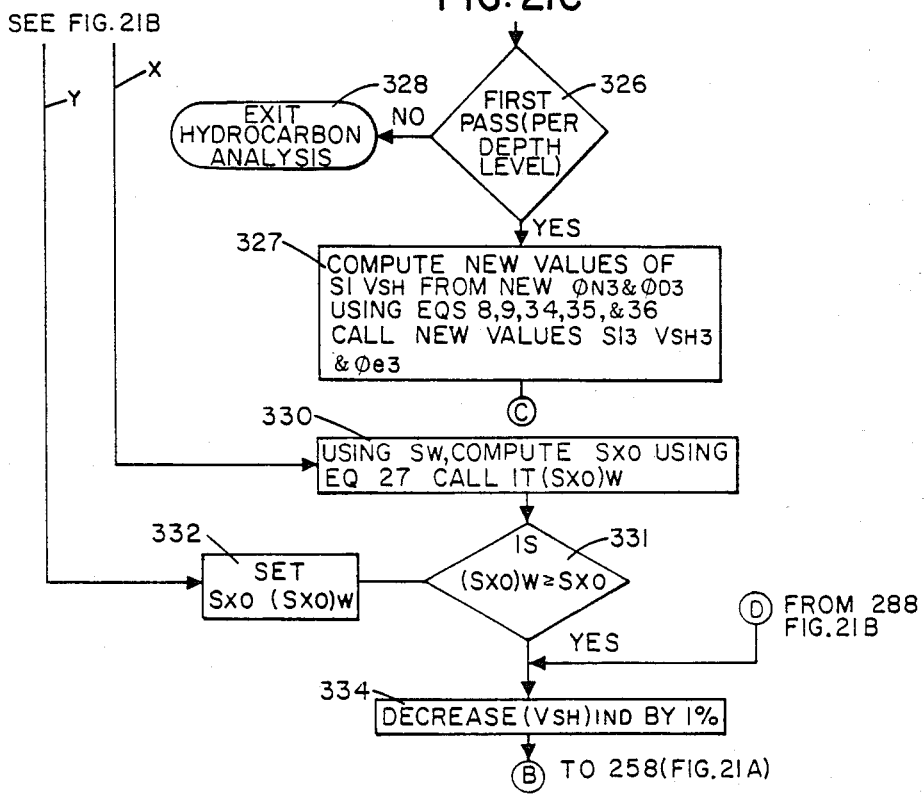

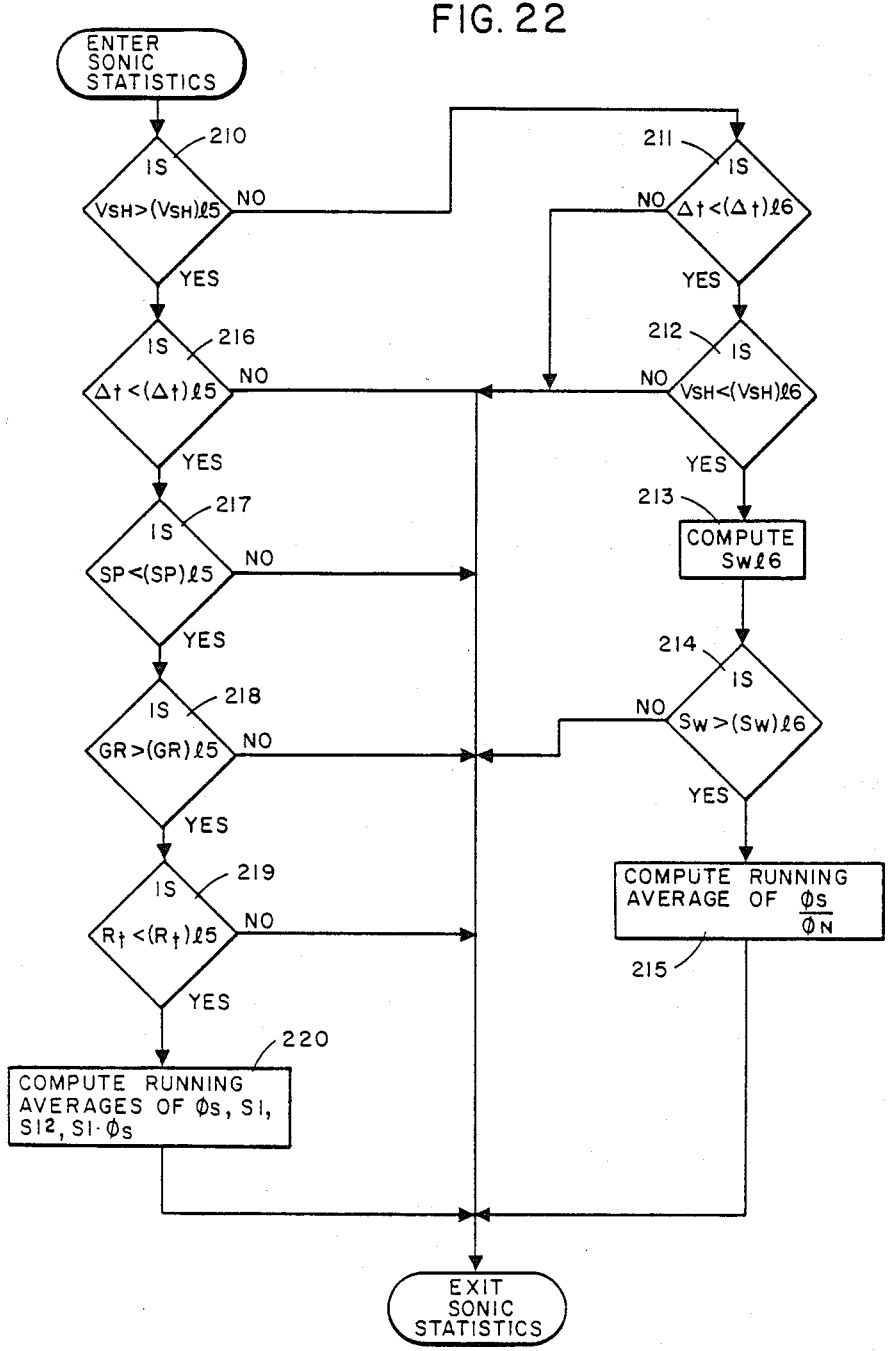

MACHINE METHOD FOR DETERMINING THE PRESENCE AND LOCATION OF HYDROCARBON DEPOSITS WITHIN A SUBSURFACE EARTH FORMATION

This is a continuation of application Ser. No. 7,716, filed Feb. 2, 1970, now abandoned.

This invention relates to methods of investigating earth formations traversed by a borehole. More particularly, the invention relates to the processing of well logging data derived from apparatus lowered in a borehole for investigating subsurface earth formations.

In seeking to determine the presence and depth of hydrocarbon bearing zones (oil or gas) that may exist in the subsurface earth formations adjacent a borehole drilled into the earth, various types of exploring devices may be lowered into the borehole for measuring various properties of the formations adjacent the borehole. The three principal types of such exploring devices are electrical exploring devices (using either electrodes or induction coils), sonic exploring devices, and radioactivity exploring devices (gamma ray, neutron, etc.).

The electrical exploring devices measure the electrical resistivities (or conductivities) of the earth formations. These electrical resistivities are determined primarily by the amount, distribution and resistivity of the fluids contained in the formation pore spaces. The sonic exploring devices, on the other hand, measure the time required for sonic waves to travel across a given span of the earth formation. This sonic travel time is determined primarily by the nature of the rock structure and particularly its porosity. The radioactivity exploring devices measure either the natural radioactivity of the formations or the radioactivity induced therein by bombardment of the formations with radioactivity particles or rays.

Two particular radioactivity exploring devices used to investigate formations are the formation density logging tool and the neutron logging tool. The formation density logging tool emits gamma rays which are diffused through the formation and the number of diffused gamma rays reaching one or more nearby detectors are counted to provide a measure of the electron density of the adjacent formation. Moreover, it is known that this electron density is very closely proportional to the bulk density of the formation in substantially all cases. (For cases where this proportionality does not apply, appropriate corrections can be made.)

The neutron tool on the other hand utilizes a source for emitting neutrons into the adjacent formations. In one form of neutron device, these neutrons lose energy by collision with atoms in the formation. When the energy level of these neutrons is reduced to the epithermal energy range, they can be detected by a nearby detector which counts the number of epithermal neutrons. Since hydrogen atoms are the only ones whose weights are almost equal to that of the neutron, they are the most effective in reducing the energy level of the neutrons to enable their capture. Thus, it can be said that this type of neutron log is essentially a record of the hydrogen atom density of the rocks surrounding the borehole. Since the formation pore spaces are generally filled with either water or liquid hydrocarbons which both have about the same amount of hydrogen, the neutron log does not distinguish between oil and water, but is primarily affected by the formation porosity. Gas, on the other hand, will alter this porosity determination by the neutron log.

In general, none of these measurements taken alone give a direct and positive indication as to the presence or amount of hydrocarbons in the formations or the relative difficulty in removing these hydrocarbons. The various factors which affect each measurement have to be taken into account and an interpretation or deduction made as to the probable existence of hydrocarbons. Among the factors which are considered to be important in determining the location, amount, and ease of removal of oil is the porosity of the formations. Porosity is the fraction of the total volume of a given portion of the formation which is occupied by pores, or void spaces. Other such factors are the make-up of the solid formation material, the water and hydrocarbon saturation, and permeability (ease of fluid to flow in the formation. It is known that by combining the measurements derived from various exploring devices that these factors can usually be obtained. However, when a shaly sand formation is being investigated, the usual interpretation techniques do not apply very well since the responses of most of the tools are affected by shaliness. For example, the true formation resistivity is generally high in an oil or gas bearing formation and low in a water bearing formation. However, in oil or gas bearing shaly sands, the resistivity may very well be low since the shale or clay dispersed in the pore spaces of a sand will tend to have a low resistivity. Moreover, if the formations contain a significant amount of hydrocarbons, and especially gas, additional complications are introduced into the log interpretation process due to the variations in response of the various exploring devices to these hydrocarbons.

Two logs which are useful in distinguishing between sand and shale formations are the spontaneous potential and gamma-ray logs. The spontaneous potential logs gives a measure of the naturally occurring potential of the formations. This potential will be different in shale formations than in sand formations. The gamma-ray log is a measure of the natural radioactivity of the formations and is usually the greatest in shales. However, just distinguishing between sand and shale formations is not enough. It is becoming more and more necessary to evaluate these formations for their lithological make-up as well as for the presence, amount and type of hydrocarbons and their ease of removal. It is, therefore, an object of the present invention to provide new and improved methods for processing well logging data to enable evaluation of earth formations and more particularly, shaly sand formations.

The way shaliness affects well logging measurements depends on the proportion of shale, the physical properties of the shale and the way it is distributed in the formation. In the past it has been assumed that shale is distributed in formations in the form of shale laminae between adjacent layers of sand or of shale dispersed in the sand grains. In the case of laminated shale, the shale is considered to be in large continuous chunks in the formation. For the dispersed shale case, the shaly material is considered to be dispersed throughout the sand in the intergranular structure of the sand. The dispersed shale may be in the form of accumulations adhering to or coating the sand grains, or they may partially fill the smaller pore-channels. Dispersed shale in the pores significantly reduces the permeability of the formation.

In the past, formation models assuming either laminated shale or dispersed shale have been individually utilized to enable interpretation of shaly sand formations. It has been found, however, that either model alone does not adequately cover all formation conditions thus rendering interpretation of the measurements difficult.

It is therefore another object of the present invention to provide new and improved methods for processing well logging data which assume formation models which more nearly fit all formation conditions.

In accordance with the well logging data processing methods of the present invention, a plurality of well logging measurements are combined in a new manner to produce data useful in evaluating earth formations.

For a better understanding of the present invention, together with other and further objects thereof, reference is had to the following description taken in connection with the accompanying drawings, the scope of the invention being pointed out in the appended claims.

Referring to the drawings:

FIGS. 2, 3, 11 and 15 are crossplots of certain of the derived measurements useful in explaining certain features of the present invention;

FIGS. 12 through 17 are illustrations of certain statistical analyses performed in accordance with certain additional features of the present invention;

FIG. 18 is a flow diagram representation of the "preliminary pass" portion of a computer program embodiment of the present invention;

FIGS. 21A, 21B and 21C are flow diagram representations of a "hydrocarbon analysis" routine found in sweep 2 and subsequently described sweep 3 and which will hereinafter be referred to simply as FIG. 21;

FIG. 22 is a flow diagram representation of "sonic statistics" routine which forms a portion of sweep 2;

FIGS. 23A and 23B illustrate a flow diagram representation of a third sweep of the interpretation pass and will be hereinafter referred to simply as FIG. 23;

Figure 1:
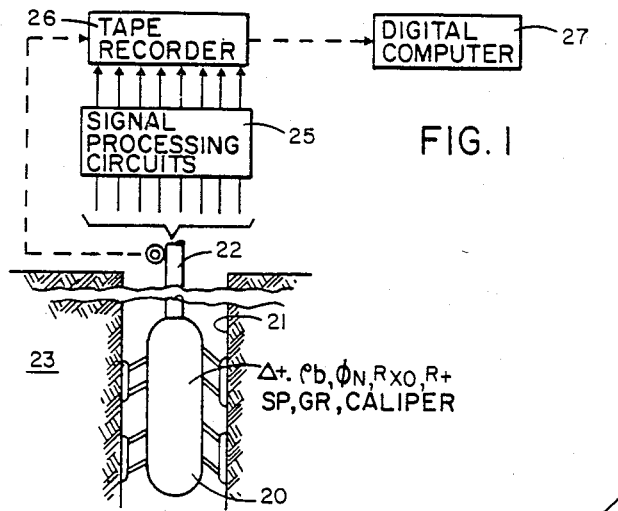
FIG. 1 illustrates exploring apparatus in a borehole for deriving a plurality of well logging measurements along with apparatus at the surface of the earth for digitally recording and processing the derived measurements.

Referring to FIG. 1, there is shown an investigating apparatus 20 located in a borehole 21 on the end of a multiconductor cable 22 which is raised and lowered in a borehole by a suitable drum and winch mechanism (not shown). Investigating apparatus 20 includes exploring devices for obtaining measurements of the acoustic travel time $\Delta t$, bulk density $\rho_b$, the porosity $\phi_N$ derived from a neutron exploring device, the natural gamma ray content GR of a formation, the diameter of a borehole, the spontaneous potential SP, and deep and shallow resistivities, $R_t$ and $R_{xo}$.

An acoustic exploring device for deriving a measure of $\Delta t$ can be found in U.S. Pat. No. 3,231,041 granted to F. P. Kokesh on Jan. 25, 1966. An example of an exploring device for obtaining a measure of the neutron derived porosity $\phi_N$ can be found in U.S. Pat. No. 2,769,918 granted to C. W. Tittle on Nov. 6, 1956. An exploring device for obtaining a measure of the bulk density can be found in U.S. Pat. No. 3,321,625 granted on May 23, 1967 to John S. Wahl. An exploring device for obtaining measurements of the spontaneous potential and deep and shallow resistivity can be found in U.S. Pat. No. 3,453,530 granted to G. Attali on July 1, 1969.

Measurement signals derived from the exploring device 20 are transmitted to suitable signal processing circuits 25 at the surface of the earth. The signal processing circuits 25 prepare the signals for application to a digital tape recorder 26 which converts the well logging signals to digital form for recording on magnetic tape. The resulting magnetic tape is either carried or transmitted via a telemetry link to a digital computer 27 which is programmed in accordance with the teachings of the present invention to process the data in a manner to provide valuable information relative to the nature of the earth formations 23. While all of the measurements to be used in practicing the present invention have, in FIG. 1, been shown derived from one exploring device, it is to be understood that these measurements could be derived from a plurality of exploring devices which are run through the borehole at different times. In this event, the data from each run would be recorded on individual magnetic tapes and the data on each tape would be merged onto a single tape for use by the digital computer 27.

The neutron tool responds to the amount of hydrogen in the formations. It is scaled to read porosity directly in mixtures of limestone and water. Through the use of suitable correction factors, it can be adjusted to read porosity correctly in water filled formations of other types of lithology. It is known that the neutron tool will indicate close to the true porosity in formations containing oil, since oil has approximately the same hydrogen content as water. However, in the formations containing gas, the neutron tool will give a value of porosity which is too low because of the low hydrogen concentration in gas.

In addition to deriving a measure of formation porosity from the neutron tool, the bulk density and acoustic travel time measurements can also be converted to measures of formation porosity. The bulk density measurement can be converted to a porosity measurement if the matrix and fluid densities $\rho_m$ and $\rho_f$ are known. The equation for converting this bulk density measurement to a porosity measurement is:

$$\phi_D = \frac{\rho_m - \rho_b}{\rho_m - \rho_f} \quad (1)$$

In fresh muds the fluid density $\rho_f$ is usually set equal to 1. However, in light hydrocarbon and gas bearing formations, the fluid density $\rho_f$ will be less than 1, and thus the value of porosity $\phi_D$ derived from the density tool will be higher than the true porosity.

The acoustic travel time can also be converted to a measure of porosity provided the acoustic travel time of the rock matrix and fluid, $\Delta t_m$ and $\Delta t_f$ respectively. The relationship for the acoustic or sonic derived porosity in terms of $\Delta t$ is:

$$\phi_s = \frac{\Delta t_m - \Delta t_m}{\Delta t_f - \Delta t_m} \quad (2)$$

The resistivity tools used here measure the formation resistivity in a zone radially near the borehole and a zone radially spaced from the borehole. Either an induction logging tool or a deep reading focused electrode tool can be utilized to give a measure of resistivity of the zone radially spaced from the borehole. A pad type focused electrode tool or a focused or unfocused electrode array mounted on the central support member can provide the resistivity of the zone near the borehole. The resistivity reading provided by the shallow investigation devices is called $R_{xo}$ and is usually primarily representative of the resistivity of the formation zone which has been invaded by mud filtrate from the borehole. The deep reading resistivity devices provide a measurement designated $R_t$ which usually is primarily representative of the resistivity in the uninvaded or virgin formation zone.

The spontaneous potential measurement provided by the exploring apparatus 20 gives the difference between the potential of an electrode on the exploring device and the potential of an electrode located at the surface of the earth. Opposite shale formations, the spontaneous potential will usually remain fairly constant and thus tend to follow a straight line on the log, called the "shale base line". Opposite permeable formations, a spontaneous potential will show excursions from the shale base line. In thick permeable beds free of shale, the spontaneous potential will also reach an essentially constant value, defined as the "sand line".

The gamma ray measurement provided by the exploring apparatus 20 gives a measurement of the natural radioactivity of the formations. Shaly formations generally tend to have a high radioactivity content because radioactive elements tend to concentrate in shales. Clean formations usually have a very low level of radioactivity. Thus, the gamma ray log can usually distinguish between clean sand and shaly formations.

It is the purpose of the present invention to combine the measurements derived from the exploring apparatus 20 in such a manner as to provide information relating to shaly sand formations. The measurements derived from all of these exploring devices are affected in one way or another by the shale content of formations, thus complicating the interpretation of these measurements in such formations. Moreover, when oil or gas is contained in these shaly sand formations, the interpretation of the measurements becomes even more complex. By combining the measurements derived from many exploring devices, it is possible, in accordance with the present invention to accurately interpret the measurements. However, before discussing how these measurements are utilized in accordance with the present invention, it would first be desirable to discuss the nature of shaly sand formations.

Shale is made up of a combination of silt and wet clay where wet clay is a combination of dry clay material called colloids and water. The relative proportions of silt and clay usually vary from one formation to the next. In the past it has been assumed that shale is distributed in formations in the form of shale laminae between adjacent layers of sand or of shale dispersed in between the sand grains. In the case of laminated shale, the shale is considered to be in large continuous chunks in the formation. For the dispersed shale case, the shaly material is considered to be dispersed throughout the sand in its intergranular structure. The dispersed shale may be in the form of accumulations adhering to or coating the sand grains, or they may partially fill the smaller pore channels. It has been found that either model alone does not adequately cover all formation conditions thus rendering interpretation of the measurements difficult.

In accordance with an important feature of the present invention, both laminated shale and dispersed shale models are combined into one model to enable a more accurate interpretation of shaly sand formations. Moreover, a third form of shale is added to the laminated and dispersed shale models to provide a shaly sand model which more accurately represents true formation conditions in shaly sands. This third form of shale is called "structural shale". In this structural shale model, shale may exist as grains which replace sand grains in the formation matrix. This structural shale is considered to have properties similar to those of laminated shale.

It has been found that all of these forms of shale may occur simultaneously in the same formation. Frequently, however, shale in only one form is predominant but this can change from one depth level to the next. Thus, a good interpretation technique must be universal enough to handle situations where any one form of shale occurs as well as those cases where two or even all three forms occur.

After much experimentation it has been found that over large sections of any given borehole, certain shale parameter values used for interpretation will remain relatively constant, although the particular form of shale may change. Thus, regardless of the particular form of shale, the shale parameter values can be related to those of an average shale for large sections of a borehole.

Responses of the radioactivity tools (gamma ray, neutron, and density) are not affected by the way the shale is distributed in the formation, whether in laminated, dispersed, or structural form. However, the responses of the sonic, resistivity and SP tools are affected by the shale distribution. As will be set forth later, these distinctions are utilized in accordance with the present invention to provide valuable information concerning the character of the shaly sand formations.

Figure 2:
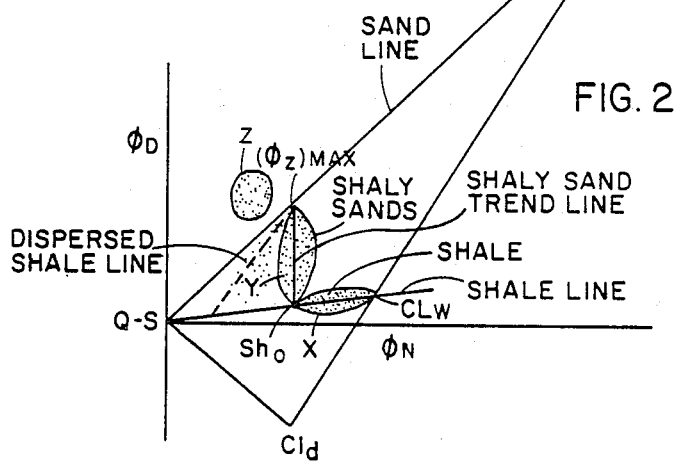

A cross-plot of the density derived porosity $\phi_D$ versus neutron derived porosity $\phi_N$ is valuable in evaluating shaly sand formations. Referring now to FIG. 2, there is shown such a cross-plot. In FIG. 2, certain points can be readily placed on the cross-plot. It is known that in the water, both the density and neutron derived porosities will read values of one. Thus, the water "w" point can be placed on the cross-plot. It is also known that pure silt, which is made primarily of quartz, will be at the same point as quartz, designated "Q-S" on the cross-plot, and dry clay designated $Cl_d$ will be at the point $Cl_d$ on the cross-plot. A triangle can thus be drawn on the cross-plot connecting these three points. In water-bearing formations, all plotted $\phi_N, \phi_D$ points will fall within this triangle. Furthermore, the relative distances of the plotted point from the three apexes of the triangle give the relative proportions of water, silt and quartz, and dry clay for the formation from which this plotted point is derived.

By plotting a plurality of $\phi_N, \phi_D$ points from a formation interval, certain characteristics of the formation can be ascertained. For example, in FIG. 2, assume that a formation interval has produced the plotted points shown in FIG. 2. Those points falling in the area x are known to correspond to shale formations. Thus, a line can be drawn through the center of gravity of these shale points from the origin. This line is called the "shale line". Since it is known that pure shales generally have almost no porosity, this shale line will correspond to zero porosity. Thus, any point plotting on the shale line can be said to have zero porosity. The intersection of the shale line with the line between the points $Cl_d$ and W gives the tool response characteristics for wet clay associated with this shale and is thus designated $Cl_w$. The position of this point $Cl_w$ relative to the water "W" and by clay $Cl_d$ points gives the amount of water associated with clay, $W_{cl}$.

It is known that clean sand formations affect $\phi_N$ and $\phi_D$ equally. Thus, any points falling on or near a line which subtends an angle of 45° with the $\phi_N$ and $\phi_D$ axes are derived from clean sand formations. Those points falling in the area y between the sand and shale lines correspond to shaly sands. These points in the area y exhibit a definite trend between the sand and shale lines. A line which best fits these points can be drawn between the sand and shale lines. The intersection of this shaly sand trend line with the sand line defines a point designated $(\phi_z)_{max}$. $(\phi_z)_{max}$ is the maximum porosity associated with the formations considered in this example of FIG. 2. The intersection of the shaly sand trend line with the shale line gives a point designated $Sh_o$. The fact that this trend line points toward a unique point on the shale line indicates that the shale normally associated with the sand has the unique composition represented by the point $Sh_o$. After a great deal of research, it has been found that for most all levels in the formation interval represented by the FIG. 2 example, the type of shale, whether dispersed, laminated, or structural, associated with shaly sand formations in this interval can be defined in terms of the response of the density and neutron tools by this point $Sh_o$. The neutron and density derived porosity characteristics for this type of shale are designated $(\phi_N)_{Sh_o}$ and $(\phi_D)_{Sh_o}$ respectively.

The points plotting in the area Z above the clean sand line most likely represent hydrocarbon bearing formations since hydrocarbons and especially gas decrease $\phi_N$ and increase $\phi_D$.

It is known that the effective porosity $\phi_e$ and the volume or amount of shale $V_{sh}$ in a formation at any given depth level can be ascertained by the location of the plotted $\phi_D, \phi_N$ point on the $\phi_D$-$\phi_N$ cross-plot. Thus, turning to FIG. 3, there is shown a portion of the cross-plot of FIG. 2 reproduced to illustrate this. In the FIG. 3 cross-plot, a plurality of lines can be drawn parallel to the shale line and each of these lines will indicate a given constant effective porosity. As stated earlier, the shale line itself indicates zero porosity. Thus, as one moves away from the shale line, the amount of porosity will increase.

In the same fashion a plurality of lines indicating the volume of shale can be drawn parallel to the clean sand line. Obviously, any point falling on the clean sand line itself indicates a shale volume of zero percent. As one moves away from the clean sand line, the volume of shale will progressively increase.

Figure 3:
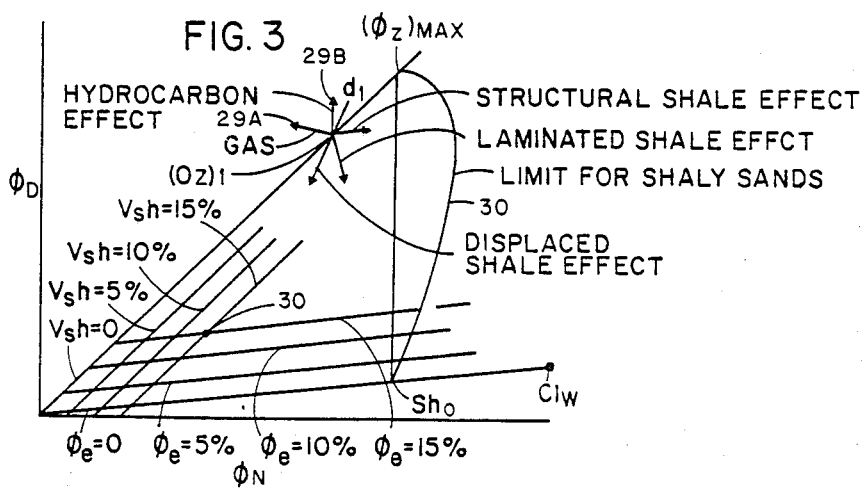

Taking an example of how $\phi_e$ and $V_{sh}$ can be obtained from the $\phi_N$-$\phi_D$ crossplot, if $\phi_D$ and $\phi_N$ measurements should give the point 30 of FIG. 3, a formation having an effective porosity of 15% and a shale volume of 15% would be indicated.

Figure 4:
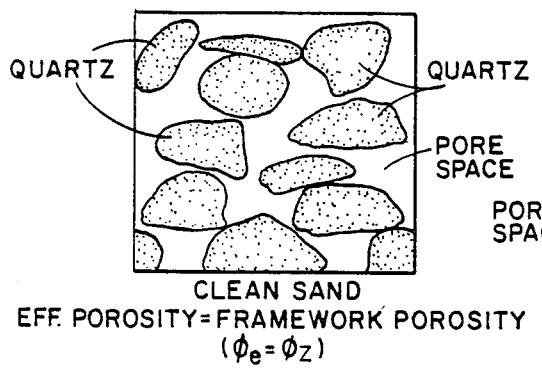
FIGS. 4, 5, 6 and 7 illustrate models of certain types of formation which models are useful in understanding certain features of the present invention.
Figure 5:
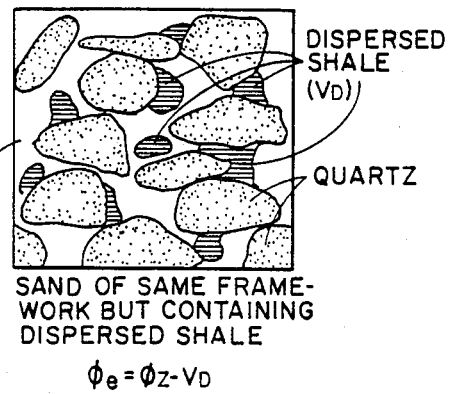

The influence that each mode of repartition of shale has on the formation porosity will be discussed now. FIG. 4 represents a unit volume of clean sand for which each grain is quartz. The porosity is the ratio of the area in white to the total area of the figure. This is the porosity $\phi_z$ which is called framework porosity. FIG. 5 represents the same sand but a quantity $V_D$ of dispersed shale has been introduced in the pore space. The remaining porosity designated $\phi_e$, has been decreased such that $\phi_e = \phi_z - V_D$.

Figure 6:
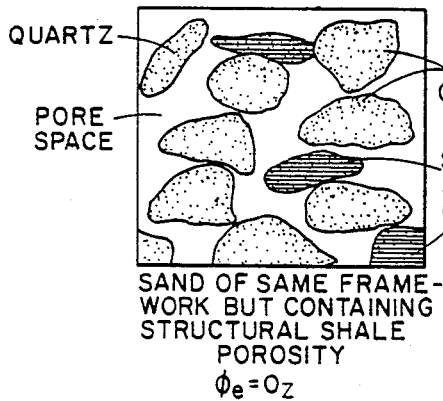

FIG. 6 represents the same sand but for which a quantity $V_{sh}$ of structural shale has been substituted for the quartz grains. Although the sand contains shale, its porosity has not been changed by the presence of structural shale. Thus, $\phi_e = \phi_z$.

Figure 7:
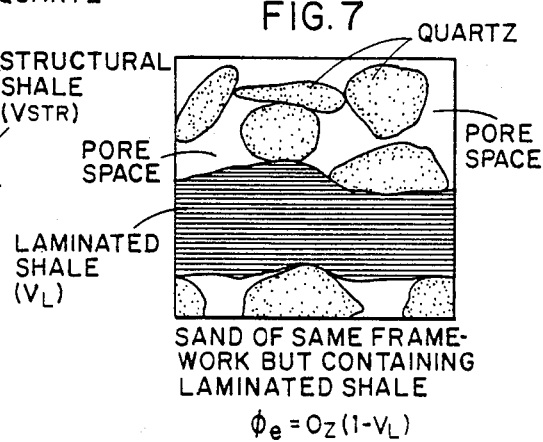

FIG. 7 represents the same sand but for which a part of the sand has been replaced by a quantity $V_L$ of laminated shale. The porosity in the sand fraction has not changed but only $(1-V_L)$ of the sand initially there remains. Consequently, the effective porosity $\phi_e$ of the mixture of sand and shale will represent only $(1-V_L) \phi_z$.

Concerning the effect of each type of shale on the $\phi_N$-$\phi_D$ crossplot, if dispersed shale is added to a clean sand formation it occupies part of the framework porosity of the sand. Thus the effective porosity will decrease. Thus, referring to FIG. 3 and assuming a sand formation of porosity $\phi_{z1}$, the addition of dispersed clay to this sand formation will tend to move the plotted $\phi_N$, $\phi_D$ point in the direction indicated by the dispersed clay effect vector, i.e. such that $$\Delta V_{sh} = \Delta \phi_e.$$

Structural shale, since it takes the form of clay grains replacing sand grains of the same or similar size, will not affect the effective porosity $\phi_e$. Therefore, as shown in FIG. 3, the structural shale effect will tend to move the plotted $\phi_N$, $\phi_D$ point to the right parallel to the shale line (i.e., along a constant $\phi_e$ line), as indicated by the structural shale effect vector.

An increase in the laminated shale in the formation will tend to decrease the effective porosity $\phi_e$ because shales have no porosity and laminated shales replace part of the sand of porosity $\phi_{z1}$. Since the formation is presumed to have shale of type $Sh_o$, laminated shale will move the point towards the $Sh_o$ point as illustrated in FIG. 3.

The addition of hydrocarbons, and especially gas, to this clean sand formation will tend to move the plotted $\phi_N$, $\phi_D$ point to the northwest in the FIG. 3 crossplot as represented by vector 29a. This is evident since, as stated earlier, an increase in hydrocarbons will increase the density derived porosity $\phi_D$ and decrease the neutron derived porosity $\phi_N$, especially if the density of this hydrocarbon is low as in the case of gas. Higher density hydrocarbons have very little affect on the neutron tool and thus the data point will tend to move in a more northerly direction, as represented by the vector 29b.

As stated earlier, any given formation can contain shale in all three forms and, at the same time, can also contain hydrocarbons. Thus, through the use of the neutron density crossplot alone, it is not possible to properly evaluate both the hydrocarbon and shale effects.

Let us consider a series of clean sands for which structural porosity may be between $\phi_{z1}$ and $\phi_{z2}$ due to the geological process. As stated earlier, it was assumed in the past that either dispersed shale or laminated shale would be associated with these sands.

Figure 8:
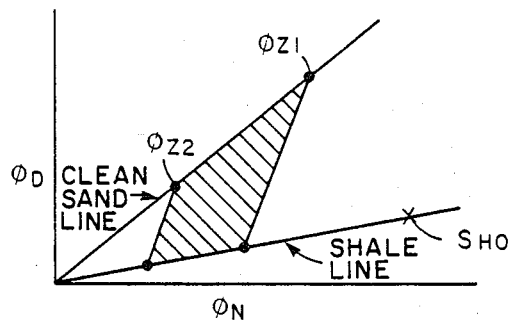
FIGS. 8, 9 and 10 are crossplots of certain derived measurements which together are useful in understanding features of the present invention.
Figure 9:
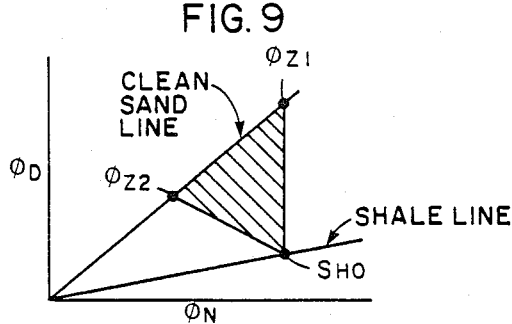

In the dispersed shale model only the points falling between the two "dispersed shale" lines for $\phi_{z1}$ and $\phi_{z2}$ could be truly taken into account and still fit the model (FIG. 8). In the laminated model, only the points falling between the two "laminated shale" lines could be truly taken into account (FIG. 9). In particular it was not possible to explain the presence of points falling to the right of the ($\phi_{z1}$, $Sh_o$) line except by assuming a $\phi_z$ larger than the one truly created by geological sedimentation. The addition of the structural shale model permits us to justify and understand why such points may exist.

Figure 10:
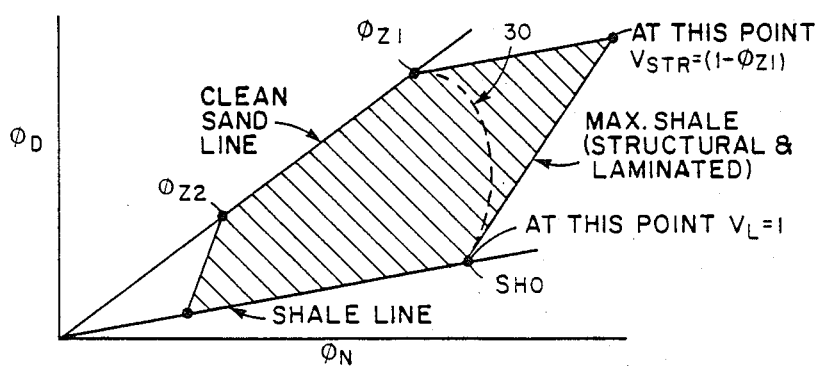

The simultaneous presence of the three types of shales permit justification of the position of any points inside the area of FIG. 10. However, it was found by a great deal of research that structural shale cannot replace all quartz grains (the point 31a in FIG. 10). Thus, it has been found the position of the shaly sand points on the plot was in practice limited to the right by a curve (dashed curve 30 between $\phi_{z1}$ and $Sh_o$) well approximately by a parabola as shown in FIG. 10. The parabolic representation of this limit of the domain of shaly sand was developed by empirical analysis and is not obvious. Its physical meaning is that the amounts of structural shale and laminated shale which can be associated with the sand are not independent from one another. On the contrary, it indicates that for points falling on this limit and which do not contain dispersed shale, the smaller the amount of shale, the larger the relative amount of structural shale with relation to laminated shale; and the larger the amount of shale, the smaller the relative amount of structural shale.

Now turning to FIG. 11, there is shown the neutron density crossplot of FIG. 3 redrawn to illustrates the various areas or sections of the crossplot and their significance. The cross-hatched area defined by the letters SS (standing for shaly sand) defines an area for which all plotted points should fall when derived from formations having a characteristic shale given by the point $Sh_o$ and a sand framework porosity which is practically constant. In terms of exploring tool readings, this type of shale is defined by the $\phi_N$ and $\phi_D$ values of the $Sh_o$ point, designated $(\phi_N)_{sh}$ and $(\phi_D)_{sh}$. Any points falling in the shale area designated Sh define their own characteristic shale type, depending on the particular location of the point within this shale area. Likewise, any point plotting within the dispersed shale area to the left of the dispersed shale line will, in accordance with its position on the crossplot, defines a specific type of shale. Nonetheless, most shaly sand data points fall in the hatched line are and the definition of one characteristic shale type for all points in this area represents a dramatic improvement in shaly sand interpretation. If a point should fall to the left of dispersed shale line for $\phi_{z1}$, it indicates that the formation has a lower $\phi_z$ than $\phi_{z1}$ at that level and thus $\phi_z$ should be changed to account for this. Thus, assume the plotted point 3 in FIG. 11. The dispersed shale line would then move over to accommodate this new point as illustrated by the line 33a to thus give a new framework porosity of $\phi_{z3}$.

In discussing types of shale, one parameter that is informative is the relative proportion of silt and wet clay in the shale. To define the relative proportions of silt and wet clay, a linear relationship between the plotted point on the shale line relative to the silt and wet clay points will define the type of shale. In this connection, a term defined as the "silt index" SI of the shale is used throughout the discussion here and can be defined as the ratio of silt to shale and thus the distance between the designated point on the shale line and the wet clay point $Cl_w$ to the total length of the shale line between the silt and wet clay points. Thus the silt index of the shale type associated with the shaly sand area SS in FIG. 11 will be $Sh_o$-$Cl_w$/0-$Cl_w$. The silt index of this shale point $Sh_o$ is designated $SI_o$.

Since shale consists of silt and wet clay the following relationship holds:

$$V_{sh} = V_{silt} + V_{clay} \quad (3)$$

The silt index defines the ratio of silt to shale. Thus:

$$SI = V_{silt}/V_{sh} \quad (4)$$

Combining equations (3) and (4), we have:

$$V_{clay} = V_{sh}(1-SI) \quad (5)$$

Points falling in the area X of FIG. 2 are essentially shales. These shales do not have uniform composition, their composition (i.e. the relative amount of clay and silt) is related to the problem of the shale part in this area. To define the composition of this shale it has been found that one may draw a limit parabola equivalent to (30) but which passes through the plotted $\phi_N$, $\phi_D$ point, using the maximum framework porosity point $(\phi_z)_{max}$ as the pivot point. Thus, for example, assume that the plotted $\phi_N$, $\phi_D$ point is given by the point 32 in FIG. 11. The parabola 30 would then be swung to the position given by the dashed line parabola 30a which passes through the plotted point 32 and intersects the shale line at the point $Sh_1$. In this case, the type of shale associated with the plotted point 32 will be defined by the shale point $Sh_1$. As before, the point $Sh_1$ is defined by the characteristic tool responses, designated $(\phi_N)_{sh}$ and $(\phi_D)_{sh}$.

It is possible that $\phi_N$, $\phi_D$ points could also fall in the area to the right of the shaly sand area SS and above the shale area Sh. As stated earlier, the parabola 30 defines the practical limit for $\phi_N$, $\phi_D$ points in shaly sands. Therefore, if points fall to the right of this parabola and are not close enough to the shale line to designate the investigated formation as a shale, it is assumed, in accordance with another feature of the present invention, that the porosity data does not correspond to a shaly sand or to a shale. It may correspond either to a different type of lithology or to a level for which the $\phi_N$, $\phi_D$ data is bad due to borehole effect on the measurements. Therefore, this area to the right of the parabola 30 and above the shale area is designated the "unlikely area". (Unlikely to be either shaly sand or shale.) In accordance with still another feature of the present invention, data falling in this unlikely area is verified and, if needed, corrected using data derived from other exploring devices. How this is accomplished will be described in detail later.

Having now discussed the density and neutron responses in view of the density-neutron crossplot, it would be desirable to discuss the responses of these tools in mathematical terms. The equations for the density and neutron derived porosities $\phi_D$ and $\phi_N$ in terms of the effective porosity, $\phi_e$, shale volume, $V_{sh}$, water saturation of the invaded zone, $S_{xo}$, and the characteristic neutron and density response to shale and hydrocarbon are:

$$\phi_D = \phi_e + V_{sh}\phi_{D(sh)} + \phi_e(1-S_{xo})(\phi_{D(hy)}-1) \quad (6)$$

$$\phi_N = \phi_e + V_{sh}(\phi_N)_{sh} + \phi_e(1-S_{xo})[(\phi_N)_{hy}-1](1+-2\phi_e S_{xo}) \quad (7)$$

where
- $(\phi_D)_{sh}$ is the characteristic density derived porosity reading in the shale associated with the sand
- $(\phi_N)_{sh}$ is the characteristic neutron derived porosity reading in shale,
- $(\phi_D)_{hy}$ is the characteristic density derived porosity reading for hydrocarbons, and
- $(\phi_N)_{hy}$ is the characteristic neutron derived porosity reading for hydrocarbons
- $(\phi_D)_{sh}$ and $(\phi_N)_{sh}$ have been discussed above, and $(\phi_D)_{hy}$ and
- $(\phi_N)_{hy}$ are unknowns.

In the absence of hydrocarbons, $S_{xo}$ is equal to "1" and equations (6) and (7) become:

$$\phi_D = \phi_e + V_{sh}(\phi_D)_{sh} \quad (8)$$

$$\phi_N = \phi_e + V_{sh}(\phi_N)_{sh} \quad (9)$$

In the absence of hydrocarbons, the density and neutron derived porosity readings $\phi_D$ and $\phi_N$ provide sufficient information to solve for effective porosity $\phi_e$ and shale volume $V_{sh}$. The mathematical solution of equations (8) and (9) is analogous to the graphical solution depicted in FIG. 3. The selection of $(\phi_D)_{sh}$ and $(\phi_N)_{sh}$ determines the scaling for this graphical technique depicted in FIG. 3, i.e., the shale point $Sh_o$ gives the $V_{sh}=100\%$ point and thus if the type of shale associated with the particular formation under investigation changes, the scale will change correspondingly.

It is obvious by inspecting equations (6) and (7) that when hydrocarbons are present in the formation, the density and neutron derived porosity readings $\phi_D$ and $\phi_N$ will not provide sufficient information by themselves, and thus other steps must be taken to properly analyze the formation.

Before deciding whether to utilize other input parameters to correct equations (8) and (9) for hydrocarbon effect, it must first be known whether hydrocarbons do in fact exist in the formation under investigation. The location of the plotted $\phi_D$, $\phi_N$ point on the crossplot does not indicate whether hydrocarbons are present or not. From FIG. 3 it can be seen that hydrocarbons have the effect of pulling plotted points in a northwesterly direction on the crossplot. However, the effects of structural, laminated, and dispersed shale tend to displace the points to the right and parallel to shale line.

In clean or non-shaly formations, the effect of hydrocarbons will be readily discernible because all of the plotted points would fall to the northwest of the sand line if the tool readings are accurate. (Of course, if the tool readings are inaccurate, the plotted points could fall anywhere). However, since it is usually not initially known how much shale, if any, is present in any given formation, it is not how much the effect of shale offsets the effect of hydrocarbons. As seen from equations 2 and 4, if hydrocarbons affect the tool readings at all, the values of effective porosity, $\phi_e$, and shale volume, $\phi_{sh}$, givn by equations (8) and (9) and the crossplot will be inaccurate.

To overcome this inability to produce correct answers when hydrocarbons are present, two additional pieces of information are utilized. One is a value of $V_{sh}$ derived from other logs which are sensitive to the amount of shale present in the format on under investigation. These are called shale indicators. The second additional piece of information is an assumed relationship between $(\phi_D)_{hy}$ and $(\phi_N)_{hy}$ which reduces these two variables to one. This relationship can be described by writing the expressions for $(\phi_D)_{hy}$ and $(\phi_N)_{hy}$ in terms of hydrocarbon density $\rho_{hy}$ as follows:

$$(\phi_D)_{hy} = 1 - 5/7\left(1 - 9\frac{4-\rho_{hy}}{32-5\rho_{hy}}\rho_{hy}\right) \quad (10)$$

$$(\phi_N)_{hy} = 9\rho_{hy}\frac{8-5\rho_{hy}}{32-5\rho_{hy}} \quad (11)$$

Equations (10) and (11) comprise another aspect of the present invention and have been derived from considerations of the chemical composition of hydrocarbons and its relation to its physical properties. The value of hydrocarbon density $\rho_{hy}$ is an unknown and is determined by the analysis described hereinafter.

Before discussing how the various formation parameters can be determined when hydrocarbons are present in the formation under investigation, it would first be desirable to discuss the shale indicators mentioned above. These shale indicators are logging parameters or combinations thereof which are strongly influenced by shale content. An approximation of $V_{sh}$ is computed from each shale indicator in such a manner that it is supposed to always be equal to or greater than the true $V_{sh}$. Accordingly, the smallest of these values of $V_{sh}$ derived from the shale indicators will be the closest to the true $V_{sh}$ and is, therefore, retained to represent the value of $V_{sh}$ in the equations discussed above.

These shale indicators are: (1) spontaneous potential; (2) gamma ray; (3) the value of resistivity in hydrocarbon zones; (4) gas-sandline limit; (5) the saturation ratio $S_{xo}/S_w$; (6) a relationship between porosity derived from the neutron log, $\phi_N$, and the value of $\phi_N$ for the shale point, $(\phi_N)_{sh}$; and (7) the hydrocarbon density.

Taking first the spontaneous potential as a shale indicator, it has been found that the spontaneous potential varies in a linear manner with the ratio CEC/W where CEC is the cation exchange capacity of the clay material and W is the total water of the shaly sand in the zone of ionic diffusion. It has been found that the cation exchange capacity is proportional to the volume of clay $V_{clay}$ in the formation and that W is always equal to or less than the volume of water in the invaded zone $W_{xo}$ which is equal to:

$$W_{xo} = \phi_e S_{xo} + V_{clay}W_{clay} \quad (12)$$

In equation (12) the terms $\phi_e S_{xo}$ gives the total water content of the invaded zone and the term $W_{clay}$ gives the amount of water bound to the clay particles. To determine the magnitude of $W_{clay}$ the following equation can be used:

$$\rho_{wet\ clay} = (1 - W_{clay})\rho_{dry\ clay} + W_{clay} \tag{13}$$

The density of dry clay, $\rho_{dry\ clay}$, is usually of the order of 2.85 although other values may be used according to geological experience. The density of wet clay can be determined from the $\phi_D$-$\phi_N$ crossplot by utilizing the value of $\phi_D$ for wet clay and solving equation (1) for $\rho_m$. To determine the magnitude of $V_{clay}$, it is only necessary to know the silt index and $V_{sh}$ to find $V_{clay}$ from equation (5).

It has been found that the relationship between $V_{clay}/W_{xo}$ versus the spontaneous potential can be approximated with a linear relationship. Thus, if this relationship is known and W is known, then the measure of spontaneous potential at each depth level can be used to find $V_{clay}$. Then, using equation (12), $V_{sh}$ can be determined. However, it is first necessary to determine the relationship between $V_{clay}/W_{xo}$ and the spontaneous potential.

In accordance with another feature of the present invention, this is accomplished by plotting $V_{clay}/W_{xo}$ versus spontaneous potential and drawing a line which incorporates the best fit to the plotted points. Such a plot is shown in FIG. 12.

Figure 12:
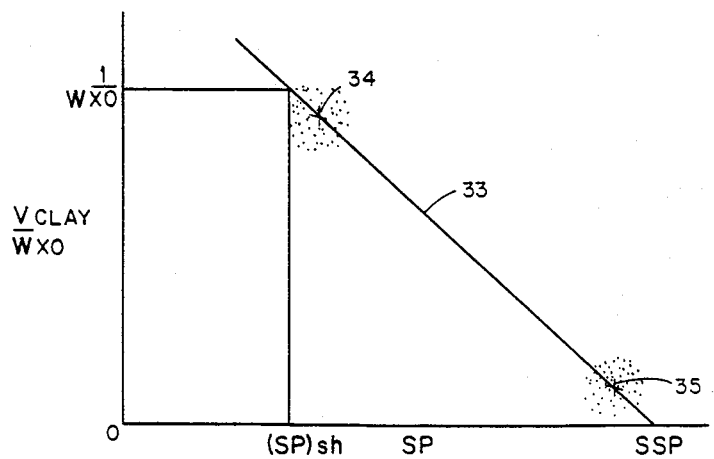

Rather than consider all spontaneous potential values, i.e., those falling along the entire length of the calibration curve 33 of FIG. 12, it has been found preferable to consider only those points corresponding to pure shales and clean sands, and define the center of gravity of both clouds of points. Then, a calibration line can be drawn between these two centers of gravity. In FIG. 12, the points 34 and 35 represent the center of gravity for the clouds of points corresponding to shale and sand, respectively. The reason for this center of gravity approach is that if all points were considered, an excess of either shale or sand points could unduly influence the position of the calibration line 33.

Once the position of the calibration line 33 is known, measured values of the spontaneous potential can be utilized with the plot of FIG. 5 to determine the magnitude of $V_{clay}/W_{xo}$ for each depth level. Values of $\phi_e$, $S_{xo}$, and SI can be determined with other data in a manner to be described later and equations 5 and 12 can then be solved for $V_{sh}$.

As will be set forth in detail later, the characteristic spontaneous potential in clean sands and shales should be determined. The characteristic spontaneous potential in shales is designated $SP_{sh}$ and the characteristic spontaneous potential in sands is labeled the "static spontaneous potential" or SSP. In the past, it has been necessary to obtain such values from a visual inspection of a spontaneous potential log. However, such a visual inspection method does not always give accurate values of these two parameters. For example, a shale or sand bed must be fairly thick before an accurate value of $SP_{sh}$ and/or SSP can be determined. If the shale or sand beds are not thick enough, the chosen values of these two parameters may be in error.

SSP is the SP value in clean sands and $SP_{sh}$ is the SP value in a formation of 100% shale. It has been found that neither of these parameters will vary significantly over the length of a borehole provided the water salinity remains constant. Thus by determining these two parameters, the SP calibration for all depth levels in terms of $V_{clay}$ is known.

In accordance with another feature of the present invention, values of $SP_{sh}$ and SSP can be determined from the $V_{clay}/W_{xo}$ versus SP crossplot of FIG. 12 in the following manner. To determine the value of $SP_{sh}$, $V_{clay}$ is set equal to "1" to give the quantity $1/W_{xo}$ on the vertical axis of the FIG. 5 crossplot. Then the value $1/W_{xo}$ is utilized in conjunction with the calibration line 33 to determine the value of $SP_{sh}$. To determine the value of SSP, the fact that $V_{clay}$ must equal zero in clean sands is utilized. Thus, the intersection of the calibration line with the $V_{clay}/W_{xo}=0$ axis gives the value of SSP.

Knowing $SP_{sh}$ and SSP which gives the position of the calibration line 33 of FIG. 12, $V_{clay}$ can be determined. Then, combining equations 5 and 12, $V_{sh}$ from the spontaneous potential log, $(V_{sh})_{SP}$, can be written as:

$$(V_{sh})_{SP} = \frac{W_{xo}}{1-SI} \times \frac{1-W_{clay}}{W_{clay}} \left(1 - \frac{SP - SP_{sh}}{SSP - SP_{sh}}\right) \tag{15}$$

Another log which can provide an indication of the amount of shale is the gamma ray log. In this regard, it has been found that the relationship for the magnitude of the gamma ray log normalized for bulk density in terms of the volume of silt and clay, $V_{silt}$ and $V_{clay}$, respectively, can be written as $$GR \cdot \rho_b = A + BV_{silt} + CV_{clay} \tag{16}$$

where: "A" is a calibration coefficient giving the background radiation, i.e., the gamma ray count rate in clean water sands; and "B" and "C" are calibration coefficients relating to $V_{silt}$ and $V_{clay}$, resectively. By multiplying the natural gamma ray count rate GR by the bulk density $\rho_b$, the gamma ray count rate is normalized for variations in bulk density. By combining equations 3, 4, 5 and 16, the volume of shale given by the gamma ray log, i.e., $(V_{sh})_{GR}$ is given by the relationship:

$$(V_{sh})_{GR} = \frac{\rho_b \cdot GR - A}{B(SI) + C(1-SI)} \tag{17}$$

Before using the gamma ray log to provide a quantitative indication of the shale volume, it is first necessary to determine the calibration coefficients A, B, and C. To accomplish this, in accordance with still another feature of the present invention, a statistical fit is made between the gamma ray measurement and the amount of silt, clay and background radiation in the formations.

Figure 13:
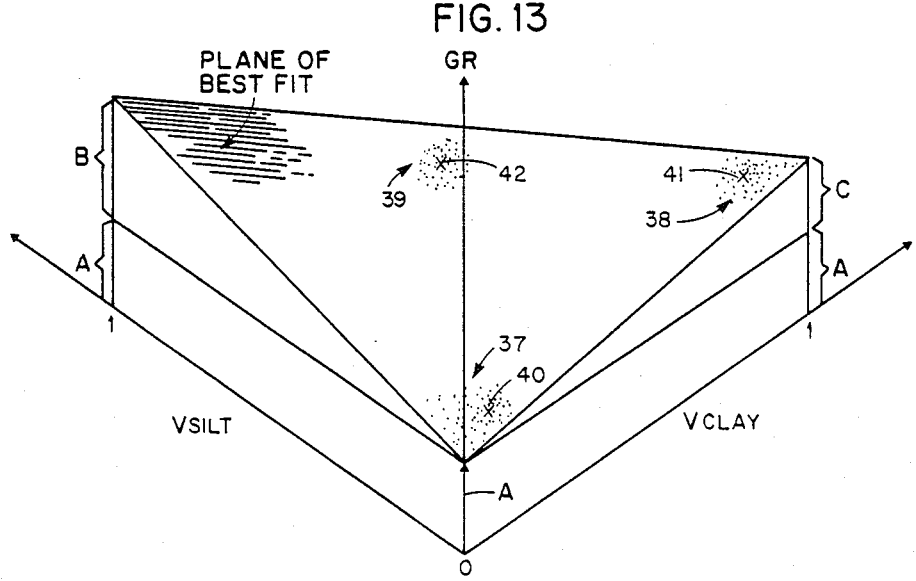

Turning now to FIG. 13 a three-dimensional plot of gamma ray versus $V_{clay}$ and $V_{silt}$ is illustrated. The gamma ray axis is the vertical axis in FIG. 6, while the $V_{silt}$ and $V_{clay}$ axes are the horizontally aligned axes to the left and right respectively in FIG. 13. By utilizing measures of $V_{silt\ and}\ V_{clay}$ derived from the $\phi_N$-$\phi_D$ crossplot in conjunction with the gamma ray count rate, GR, for each depth level, a point can be plotted on the three-dimensional plot of FIG. 13 for each depth level. A plane of best fit can then be drawn in FIG. 13. The intersection of this plane with the GR axis gives the magnitude of the calibration coefficient "A" since the GR axis coincides with $V_{silt}=V_{clay}=0$, i.e., clean sands.

To determine the calibration coefficient "B", it is only necessary to set $V_{silt}$ equal to "1" and $V_{clay}$ equal to "0" in equation 17 which corresponds to looking at the axis $V_{silt}=1$ in FIG. 13. The total length of the vector from the $V_{silt}$ axis at the point $V_{silt}=1$ to the plane of best fit gives the total normalized gamma ray reading in this case. Thus, since in this case, $V_{silt}$ is equal to "1", the length of this vector from the $V_{silt}$ axis to the plane of best fit along the $V_{silt}=1$ axis will be equal to $A+B$ from equation (12). Since A has already been determined by the intersection of the plane of best fit with the GR axis and can be projected onto the $V_{silt}=1$ axis, as indicated in FIG. 13, the remainder of the length of this vector is equal to "B". The same reasoning applies to the determination of the calibration coefficient "C" from the vector between the $V_{clay}$ axis and the plane of best fit along the $V_{clay}=1$ axis, as shown in FIG. 13.

If all of the gamma ray measurements were indiscriminately plotted in FIG. 13, it would be conceivable that there would be a great many more points plotting near one apex of a triangle which defines the plane of best fit than the others, thus giving rise to the possibility of points derived from one type of formation unduly affecting the position of the plane of best fit. To alleviate this problem, the plotted points are segregated into three groups corresponding to clean sand formations, shales having a predominance of clay, and shales having a predominance of silt. Clouds of points corresponding to clean sands, predominantly clay formations and predominantly silty shales are indicated generally in FIG. 13 by the designations 37, 38 and 39 respectively. The centers of gravity for each of these three clouds of points are then computed and such centers of gravity are utilized to define the plane of best fit. Thus, the points 40, 41 and 42 represent such centers of gravity. The determination of the calibration coefficients A, B, and C is then made in the manner described above.

Once the calibration coefficients A, B and C are determined, these coefficients can be used in conjunction with the measurements of gamma ray, GR, and bulk density, $\rho_b$, and values of the silt index, SI, derived from the $\phi_D$-$\phi_N$ crossplot, for each depth level in the borehole in accordance with equation (17), to give indications of the volume of shale indicated by the gamma ray measurement, i.e., $(V_{sh})_{GR}$.

A third indication of shale volume can be derived from the measurements of resistivity in hydrocarbon zones. In hydrocarbon zones of irreducible water saturation, the following expression applies:

$$\frac{1}{R_t} = \frac{W_{irr}V_{sh}}{\phi_e R_{sh}} + \frac{W_{irr}^2}{8R_w} \quad (18)$$

where
$R_t$ is the resistivity of the non-invaded portion of the formation;
$R_w$ is the resistivity of the connate or natural formation water which can be derived from water tables supplied by geologists or by other well-known techniques;
and $$W_{irr} = \phi_e S_{irr} \quad (19)$$

where
$S_{irr}$ is the irreducible water saturation. Irreducible water takes the form of water which clings to the grains of the formation material because of capillary forces and which cannot be displaced.

In clean formations, $W_{irr}$ tends to remain constant and can be described by the relationship:

$$W_{clean} = \left(\frac{.8 R_w}{R_t}\right)^{\frac{1}{2}} \quad (20)$$

In shaly formations, the irreducible water volume can be described by the relationship:

$$W_{irr} = W_{clean} + iV_{sh} \quad (21)$$

where i is usually chosen to be 0.1.

After computing a lower limit of $W_{clean}$ by using in equation (20) the highest resistivity recorded in the hydrocarbon zone, a value of $V_{sh}$ derived from the $R_t$ tool, $(V_{sh})R_t$, can be found by simultaneously solving equations (18), (19), (20), and (21). Since the lowest limit of $W_{clean}$ was selected, $(V_{sh})R_t$ will be equal to or greater than the true value of $V_{sh}$.

Another shale indicator based on the maximum volume of shale permissible for clean sands fully saturated with gas can be derived. On the $\phi_N$-$\phi_D$ crossplot, clean sands fully saturated with gas will fall on a straight line passing through the origin of the crossplot. The slope of this gas sand line depends solely on gas properties. As will be set forth in detail later, the data points on the $\phi_N$-$\phi_D$ crossplot are corrected for shaliness in accordance with the amount of shaliness indicated by the shale indicators. If this shaliness correction moves the $\phi_n, \phi_d$ data points beyond this gas sand line limit, it is known that the amount of $V_{sh}$ indicated by the shale indicators was too high. Since all of the shale indicators are presumed to indicate maximum limits of shaliness, the magnitude of $V_{sh}$ which would correct the data points to the gas sandline limit is chosen to be the most accurate indication of shale volume. It has been found that the relationship for the volume of shale given by the gas sandline limit shale indicator, $(V_{sh})_g$, can be written as:

$$(V_{sh})_g = \frac{\phi \cdot \phi_n - \phi_D}{\phi \cdot (\phi_N)_{sh} - (\phi_D)_{sh}} \quad (22)$$

where $$\phi = \frac{1}{7}\left[8\left(\frac{1}{8 - 5(\rho_g)_{lim}} + \frac{2}{3(\rho_g)_{lim}}\right) - 1\right] \quad (23)$$

The lower limit of gas density $(\rho_g)_{lim}$ is computed as a function of depth in accordance with the following expression:

$$(\rho_g)_{lim} = \frac{1}{10} \cdot \frac{5 + \frac{4\,\text{Depth}}{1000} + 2\left(\frac{\text{Depth}}{1000}\right)^2}{50 + 2\frac{\text{Depth}}{1000} + \left(\frac{\text{Depth}}{1000}\right)^2} \quad (24)$$

where "depth" is in feet.

Another upper limit on the volume of shale can be found based on the fact that the invaded zone water saturation $S_{xo}$ must always be equal to or greater than the uninvaded zone water saturation $S_w$. The reason for this is that, before the borehole is drilled, both the uninvaded zone and the region called the invaded zone after the borehole is drilled have the same water saturation. When the borehole is drilled, the drilling mud will invade a portion of the formation called the "invaded zone" displacing the naturally occurring fluids therefrom. The affect of this invasion is to increase the water saturation if oil was present and displaced by the invading fluid, and to cause little chage if no hydrocarbons were initially present.

The water saturation of the uninvaded zone, $S_w$, can be found from the following relationship:

$$\frac{1}{R_t} = \frac{V_{sh} S_w}{R_{sh}} + \frac{\phi_e^2 S_w^2}{.8 R_w} \quad (25)$$

The terms of equation (25) have all been previously defined.

The saturation of the invaded zone, $S_{xo}$, can be obtained from the following expression:

$$\frac{1}{R_{xo}} = \frac{V_{sh} S_{xo}}{(R_{sh})_{xo}} + \frac{\phi_e^2 S_{xo}^2}{.8 R_{mf}} \quad (26)$$

where $R_{xo}$ is resistivity of the invaded zone, $(R_{sh})_{xo}$ is the invaded zone resistivity of shale formations, $R_{mf}$ is the resistivity of the mud filtrate which invades the invaded zone. $R_{mf}$ can be determined by well known techniques. If an $R_{xo}$ device is not available, the invaded zone water saturation can be approximated from $S_w$ in accordance with the following expression:

$$(1 - S_{xo}) = 0.5(1 - S_w) \quad (27)$$

Since, as discussed above, $S_{xo}$ must always be equal to or greater than $S_w$, $S_{xo}$ in equation (26) can be set equal to $S_w$ in equation (25) and these equations solved for $V_{sh}$ to give an upper limit on $V_{sh}$ based on the water saturation ratio. By so doing, $V_{sh}$ given by the saturation ratio shale indicator, i.e., $(V_{sh})_s$, is given by the following relationship:

$$(V_{sh})_s = \frac{1}{S_w} \frac{\frac{R_{mf}}{R_{xo}} - \frac{R_w}{R_t}}{\frac{R_{mf}}{(R_{sh})_{xo}} - \frac{R_w}{R_{sh}}} \quad (28)$$

Another indicator of the upper limit of shale volume is derived from the ratio between the neutron derived porosity $\phi_n$ to this porosity in shale. Thus $$(V_{sh})_n = \frac{\phi_n}{(\phi_n)_{sh}} \quad (29)$$

The reason why this gives an upper limit on $V_{sh}$ is obvious from equation (7).

A seventh indicator of the upper limit of shale volume can be derived from the fact that a solution of equations (6), (7), (10), (11) and (26) should give a value of hydrocarbon of density $\rho_{hy}$ which is equal to or greater than the gas density limit $(\rho_g)_{lim}$. Reciprocally setting $\rho_{hy} = (\rho_g)_{lim}$ permits us to compute from the same set of equations, a value $(V_{sh})_{hy}$ which is at least equal or larger than the true value thereof.

The terms $R_{sh}$ and $(R_{sh})_{xo}$ have been used in a number of equations expressing the shale indicators discussed above. In the past, the determinations of $R_{sh}$ and $(R_{sh})_{xo}$ have been brought about by inspection of $R_t$ and $R_{xo}$ logs in front of what was estimated to be representative of shale zones. In this prior technique, values of $R_t$ and $R_{xo}$ in shale zones was assumed to represent $R_{sh}$ and $(R_{sh})_{xo}$, respectively.

Thus, in accordance with another feature of the present invention, more accurate values of $R_{sh}$ and $(R_{sh})_{xo}$ are computed. These values of $R_{sh}$ and $(R_{sh})_{xo}$ can, in accordance with the present invention, vary from one depth level to the next according to the composition of shale.

To determine a representative value of $R_{sh}$ at each depth level, in accordance with the present invention, a statistical routine is utilized to determine the resistivity of a formation as if it had 100% clay. It has been found that the resistivity of the clay, $R_{clay}$, usually does not vary from one formation to the next in any geological area. However, as discussed above, the resistivity of the shale, $R_{sh}$, will vary in dependence on the distribution of the clay and silt. Thus, the statistically derived value of $R_{clay}$ can be utilized in conjunction with the silt index SI to determine the value of $R_{sh}$ at each depth level.

It has been found that the relationship between $R_{sh}$, $R_{cl}$, and SI is:

$$R_{sh} = \frac{R_{clay}}{(1 - SI)^2} \quad (32)$$

Figure 14:
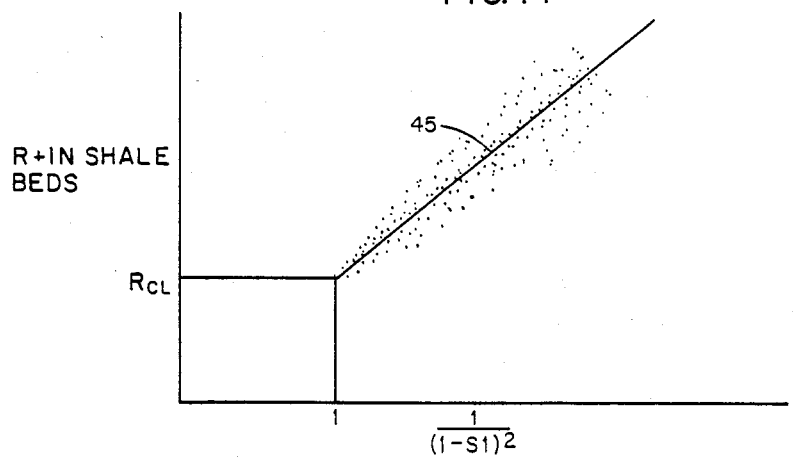

By plotting the resistivity $R_t$ derived from a deep investigation resistivity tool in shale beds versus $1/(1-SI)^2$, a family of points such as shown in FIG. 14 will result. A line 45 can then be drawn in a manner to represent the best fit of all of the plotted points. In a 100% clay filled formation, the silt index will be zero and thus the term $1/(1-SI)^2$ will be equal to one. Thus, by projecting a line from the "one" point on the $1/(1-SI)^2$ axis to the line 45 and from there to the $R_t$ axis, a value of $R_{clay}$ is established. Then, as will be discussed later, a value of the silt index, SI, at each depth level is computed and used with the statistically determined value of $R_{clay}$ in equation (32) to determine $R_{sh}$ at each depth level.

The same technique is used to find the value of $(R_{clay})_{xo}$ except that a shallow investigation $R_{xo}$ tool is utilized in place of the $R_t$ tool. This value of $(R_{clay})_{xo}$ can be utilized with values of the silt index, SI, to compute $(R_{sh})_{xo}$ at each depth level in the same manner as for $R_{sh}$. The relationship for $(R_{sh})_{xo}$ is:

$$(R_{sh})_{xo} = \frac{(R_{clay})_{xo}}{(1 - SI)^2} \quad (33)$$

Having explained how the various shale indicators can be derived, the overall interpretation method of the present invention can now be discussed. For this purpose, refer to the $\phi_D$-$\phi_N$ crossplot of FIG. 15 where the sand and shale lines and limit parabola 30 have been reproduced. As discussed earlier, the $\phi_D$-$\phi_N$ crossplot can be utilized to determine the parameters $V_{sh}$ and $\phi_e$ in the absence of a hydrocarbon effect. In mathematical terms, this means that there are as many unknowns in equations (8) and (9) as equations. As discussed earlier the shale terms $(\phi_N)_{sh}$ and $(\phi_D)_{sh}$ in equations (8) and (9) constitute the values of $\phi_N$ and $\phi_D$ at the point on the crossplot where the limit parabola 30 intersects the shale line (See FIG. 11). If this point of intersection is to the left of the shale point $S_{ho}$, $S_{ho}$ is taken to be the characteristic shale point and $(\phi_N)_{sh}$ and $(\phi_D)_{sh}$ will thus become $(\phi_N)_{sho}$ and $(\phi_D)_{sho}$. As discussed earlier, the silt index is determined from the location of this characteristic shale point.

Mathematically, this operation can be performed as follows. The limit parabola 30 in FIG. 4 can be expressed as:

$$\frac{\phi_N(\phi_D)_{sh} - \phi_D(\phi_N)_{sh}}{(\phi_N)_{sh} - (\phi_D)_{sh}} = \phi_z \left( 1 - \frac{(\phi_N - \phi_D)^2}{((\phi_N)_{sh} - (\phi_D)_{sh})^2} \right) \quad (34)$$

$(\phi_D)_{sh}$ can be expressed in terms of the $\phi_D$ value of the wet clay point, $(\phi_D)_{clay}$, and the silt index SI as:

$$(\phi_D)_{sh} = (\phi_D)_{clay}(1-SI) \quad (35)$$

Likewise, $(\phi_N)_{sh}$ can be expressed in terms of the $\phi_N$ value of the wet clay point, $(\phi_N)_{clay}$, and the silt index SI as:

$$(\phi_N)_{sh} = (\phi_N)_{clay}(1-SI) \quad (36)$$

Since $(\phi_D)_{clay}$, $(\phi_N)_{clay}$ are known parameters, equations (34), (35) and (36) can be solved for $(\phi_D)_{sh}$, $(\phi_N)_{sh}$ and SI. If SI is greater than $SI_o$(the silt index of point $S_{ho}$), it is limited to $SI_o$ and $(\phi_D)_{sh}$ and $(\phi_N)_{sh}$ are set equal to $(\phi_D)_{sho}$ and $(\phi_N)_{sho}$.

If there is a hydrocarbon effect, the crossplot will give inaccurate values for $V_{sh}$ and $\phi_e$. In mathematical terms, this means that there are more unknowns in equations (6), (7), (10), (11) and (26) than there are equations. To eliminate one unknown parameter, the lowest value of $V_{sh}$ produced by a plurality of the shale indicators discussed above is utilized. This lowest value is designated $(V_{sh})_{ind}$. Since $(V_{sh})_{ind}$ is on upper limit value and not always the actual value, it must be checked. To accomplish this, it is initially assumed that there is no hydrocarbon effect and equations (8) and (9) are solved for $\phi_N$ and $\phi_D$ using $(V_{sh})_{ind}$. The new shale corrected values for $\phi_N$ and $\phi_D$ are designated $\psi_N$ and $\psi_D$. Thus, $\psi_N$ and $\psi_D$ can be written as:

$$\psi_N = \phi_N - (V_{sh})_{ind}(\phi_N)_{sh} \quad (37)$$

$$\psi_D \phi_D - (V_{sh})_{ind}(\phi_D)_{sh} \quad (38)$$

These shale corrected readings $\psi_N$ and $\psi_D$ are then compared to determine the location of the new $\psi_N$, $\psi_D$N, $\psi$D point relative to the clean sand line.

Graphically, referring to FIG. 15, this operation is depicted by moving the original plotted $\phi_D$, $\phi_N$ point parallel to the shale line by an amount dependent on the computed value of $V_{sh}$ from the shale indicators, as represented by the vectors 47, 48 and 49 in FIG. 15. These equations cause the plotted point to move parallel to the shale line, and thus along one of the $\phi_e$ lines (see FIG. 3). The slope of this line will be $(\phi_D)_{sh.}/(\phi_N)_{sh}$.

Initially, only one value of shale indicators $(V_{sh})_{sp}$, $(V_{sh})_{GR}$, $(V_{sh})_{Rt}$, $(V_{sh})_N$ and $(V_{sh})_g$, is retained for the purpose of this correction. As noted before, the volume of shale computed for each shale indicator has been derived in such a way that it must be always either equal to or larger than the true volume of shale. Consequently, the lowest value obtained from any of the shale indicators must be the closest to the true value and is the one retained for subsequent use.

If the correction provided by $(V_{sh})_{ind}$ causes the plotted $\phi_D$, $\phi_N$ point to move to the 45° clean sand line it normally signifies the absence of a hydrocarbon effect on the tool readings, provided that the tool readings are themselves correct. (Correct tool reading refers to the absence of such upsetting factors as borehole enlargement, thick mudcake, etc.) An example of this is shown in FIG. 15 where the log readings give a plotted point 50 and the amount of shale, given by the shale indicators moves the data point by the length of the vector 47 to the point 51 on the sandline. In other words, the amount of shale given by $(V_{sh})_{ind}$ was most likely correct since the points should plot on the sandline in the absence of shale and hydrocarbons, i.e., the shale correction given by vector 47, in effect, moves the plotted point 50 to a position on the sandline where the point would have plotted in the same formation if free of shale. This being the case, the initial point 50 can be utilized in conjunction with the $\phi_D$-$\phi_N$ crossplot to determine $V_{sh}$, $\phi_e$, and SI (and from SI, $V_{clay}$ and $V_{silt}$) in the manner represented in FIGS. 2, 3 and 11. Mathematically speaking, equations (8) and (9) are solved for $V_{sh}$ and $\phi_e$ using the values of $(\phi_D)_{sh}$ and $(\phi_N)_{sh}$ determined from equations (34), (35), and (36) for the original, measured values of $\phi_N$ and $\phi_D$. The solution of equations (34), (35) and (36) for the measured values of $\phi_N$ and $\phi_D$ also gave SI which can be combined with $V_{sh}$ in equations (4) and (5) to compute $V_{clay}$ and $V_{silt}$.

Now consider the case where hydrocarbons are present and do have an effect on the tool readings $\phi_D$ and $\phi_N$. It will be recalled from FIG. 3 that hydrocarbons move the data point to the northwest. Thus, assuming that $(V_{sh})_{ind}$ is accurate, the shale correction given by $(V_{sh})_{ind}$ will move the point across the 45° clean sand line. Thus, assume that hydrocarbons were added to that formation which gave the data point 50. In this case, the data point 50 would be moved to the northwest and the shale correction would move the point across the 45° clean sand line.

Taking an example of this, assume that $\phi_N$ and $\phi_D$ plot at the point 52 in FIG. 15 and that the shale correction provided by the shale indicators moves the plotted point the length of the vector 48 to a new position represented by the point 53. In this case, the fact that the shale correction has moved the point beyond, or to the northwest, of the clean sand line indicates that the tool readings are probably affected by hydrocarbons in the formation. However, this must be verified since it is also possible that the magnitude of the shaliness correction given by the shale indicators may be too great.

To verify that the lowest possible value for $(V_{sh})_{ind}$ has been computed, in accordance with another feature of the present invention, a test is made to determine if $S_{xo}$ is less than $S_w$. If it is, as discussed earlier, something is wrong since $S_{xo}$ should never be less than $S_w$. It is then assumed that $(V_{sh})_{ind}$ is too large and a new shale indicator is introduced. Since $S_{xo}$ or $S_w$ appears to be in error, the water saturations in the invaded and uninvaded zones are computed with equations (25) and (26) and used to compute a value for $(V_{sh})_s$ with equation (28). Since $V_{sh}$ and $\phi_e$ are not known at this time, the $V_{sh}$ value provided by the shale indicators, $(V_{sh})_{ind}$, is used for $V_{sh}$ in equations (25) and (26) and $\phi_e$ is approximated with the following expression:

$$(\phi) \text{ app.} = \sqrt{\frac{1}{2}(\psi_N^2 + \psi_D^2)} \qquad (39)$$

where $\psi_N$ and $\psi_D$ are the shale corrected values for $\phi_N$ and $\phi_D$, e.g., the values for the shale corrected data point 53 in FIG. 15.

If $(V_{sh})_s$ becomes the minimum $V_{sh}$ value given by the shale indicators, it becomes the value of $V_{sh}$ provided by the shale indicators, i.e., it becomes $(V_{sh})_{ind}$. In this event, it is also possible that the value of $V_{sh}$ provided by the spontaneous potential shale indicator, i.e., $(V_{sh})_{sp}$, may turn out to be less than $(V_{sh})_{ind}$. It will be recalled from the discussion concerning equation (15) that the magnitude of $(V_{sh})_{sp}$ is dependent on the invaded zone water saturation $S_{xo}$ which initially was set equal to 1 to give a first approximation of $(V_{sh})_{sp}$. Thus, a new value of $(V_{sh})_{sp}$ is computed using the newly computed value $S_{xo}$. Then, if this new value of $(V_{sh})_{sp}$ is less than $(V_{sh})_{ind}$, this new value becomes the new $V_{sh}$ value provided by the shale indicators.

After the best possible value of $(V_{sh})_{ind}$ is derived, the next step is to determine if the new shale correction moves the data point to or near the clean sand line. If the data point still moves past the clean sand line, it is determined if the resistivity logs agree with the apparent answer provided by the $\phi_N$-$\phi_D$ crossplot, i.e, that hydrocarbons are present in the formations. $S_w$ and $S_{xo}$ are recomputed and used to check this. To this end, if the recomputed values of $S_{xo}$ and $S_{wx}$ are both approximately "1", it means that the resistivity logs are indicating that there are no hydrocarbons. This, in effect, means that the answers provided by the $\phi_N$-$\phi_D$ crossplot and those provided by the resistivity tools are in conflict. The logical reason for this conflict is that $(V_{sh})_{ind}$ is too large, which is always a possibility in view of the manner it is derived. Consequently, $(V_{sh})_{ind}$ is then decreased until either the shale corrected data point is on or near the clean sand line or the resistivity tools indicate the presence of hydrocarbons. (Recall that $S_w$ and $S_{xo}$ are both functions of $V_{sh}$ and thus will change as $(V_{sh})_{ind}$ changes.)

Referring back to FIG. 15 the shale corrected data point 53 on the crossplot indicates that there is a hydrocarbon effect because the point 53 plots to the northwest of the clean sand line. The resistivity tools, on the other hand, indicate that there could not be any hydrocarbon effect and thus the amount of shale correction provided by the shale indicator $(V_{sh})_{ind}$ should have brought the originally plotted point 52 to the sand line at the point 55. The length of the shale correction vector is then decreased until either the point 53 is returned to or near the clean sand line or the resistivity tools represented through $S_w$ and $S_{xo}$ indicate a possibility of hydrocarbon effect. In this latter case, the original data point 52 is corrected in accordance with the magnitude of the hydrocarbon effect. As an example of this, assume that the shale corrected point 53 is moved back to the point 56 before the resistivity tools give an indication of hydrocarbons. In this event, the vector 57 closes the gap to the clean sand line. This has the effect of moving the initial point 52 in a direction parallel to the vector 57 and by the same length to provide a data point 57a which corresponds to the initial data point 52 corrected for the hydrocarbon effect. This corrected data point 57a is then analyzed by the $\phi_N$-$\phi_D$ crossplot in the manner discussed earlier to derive values of $\phi_e$, $V_{sh}$ and SI.

If, on the other hand, the shale corrected point 53 had been moved all the way back to or near the clean sand line, the original data point 52 would be used for this purpose. In otherwords, there would be no hydrocarbon correction.

Referring back to the point in the discussion where $S_w$ and $S_{xo}$ were both checked for an indication of hydrocarbon, if it had been determined that both $S_w$ and $S_{xo}$ are sufficiently less than 1 to indicate the presence of hydrocabron, the value of hydrocarbon density $\rho_{hy}$ used in equations (10) and (11) is checked to determine if it is lower than the lowest possible value of hydrocarbon density. This lowest possible value is the gas density limit value $(\rho_g)_{lim}$ given by equation (24). To compute the value of $\rho_{hy}$, equations (6), (7), (10), (11) and (25) are solved using the value of $V_{sh}$ given by the shale indicators and value of SI, $(\phi_d)_{sh}$ and $(\phi_n)_{sh}$, picked from the $\phi_N$-$\phi_D$ crossplot or from equations (34), (35) and (36).

If $\rho_{hy}$ is greater than $(\rho_g)_{lim}$, i.e., $\rho_{hy}$ is acceptable, it is assumed that the answers provided by the solution of equations (6), (7), (10), (11) and (26) with values of $(\phi_D)_{sh}$ and $(\phi_N)_{sh}$ produced from equations (34), (35) and (36) are accurate. Then, knowing $V_{sh}$ and SI, $V_{clay}$ and $V_{silt}$ can be computed from equations (4) and (5).

Turning to FIG. 15, this operation takes the form of moving the shale corrected point 53 the length of the vector 54 to a new point 58 on the 45° sandline. The corresponding correction due to hydrocarbon can be applied to the original point 52 and moves this point to a new location 58A. This is the location of the shaly sand point as if not affected by hydrocarbon. Consequently, this point 58A can be validly utilized in conjunction with the $\phi_e$ and $V_{sh}$ lines of the $\phi_N$-$\phi_D$ crossplot to compute $\phi_e$ and $V_{sh}$ (or with equations (8) and (9). Additionally, the location of this point 58A also determines SI. In this example, the point 58A is within the shaly sand area of the crossplot and thus the silt index is $SI_o$ corresponding to the shale point $SH_o$.

If, on the other hand, the hydrocarbon density test had failed, i.e., $\rho_{hy}$ had been less than $(\rho_g)_{lim}$, there is a clear indication that something is wrong–one of the readings or computations is in error. A likely candidate is the value of $S_{xo}$ given by the $R_{xo}$ tool, often influenced by borehole or mudcake effect. To check this, an approximate value of $S_{xo}$ is computed using the value of $S_w$ given by the $R_t$ tool in accordance with equation (28). This equation is rather empirical and leads generally to reasonable values of $S_{xo}$. If this new computed value of $S_{xo}$, designated $(S_{xo})_w$, is less than the value of $S_{xo}$ computed from the $R_{xo}$ tool, it is assumed that the value of $S_{xo}$ computed from $R_{xo}$ is wrong. Then, the aforementioned test for $S_w$ and $S_{xo}$ sufficiently less than 1 is made using this new value of $S_{xo}$. On the other hand, if $(S_{xo})_w$ is greater than or equal to the value of $S_{xo}$ derived from $R_{xo}$, it confirms that $S_{xo}$ from the $R_{xo}$ tool is reasonably accurate and that the error is caused by the value of $V_{sh}$ given by the shale indicators being too large. Consequently, $V_{sh}$ is decreased until the $\rho_{hy}$ is equal to $(\rho_g)_{lim}$ whereupon the hydrocarbon effect is computed to enable the subsequent computation of $V_{sh}$ and $\phi_e$, with equations (6), (7), (10), (11), (26) using values of $(\phi_N)_{sh}$ and $(\phi_D)_{sh}$ given by equations (34), (35) and (36). From these new values of $V_{sh}$ and $\phi_e$, a new value of $S_w$ can also be computed, $S_{xo}$ being computed from the simultaneous solution of equations (6), (7), (10), (11) and (26). Graphically, the operation of reducing $(V_{sh})_{ind}$ is the same as discussed earlier where the data point 53 was moved back to the point 56 to give the hydrocarbon effect vector 57 which in turn moved the original data point 52 to the new position 57A for analysis by the $\phi_N$-$\phi_D$ crossplot.

Now, consider what happens when the shale correction vector moves the plotted data point to a position to the right or southeast of the 45° sandline. Such a situation is depicted in FIG. 15 by the shale correction vector 49 moving the initial data point 63 to the position 64. This situation is incompatible with the underlying criterion of the method that the value of $V_{sh}$ given by the shale indicators should always be equal to or greater than the true value of $V_{sh}$. It is, therefore, assumed in this case that $V_{sh}$ given by the shale indicators was correct but that either the value of $\phi_N$ or $\phi_D$ is inaccurate.

This implies that either $\phi_N$ reads too high (effect of borehole enlargement or mudcake) or the density of the sand grains has locally increased ($\phi_D$ too low). Then, $\psi_N$ is checked to determine if it is compatible with the maximum value that can be expected in this sand. Mathematically, the $\psi_N$ value of the shale corrected data point $\psi_N$ is given by:

$$(\psi_N)_{lim} = \phi_Z(1-(V_{sh})_{ind}^2(1-SI)^2) \tag{40}$$

If $\psi_N$ is greater than $(\psi_N)_{lim}$, $\phi_N$ is adjusted until the corrected data point falls on the 45° sandline.

In FIG. 15, this operation is depicted by the vector 65 moving the corrected point 64 to a new position 66 on the clean sandline. Accordingly, the original data point 63 is moved in the same direction as the vector 65 and for the same distance thereasto the new position 66A. (Note: In this case, the original data point would fall to the right of the limit parabola even though not shown that way in FIG. 15.) This new data point 66A is then analyzed by the crossplot to find the values of $V_{sh}$, $\phi_e$ and SI.

If $\phi_N$ is compatible with the above text, then it is assumed that the value of matrix grain density, $\rho_g$, is in error and $\rho_g$ is adjusted until the data point moves to the clean sand line. In FIG. 15, this operation is depicted by the vector 67 moving the shale corrected point 64 to the new position 68 on the clean sand line and the corresponding movement of the original data point 63 to the new position 68A.

There is a limit on the amount of adjustment made to $\rho_m$. $\rho_m$, and thus $\phi_D$ (See eq. 1), is adjusted only until it is equal to a predetermined limit value of matrix grain density. (In the example given by the vector 67 in FIG. 15, it was assumed that this limit condition was not exceeded.) Thereafter, $\phi_N$ is adjusted until the clean sand line is reached.

The discussion up to this point has assumed that the data points do not fall in the unlikely area. If a point falls into the unlikely area, it must first be verified and eventually corrected before the analysis discussed above can be performed. Since $\phi_N$ and $\phi_D$ is now presumed to be doubtful, other data not influenced by the borehole effect is used to control these values and to correct $\phi_N$ and $\phi_D$. To this end, in accordance with other features of the present invention, the porosity $\phi_s$ derived from the acoustic travel time log and computed in accordance with equation (2) and the values of $V_{sh}$ given by the SP and Gamma ray shale indicators are utilized to correct $\phi_N$ and $\phi_D$. After making these corrections, the adjusted data point can be analyzed in the manner set forth above.

Before discussing how the acoustic travel time derived porosity $\phi_s$ can be utilized to correct data falling in the unlikely area, it would first be desirable to explain how the acoustic data can be calibrated for compaction correction in accordance with other important features of the present invention. This compaction correction factor is designated $1/C_p$.

Figure 16:
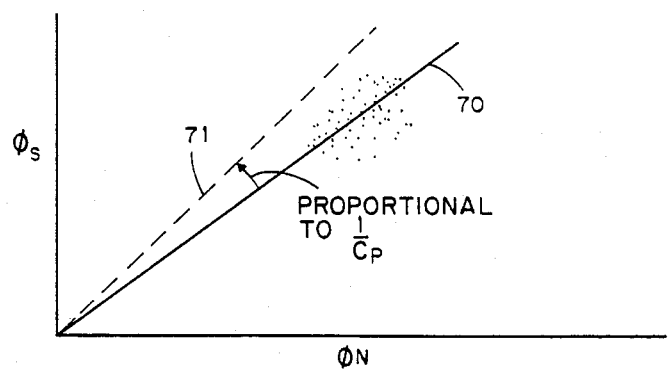

It is known that the porosity reading given by the neutron tool is reasonably accurate in clean water sands. It is also known that the value of porosity given by the sonic tool is also accurate in clean water sands after it has been corrected for compaction. Thus, to determine the magnitude of the compaction correction, a crossplot of $\phi_2$ versus $\phi_N$ can be used. Such a crossplot is shown in FIG. 16. By plotting a plurality of points on the $\phi_s$ versus $\phi_n$ crossplot, a line 70 describing the best fit of the plotted points can be drawn. The angle between this line 70 and a line 71 designating $\phi_s = \phi_n$ gives the value of $1/C_p$. In other words, multiplying $\phi_s$ by the factor $1/C_p$ should move the statistical best fit line 70 to the position given by the line 71.

Figure 17:
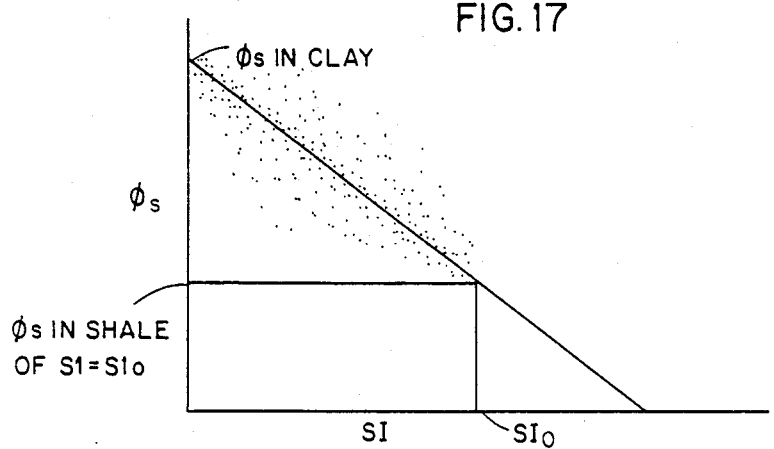
Figure 19A:
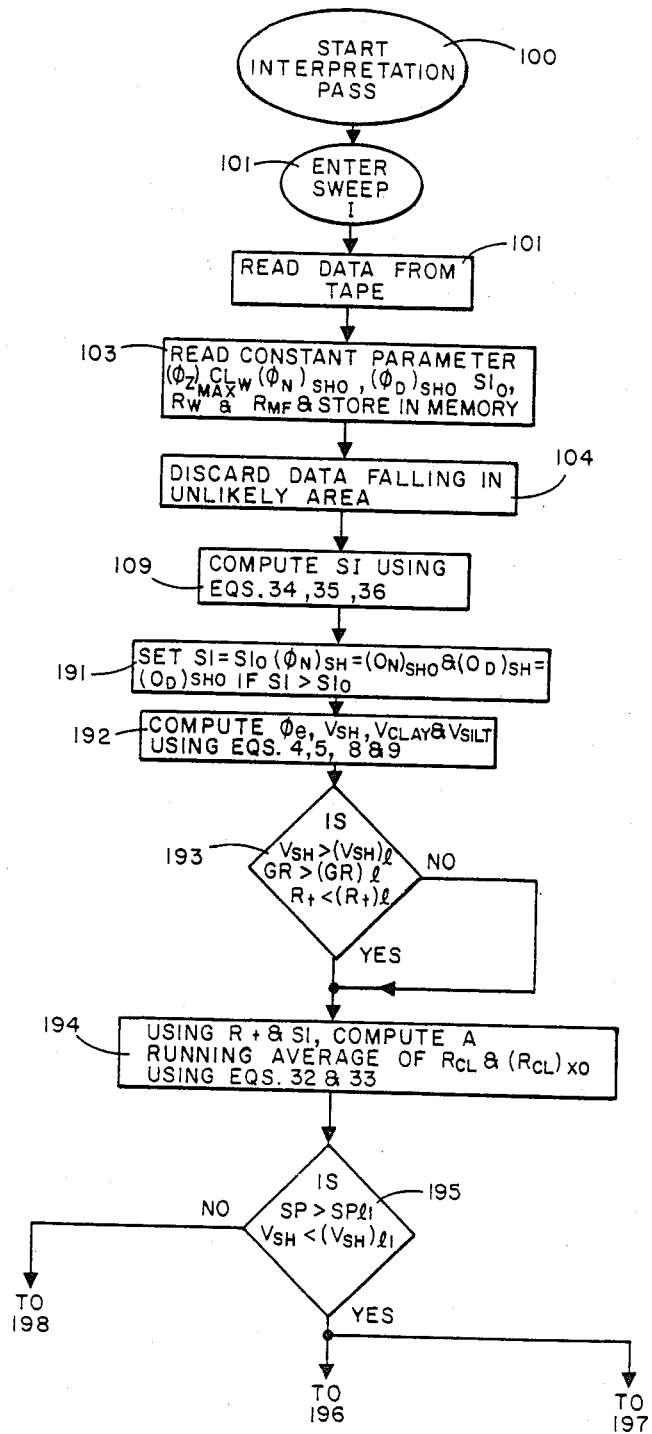
FIGS. 19A, 19B and 19C are flow diagram representations of a first sweep of "interpretation pass" portion of the computer program which figures will hereinafter be referred to simply as FIG. 19.
Figure 19B:
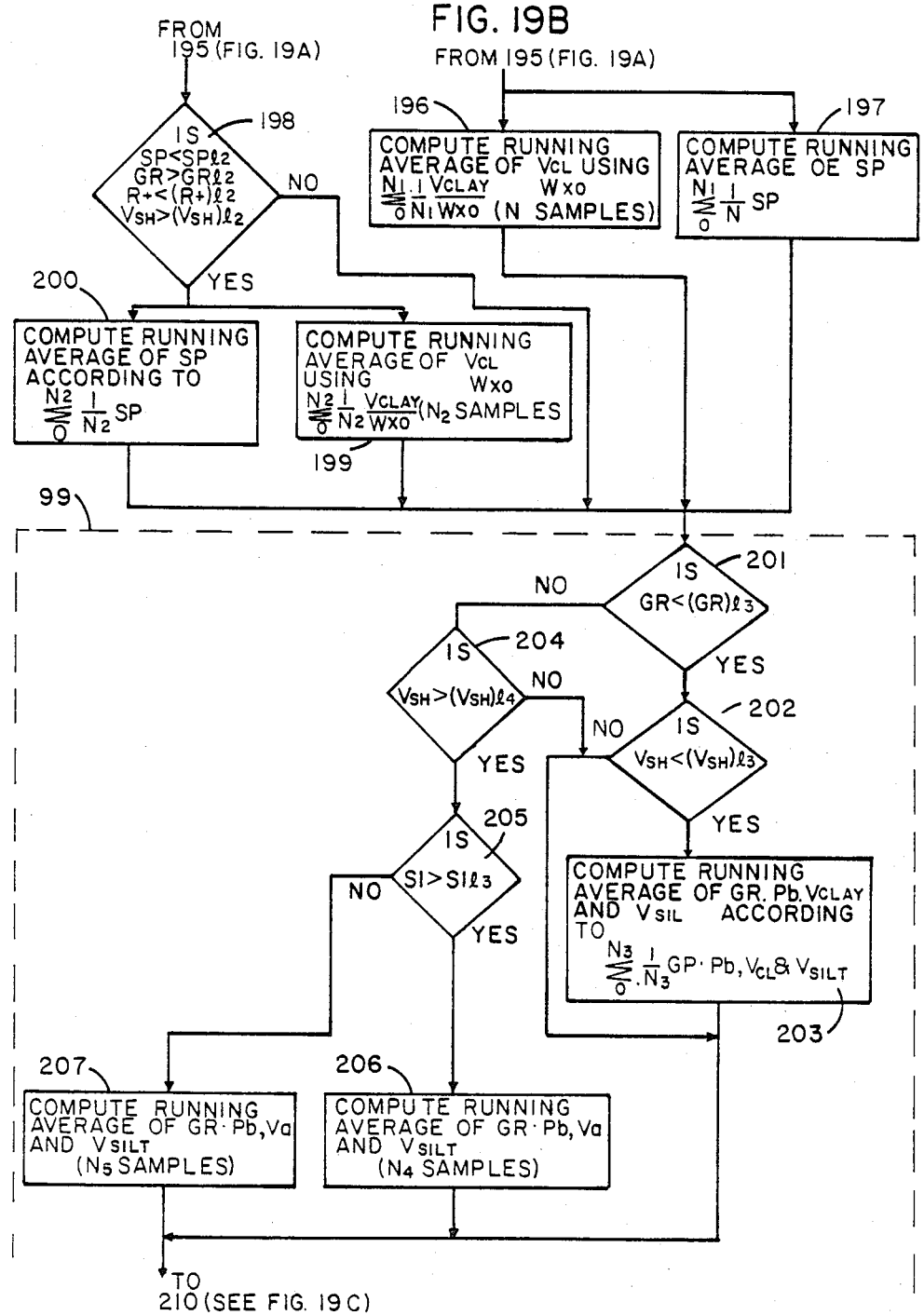
Figure 19C:
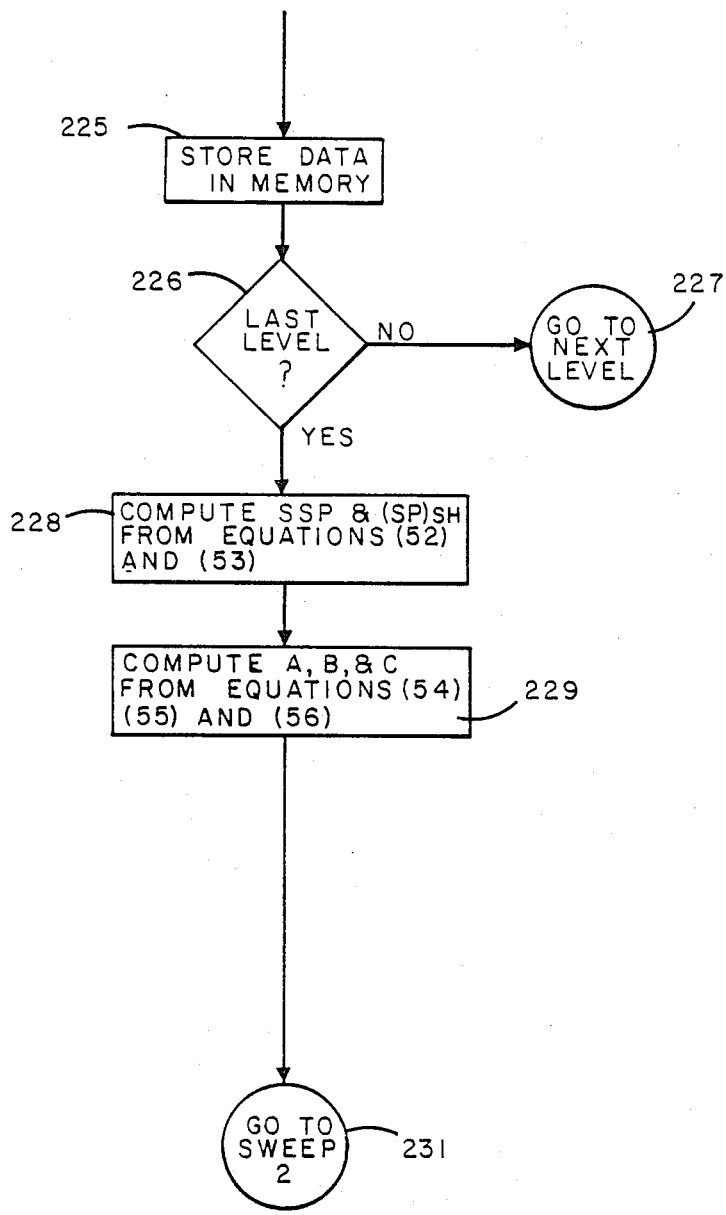

Having determined the factor $1/C_p$, it is now possible to determine the response of the sonic tool in shales. To this end, a crossplot of $\phi_s$ versus silt index, SI, can be used. Referring to FIG. 17, there is shown such a crossplot. A statistical fit of the points given by this crossplot will give a line 72 which indicates the relationship between $\phi_s$ versus SI. The intersection of this line with the SI=0 axis gives the value of $\phi_s$ in pure clay, i.e., $(\phi_s)_{clay}$ and the intersection of this line with $SI=SI_o$ gives $\phi_s$ in the silty shale $(\phi_s)_{sho}$. From this data the value of $100_s$ in any shale formation can be determined by its silt index from the equation:

$$(\phi_s)_{sh} = (\phi_s)_{clay} + SI/SI_o((\phi_s)_{sho} - (\phi_s)_{clay}) \tag{41}$$

To correct data points on the $\phi_N$-$\phi_D$ crossplot falling in the unlikely area with the acoustic derived porosity $\phi_s$, it is assumed that if $\phi_n$ is greater than $\phi_s/C_p$, the value of porosity given by the neutron tool is inaccurate and the acoustic derived porosity is used in its place. However, the data point is moved towards the origin until $\phi_n = \phi_s/C_p$. This correction is applied only when shale content is low because it has been found that this correction is not usually accurate when the formation is shaly. This correction is graphically depicted in FIG. 15 by the vector 75 moving the original data point 76 to a new position 77.

In addition to using the compaction corrected sonic derived porosity $\phi_s/C_p$ to correct unlikely data points, a shaliness check is also made which will correct these points which are very shaly. In this regard, a value of $V_{sh}$ is computed from the new position 77 of the data point after the $\phi_s/C_p$ correction and this value of $V_{sh}$ is compared with the minimum value of $V_{sh}$ computed from the gamma ray and SP shale indicators, i.e., $(V_{sh})_{GR}$ and $(V_{sh})_{SP}$. If the value of $V_{sh}$ computed from the crossplot is less than the minimum value of $V_{sh}$ computed from the gamma ray and SP shale indicators, the data point is moved in a southwesterly direction towards the intersection of the line W, $CL_d$ of FIG. 2 with the $\phi_N=0$ axis until these new values of $V_{sh}$ from the corrected part on the crossplot becomes equal to $(V_{sh})_{ind}$. This operation is depicted in FIG. 15 by the vector 78 moving the corrected data point 77 to a new position 78. This new position 78 then is analyzed in accordance with previous discussion, i.e., the point 78 corresponds to the initial data points discussed earlier.

After the best values of $V_{sh}$, $\phi_e$, SI have been computed in accordance with the techniques discussed above, these new values can be utilized in equations (25) and (26) to compute new and more accurate values of $S_w$ and $S_{xo}$. All of this data, $V_{sh}$, $\phi_e$, SI, $S_w$ and $S_{xo}$ can then be recorded as a function of depth to thereby produce logs. Additionally, new values of hydrocarbon density $\rho_{hy}$ can be computed by simultaneous solution of equations (6), (7), (10) and (11) using the last computed values of $\phi_e$, $V_{sh}$, $S_{xo}$ and $(\phi_N)_{sh}$ and $(\phi_D)_{sh}$. Additionally, a parameter representing the fluid density in the invaded zone, $(\rho_f)_{xo}$, can be computed in accordance with the expression:

$$(\rho_f)_{xo} = 1 - .7 \left[ 5/7 (1 - \rho_{hy}) \frac{32 - 9 \rho_{hy}}{32 - 5 \rho_{hy}} (1 - S_{xo}) \right] \quad (42)$$

Additionally, the permeability K can be computed in accordance with one of the following two expressions:

$$K_1 = \frac{C \phi_e^r}{S_w^m} \quad (43)$$

where c, n and m are coefficients chosen by the log analyst based on geologic considerations, or $$K_2 = \left[ \frac{100 \phi_e^3}{W_{irr}} \right]^2 \sqrt{\phi_e} \quad (44)$$

where $W_{irr}$ is given by equation (21) when water saturation $S_w$ is appreciable, e.g., greater than two-thirds, and is equal to $S_w \times \phi_e$ when $S_w$ is not appreciable, e.g., less than two-thirds. The choice in selecting equations (43) or (44) depends on what local experience in the area has shown to apply.

With accurate values of $\phi_e$, $S_{xo}$ and $\rho_{hy}$, it is possible to compute both the volume of residual hydrocarbon and the weight of such residual hydrocarbon in accordance with the following expressions:

$$V_{rhy} = \phi_e(1 - S_{xo}) \quad (45)$$

$$\text{Weight}_{rhy} = V_{rhy} \times \rho_{hy} \quad (46)$$

Additionally a gas index which permits us to recognize the presence of free gas in formation can be derived from the values of $\phi_s$, $C_p$, $\phi_e$ and $\phi_N$ as follows:

$$(GI)_s = \frac{\phi_s/C_p - \phi_N}{\phi_e} \quad (47)$$

In water or oil zones, $\phi_s/C_p$ and $\phi_N$ are mathematically equal and GI remains close to zero. In gas zones, the porosity $\phi_N$ is decreased due to the low concentration of hydrogen in gas whereas the value $\phi_s$ is usually increased—consequently the $(GI)_s$ value increases significantly above zero.

As discussed earlier, there are three forms of shale which can be found in any given formation, namely, dispersed shale, laminated shale, and structural shale. The volume of each of these forms of shale should equal $V_{sh}$. Thus, $$V_{sh} = V_d + V_L + V_{str} \quad (48)$$

where
$V_d$ is the volume of dispersed shale,
$V_L$ is the volume of laminated shale,
$V_{str}$ is the volume of structural shale.

These forms of shale are differentiated by the manner they affect porosity in accordance with the following expressions:

$$(\phi_s)_{max} = \phi_e + V_D/1 - V_L \quad (49)$$

Laminated and structural shales have been related through the following expresion:

$$V_L = (V_L + V_{str})(2 = V_L - V_{str}) \quad (50)$$

This distribution can be solved by a simultaneous solution of equations (48), (49) and (50) assuming $\phi_z$ to be constant and equal to the value of $(100\ _z)_{max}$ given by the $\phi_N$-$\phi_D$ crossplot. Such conditions are often considered in recent depositions. There is no need to assume that $\phi_z$ is constant and when the sonic log is available, the following expression can be substituted for equation (49) to thereby give an accurate indication of the shale distribution in a more general way:

$$\phi_s = \phi_e + V_d + (V_L + V_{str})(\phi_s)_{sh} \quad (51)$$

where $(\phi_s)_{sh}$ is determined from the statistical routine depicted in FIG. 17, i.e., $(\phi_s)_{sh}$ is determined from SI and the position of the calibration line in accordance with equation (41).

In the above discussion of the analysis of the $\phi_N$ and $\phi_D$ data, it has been assumed that the shale indicators had already been properly calibrated. Since the $\phi_N$ and $\phi_D$ data for the entire formation interval is used to compute several parameters used for this purpose as depicted in FIGS. 12, 13, 14 and 15, the data derived over the formation interval of interest is analyzed for calibration purposes before the $\phi_N$ and $\phi_D$ data is analyzed to produce $V_{sh}$, $\phi_e$, etc. Thus, the data is processed in a preliminary, first sweep before the final interpretation sweep is made.

However, as can be seen from a number of the shale indicator equations, hydrocarbons will have a significant effect on the shale indicator calibration. Since the extent of the hydrocarbon effect can not be accurately determined until the shale indicators have been calibrated and the shale indicators can not be properly calibrated until the hydrocarbon effect is determined, a difficult situation arises.

To overcome this problem, in accordance with other important features of the present invention, three sweeps of the data are made. The first sweep calibrates the shale indicators with the neutron and density data, assuming the absence of hydrocarbons. On a second sweep, a complete interpretation of the data, including analysis of the hydrocarbon effect, is made, using this preliminary calibration of the shale indicators. The hydrocarbon effect corrected data is then used during sweep 2 to more accurately recalibrate the shale indicators. It can be assumed that, after this second sweep, the shale indicators are properly calibrated. However, since the shale indicators may not have been properly calibrated during sweep 1, the interpretation analysis during sweep 2 may be inaccurate. Therefore, a third sweep is made to analyze the data using the recalibrated shale indicators.

As many sweeps as desired could be made. The accuracy would improve with each additional sweep. However, it has been found that three sweeps are sufficient in most cases.

To make the shale indicator calibration as accurate as possible, data falling in the unlikely area is rejected during sweeps 1 and 2. During the final sweep 2, this "unlikely" data is corrected and analyzed.

These three sweeps comprise what is defined as the "interpretation pass". Prior to the interpretation pass, a "preliminary pass" is run to prepare the data for the interpretation pass and to produce a $\phi_N$-$\phi_D$ frequency cross plot. (In a frequency crossplot, the number of times that a data point fell into each defined sector of the crossplot is printed at the sector location on the crossplot). This frequency crossplot can then be used to calibrate the tools and to select the parameters discussed earlier, i.e., $SI_o$, $(\phi_s)_{max}$, etc. Concerning the first pass in greater detail, the data is corrected for certain errors caused by borehole, invasion, mudcake, calibration, etc. Also, the neutron and density data is converted into porosity units, the gamma ray measurements are normalized for variations in density, and the apparent water resistivity, $R_{wa}$, is computed. A log of $R_{wa}$ can be used to determine the water resistivity $R_{wa}$ for the formation interval of interest. How to accomplish all of these corrections and computations is well known in the well logging art and need not be discussed here.

After this preliminary pass, the interpretation pass is run using the measured data at each depth level as well as the parameters derived from the preliminary pass. Concerning the interpretation pass in detail and first considering sweep 1, after rejecting data which falls in the unlikely area on the $\phi_N$-$\phi_D$ crossplot, the data from each depth level is analyzed for shaliness according to the position of the data point on the $\phi_N$-$\phi_D$ crossplot. By so doing, initial values of $\phi_e$ and SI can be derived for use in the shale indicator statistical routines. Since, during this first sweep it is assumed that all formations are free of hydrocarbon effect, equations (8) and (9) can be utilized instead of equations (6), (7), (10) and (11). Thus, equations (8) and (9) in conjunction with equations (34), (35) and (36) will be sufficient to solve for these parameters on the first sweep. Of course, if a hydrocarbon effect in fact exists, the parameters produced by the statistical routines may be in error. However, this error is substantially eliminated during subsequent sweeps.

Once the shale indicators have been calibrated during sweep 1, it is now possible to make a complete interpretation utilizing the $\phi_D$ and $\phi_N$ data in conjunction with the calibrated shale indicators. This is done during sweep 2 of the interpretation pass. During sweep 2, the hydrocarbon effect can be accounted for since values of $(V_{sh})_{ind}$ are available even though not the most accurate values thereof. Upon making a complete interpretation, including correction for hydrocarbon effect, during sweep 2, more accurate values of $\phi_e$, SI and $S_{xo}$ are available. These more accurate values are utilized to calibrate the shale indicators. Thus, after the statistical routines run during sweep 2, the shale indicators will be accurately calibrated including taking into account the hydrocarbon effect.

Now that the shale indicators have been accurately calibrated, it only remains to use these newly calibrated shale indicators in conjunction with the derived well logging measurements to make a complete and final interpretation for each depth level. This is the function of sweep 3 of the interpretation pass. During sweep 3, data points falling in the unlikely area are corrected and analyzed so that no depth levels will be passed over during sweep 3.

Finally, the data computed during sweep 3 is prepared for display or recording and then outputted. The parameters computed in the interpretation analysis, i.e. $V_{sh}$, $V_{clay}$, $V_{silt}$, $\phi_3$, $S_w$ and $S_{xo}$, can all be outputted. Additionally, the volumes of laminated, dispersed, and structural shale, $V_L$, $V_D$, $V_{str}$, permeability, gas index, residual hydrocarbon by volume and weight, bulk volume water ($\phi_e S_w$), can also be computed for display and recording. Moreover, synthetic gamma ray, SP and resistivity data can be computed for comparison with the original data. Also, statistical coefficients of fitness which can be used to evaluate the realiability of the gamma ray spontaneous potential shale indicators can be computed and displayed.

Having now discussed the underlying techniques of the present invention, it is possible to discuss a specific embodiment for implementing these techniques. In this connection, it would be possible to use a special purpose computer for performing the analysis or it would be possible to use a computer program for use on a general purpose digital computer. Because of the complexity of the analytical techniques of the present invention, it is considered preferable to utilize the computer program approach.

In this connection, FIGS. 18, 19, 20, 21, 22 and 23 are programming flow diagrams representing one embodiment of the present invention. First, referring to FIG. 18, there is shown a flow diagram representing the steps performed by the preliminary pass discussed above. Each element in these flow diagrams represents a step in the program. After initiation of the preliminary pass represented by an element 90, the input constants ($\rho_m, \Delta t_f$, etc.) for the formation interval of interest are read as represented by block 91. Next, the data logging parameters are read level by level as represented by the block 92. Next, the logging data is corrected for such things as borehole and calibration errors, as represented by the block 93. Then the values of $\phi_S$, $\phi_N$ and $\phi_D$ are computed level by level from the logging data as represented by the block 94. The corrected logging data, input parameters, and computed values of $\phi_S$, $\phi_N$ and $\phi_D$ are stored on magnetic tape, for subsequent use in the interpretation pass as represented by the block 95. At the same time as the data is being written on magnetic tape, the $\phi_N$ and $\phi_D$ data is being stored in a drum to enable the production of a frequency $\phi_D$ versus $\phi_N$ crossplot by for example, a line printer, as represented by the blocks 96 and 97. As discussed in connection with FIG. 2, the $\phi_D$ versus $\phi_N$ frequency crossplot is used to draw the shale line and shaly sand trend line from which $(\phi_z)_{max}$, $Cl_w$, $Sh_o$, (and consequently $SI_o$) can be selected.

After the preliminary pass has been completed, the interpretation pass is initiated, as represented by the element 100. The interpretation pass immediately enters sweep 1 for the determination of the calibration coefficients by statistical routines, as represented by the element 101. Once sweep 1 is entered, the data stored on magnetic tape from the preliminary pass is read level by level, as represented by the block 102. Next, the constant parameters derived from the frequency crossplots and logs produced by the preliminary pass are read and stored in memory, as represented by the block 103.

Each data point which falls into the unlikely area of the $\phi_N$-$\phi_D$ crossplot (see FIG. 11) is discarded and thus not considered during sweep 1. How to write equations to segregate those data points falling in the unlikely area can be easily accomplished by standard analytical geometry techniques. Alternatively, approximation could be made which would require only linear first order equations. Thus, for example, equations could be written to segregate data points falling to the right of the line 106 and above line 107 in FIG. 11 to segregate those data points falling in this approximation of the unlikely area. How to write equations for such lines is well known and need not be discussed further here.

After data falling in the unlikely area has been discarded, equations (34), (35), and (36) are utilized to compute the silt index, SI, $(\phi_D)_{sh}$ and $(\phi_N)_{sh}$ as represented by the block 109. Graphically, referring to FIG. 11, this operation corresponds to drawing the parabola 30 through the data point and the $\phi_z$ point. The point where this parabola strikes the shale line is designated as the characteristic shale for this depth level and the silt index is computed from this characteristic shale point in accordance with the procedure discussed earlier. If SI is greater than $SI_o$, SI is set equal to $SI_o$, $(\phi_N)_{sh}$ is set equal to $(\phi_N)_{sho}$, and $(\phi_D)_{sh}$ is set equal to $(\phi_D)_{sho}$ as represented by the block 191. In FIG. 11, this corresponds to designating the shale point as $Sh_o$ if the parabola 30 crosses the shale line on the silt side of $Sh_o$. Having the value of silt index SI, it is now possible to compute values for $\phi_e$, $V_{sh}$, $V_{clay}$, and $V_{silt}$ using equations (4), (5), (8) and (9), as represented by block 192. Graphically, in FIG. 11, this corresponds to analyzing the data point for these parameters assuming the absence of a hydrocarbon effect.

At this point, values of $\phi_e$, $V_{sh}$, $V_{clay}$, $V_{silt}$, and SI have been computed for use in statistical routines to calibrate the shale indicators. These values are approximations because the hydrocarbon effect has not been considered. During sweep 2, the hydrocarbon effect will be taken into account to improve this calibration.

Now that a first approximation of $V_{sh}$ and SI is available, it is possible to undertake a statistical analysis of the resistivity of shale formations to determine $R_{clay}$ in accordance with the technique depicted in FIG. 14. It will be recalled from a discussion of FIG. 14 that this statistical analysis is undertaken only for points corresponding to data derived from shale formations. If the magnitude of $V_{sh}$ derived from step 192 and the gamma ray count rate are both high and $R_t$ is low, it can reasonably be assumed that the data is from a shale formation. The decision element 193 determines if $V_{sh}$ is greater than $(V_{sh})_1$, OR greater than $(GR)_1$, and $R_t$ less than $(R_t)_1$ where 1 defines a limit value for these parameters. If the answers to the questions asked by decision element 193 are yes, the value of SI computed by step 109 and the measured value of $R_t$ are utilized to compute a running average of $R_{clay}$ and $(R_{clay})_{xo}$ in accordance with equations (32) and (33) respectively, as represented by block 194. In equations (32) and (33), $R_{sh}$ constitutes $R_t$ for purposes of making the statistical analysis. If the answers given by the decision element 193 are no, step 194 is bypassed so that only data which is thought to be derived from shale formations will be considered in making these running averages.

It will be recalled from the discussion of FIG. 12 that the spontaneous potential log is calibrated to provide indications of $(V_{sh})_{sp}$ by plotting $V_{clay}/W_{xo}$ versus the spontaneous potential for shale formation beds and clean water-bearing sand formation beds. The center of gravity of the data points for each of these two types of formations are then computed to designate the position of the calibration line 33.

The data points falling into these two classes are segregated in sweep 1 through the use of the gamma ray and deep resistivity logs, as well as the magnitude of $V_{sh}$ computed in step 192. Automatically, the spontaneous potential log itself is also utilized for this purpose.

If the spontaneous potential is relatively high and the magnitude of $V_{sh}$ computed in step 192 is relatively low, it can reasonably be assumed that the formation under consideration is a nearly clean sand formation. Thus, a decision element 195 determines if the spontaneous potential is greater than a given limit value, $SP_{L1}$, and if $V_{sh}$ is less than a designated limit value $(V_{sh})_{L1}$. If the answer to both questions is yes, it can be assumed that a sand formation is being logged. In this event, a running average of $V_{cl}/W_{xo}$ is computed according to $$\sum_{o}^{N_1} \frac{1}{N} \frac{V_{clay}}{W_{xo}}$$

where $W_{xo}$ is obtained from equation (12), and $n_1$ is the number of samples. This value is designated $(AVC)_{sd}$. Also, a running average of the spontaneous potential is computed in accordance with the expression $$\sum_{o}^{N_1} 1/n_1 \times SP.$$

This value is designated $(AVSP)_{sd}$. These two operations are depicted in blocks 196 and 197 respectively.

If the answer to the questions asked by decision element 195 is no, the data is checked to determine if it corresponds to a shale formation. In a shale formation, the spontaneous potential and deep resistivity, $R_t$, should both be relatively low and both the gamma ray count rate and $V_{sh}$ computed in step 192 should be high. It is the function of decision element 198 to ask all of these questions and thereby determine if the data is being derived from a shale formation. If the answer is no, the program exits these spontaneous potential statistical routine. If the answer is yes, a running average of $V_{clay}/W_{xo}$ using the expressions $$\sum_{o}^{N_2} \frac{1}{N_2} \frac{V_{clay}}{W_{xo}}$$

where $n_2$ is the number of samples. This running average is called $(AVC)_{sh}$. Also, a running average of the spontaneous potential is computed for $n_2$ samples, which is called $(AVSP)_{sh}$. These operations are depicted in blocks 199 and 200 respectively. After computing these running averages, the program exits the spontaneous potential statistical routine.

Next, the program enters the gamma ray statistical routine to perform the operation depicted in FIG. 13. It will be recalled from the discussion of FIG. 13 that the data is segregated into three categories corresponding to clean sands, shale formations having a preponderance of silt in one case and clay in the other case. If the gamma ray count rate is less than a given limit value (designated $l_3$) and $V_{sh}$ is less than a limit $(V_{sh})_{13}$, (see blocks 201 and 202) it can be assumed that the data is derived from a clean sand and running averages are made on $GR \cdot \rho_b$, $V_{clay}$ and $V_{silt}$ according to the expressions $$\sum_{o}^{N_3} \frac{1}{N_3} GR \cdot \rho_b, \sum_{o}^{N_3} \frac{1}{N_3} V_{clay} \text{ and } \sum_{o}^{N_3} \frac{1}{N_3} V_{silt}.$$

If the decision element 201 had indicated that the gamma ray was above the limit $(GR)_{13}$, then a series of tests are run to determine if the data points were derived from shale formations having a preponderance of either clay or silt. First, a test is run to determine if the formation under investigation is primarily a shaly one. To this end, as represented by the decision element 204, determination is made as to whether $V_{sh}$ given by step 192 is greater than a limit value thereof. If the answer is no, the program exits the gamma ray's statistical analysis. (It is possible that data from some depth levels will not fit either sand or shale formations sufficiently well for statistical purposes). On the other hand, if the answer is yes, a test is made to determine if the formation is primarily either silt or clay. In this connection, as represented by the decision element 205, the question "is SI greater than $(SI)_{13}$" is asked. If SI exceeds this limit value, the formation is presumed to have a preponderance of silt and if it is less, the formation is presumed to have a preponderance of clay. For those data points falling in the silty class, a running average of normalized gamma ray $(GR \cdot \rho_b)$ $V_{clay}$ and $V_{silt}$ are computed as represented by the block 206. The same operation is performed for the data points which fall into the clay class as represented by the block 207. The equations for steps 206 and 207 are the same as for step 203 (except for the sample designations $N_3$, $N_4$ and $N_5$).

The computational data derived from the statistical routines of sweep 1 are stored in memory as represented by the blocks 25. If the level considered was not the last level, which question is asked by the decision element 226, the program proceeds to the next level as represented by the element 227 to run the same statistical routines for that level. If the presently considered level was the last level, the data stored in memory is utilized to compute SSP and $SP_{sh}$ from the SP statistics as represented by the block 228 in accordance with the following expressions:

$$SSP = \frac{(AVSP)_{sd}(AVC)_{sh} - (AVSP)_{sh}(AVC)_{sd}}{(AVC)_{sh} - (AVC)_{sd}} \quad (52)$$

$$SP_{sh} = \frac{(1 - (AVC)_{sd})(AVSP)_{sh} - (1 - (AVC)_{sh})(AVSP)_{sd}}{(AVC)_{sh} - (AVC)_{sd}} \quad (53)$$

The calibration coefficients A, B, and C from the Gamma Ray statistics are computed as represented by block 229 in accordance with the following:

Calling the results of the running averages made during the GR statistical routine in the following way:

| Running Averages | Sand Class | Silty Shale Class | Clay Class |
|---|---|---|---|
| $\sum \frac{1}{n} \rho GR$ | $G_1$ | $G_2$ | $G_3$ |
| $\sum \frac{1}{n} V_{clay}$ | $C_1$ | $C_2$ | $C_3$ |
| $\sum \frac{1}{n} V_{silt}$ | $S_1$ | $S_2$ | $S_3$ |

$$A = 1/\Delta[(S_1C_3 - S_3C_1)G_2 + (S_3C_2 - S_2C_3)G_1 + (S_2C_1 - S_1C_2)G_3] \quad (54)$$

$$B = 1/\Delta[(C_1 - C_3)G_2 + (C_3 - C_2)G_1 + (C_2 - C_1)G_3] \quad (55)$$

$$C = 1/\Delta[(S_3 - S_1)G_2 + (S_2 - S_3)G_1 + (S_1 - S_2)G_3] \quad (56)$$

where $$\Delta = (S_2C_1 + S_1C_3 + S_3C_2) - (S_2C_3 + S_1C_2 + S_3C_1)$$

Before proceeding to discuss sweep 2, it would first be desirable to summarize the operation of sweep 1. As discussed earlier, the purpose of sweep 1 is to run statistical analyses on a number of parameters used for $V_{sh}$ determination from the shale indicators. Since accurate determinations of $V_{sh}$ given by the shale indicators is necessary before a complete interpretation analysis of the data can be performed, it is assumed, as a first approximation, that the data from all depth levels exhibits an insignificant hydrocarbon effect. Having made this assumption, it is possible to solve equations 4, 5, 8, 9, 34, 35 and 36 and to use the results in calibrating the shale indicators. Having a first approximation of the calibration parameters for the shale indicators, it is now possible to compute values of $V_{sh}$ from the shale indicators and thus examine the effect of hydrocarbon on the derived data. This is the function of sweep 2.

Unfortunately, if there is a significant hydrocarbon effect in the formations being investigated, the calibration coefficients for the shale indicators which were derived during sweep 1 will be inaccurate and thus values of $V_{sh}$ derived from the shale indicators will also be inaccurate. It therefore follows that the interpretation analysis made during sweep 2 would also be inaccurate. Therefore, the results produced from sweep 2 will not be outputted as the final results but will instead be utilized to recalibrate the shale indicators, this time taking into account the hydrocarbon effect. After this recalibration operation during sweep 2, the calibration coefficients for the shale indicators will be substantially accurate and thus can be utilized during a final sweep to produce a complete and accurate analysis of the data. Thus it can be said that sweep 2 is for the purpose of recalibrating the shale indicators for the effect of hydrocarbon.

Figure 20A:
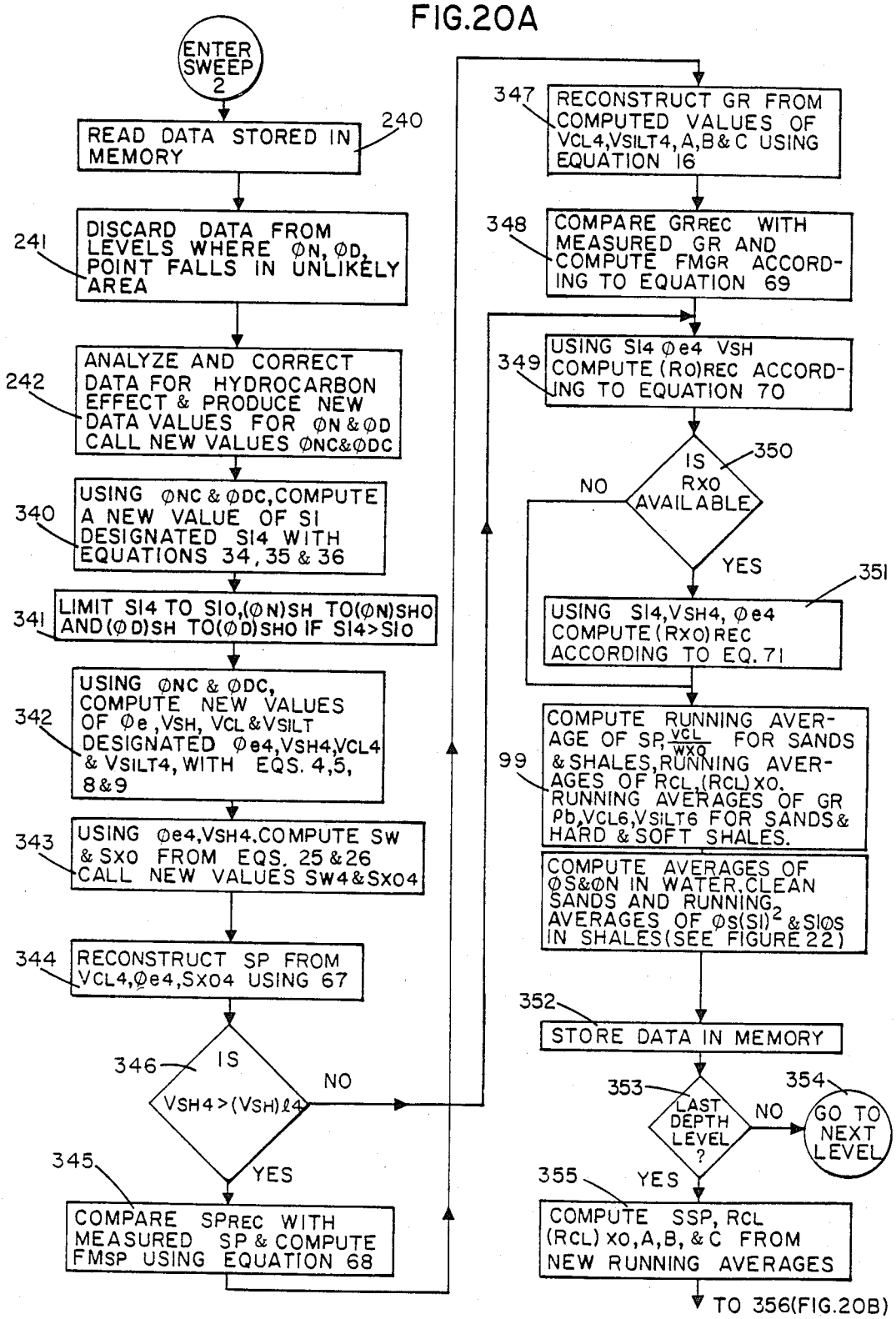
FIGS. 20A and 20B are flow diagram representations of a second sweep of the interpretation pass and which will be hereinafter referred to simply as FIG. 20.
Figure 20B:
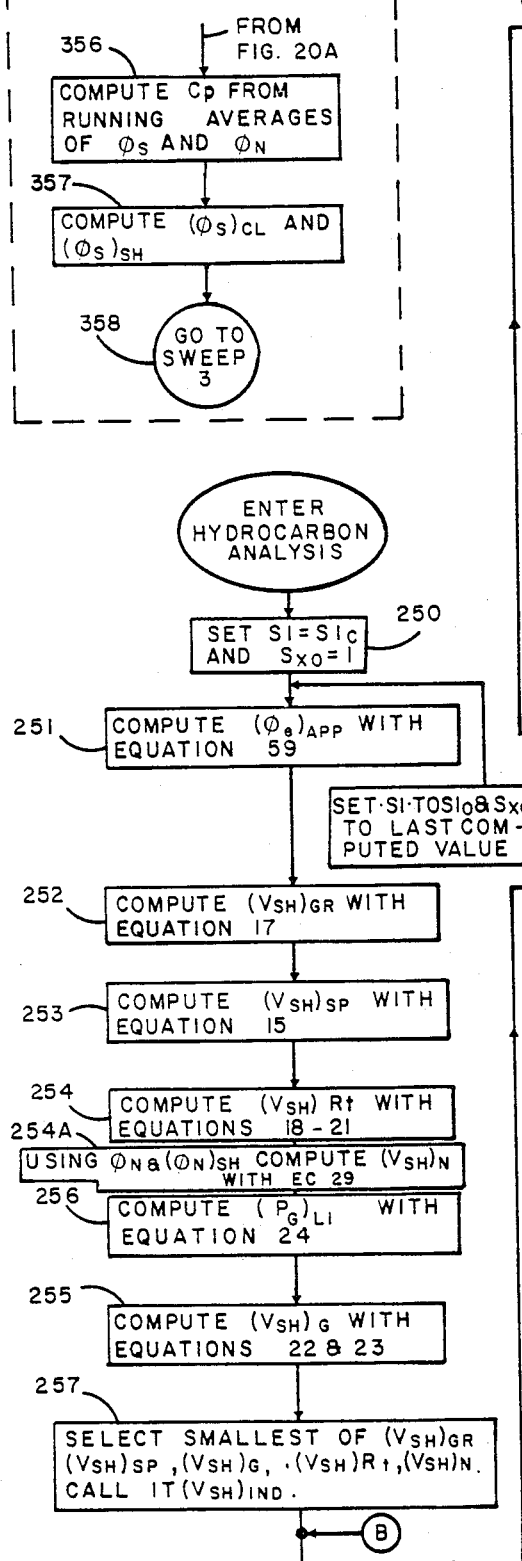

Turning now to FIG. 20, there is shown a flow diagram representing the operations performed in sweep 2. After entering sweep 2, the data representing the constant parameters and calibration coefficients which have been stored in the memory, are read as represented by the block 240. As in sweep 1, the data from levels where the $\phi_N$, $\phi_D$ points fall in the unlikely area are discarded, as represented by block 241. Next, that data which has not been discarded is analyzed and corrected for hydrocarbon effect to produce new data values for $\phi_N$ and $\phi_D$, designated $\phi_{NC}$ and $\phi_{DC}$ as represented by the block 242. This step comprises the operations depicted by vectors 47, 48, and 49 in FIG. 15.

Before proceeding with the remainder of sweep 2, it would be desirable to discuss the operations performed in Step 242. Thus referring to FIG. 21 there is shown the hydrocarbon analysis portion of the program in detail.

After entering the hydrocarbon analysis routine, the value for silt index SI is initially set equal to $SI_0$ and $S_{xo}$ is set equal to 1 as represented by the block 250.

Next, $(V_{sh})_{GR}$ is computed in accordance with equation (17) utilizing the calibration coefficient A, B and C computed during sweep 1, as represeted by the block 252.

Next, $(V_{sh})_{SP}$ is computed using values of SSP and $(SP)_{sh}$ computed in sweep 1, $S_{xo}=1$, and $W_{clay}$ determined from the crossplot (block 253). It will be noted that equation (15) for $(V_{sh})_{SP}$ includes the term $\phi_e$. No value of $\phi_e$ is available at this time. To get around this, a first approximation to $\phi_e$, designated $(\phi_e)_{app}$ is computed with the following expression:

$$(\phi_e)_{app} = \sqrt{\tfrac{1}{2} \cdot (\phi_N - (V_{sh})_{SP}(\phi_N)_{sh})^2 + (\phi_D - (V_{sh})_{SP}(\phi_D)_{sh})^2} \quad (59)$$

Since $(V_{sh})_{SP}$ is a term in equation (59), equations (15) and (59) are solved simultaneously to derive a value of $(V_{sh})_{SP}$. Then, as represented by the blocks 254 and 254a $(V_{sh})_{Rt}$ and $(V_{sh})_N$ are computed with equations (18) through (21) and (29), respectively.

The next step 1 as represented by block 255, is to compute a value for the shale indicator $(V_{sh})_g$ with equations (22) and (23) using the Neutron and Density derived porosity parameters for the characteristic shale $SH_0$, i.e., $(\phi_N)_{sh}$ and $(\phi_D)_{sh}$ and a computed value of the gas density limit, $(\rho_G)_{lim}$. This last parameter $(\rho_G)_{lim}$ is computed from equation (24), as represented by the block 256.

The five shale indicators just discussed, i.e., $(V_{sh})_{GR}$, $(V_{sh})_{SP}$, $(V_{sh})_{Rt}$, $(V_{sh})_N$ and $(V_{sh})_g$, are considered to be the most reliable of the shale indicators. Therefore, these four indicators are utilized, at least initially to determine the vlaue of $(V_{sh})_{ind}$. As represented by the block 257, $(V_{sh})_{ind}$ is set equal to the smallest of these four shale indicators. As will be discussed later, other shale indicators are introduced if inconsistencies appear in the results.

Having a value for $(V_{sh})_{ind}$, it is now possible to correct the $\phi_N$ and $\phi_D$ data points for shaliness. To this end values of $\psi_D$ and $\psi_N$ are computed with equations (37) and (38) as represented by the block 258.

Now that the $\phi_N$, $\phi_D$ data has been corrected for shaliness with the shale indicator $(V_{sh})_{ind}$, the next step is to determine the position of the corrected data point $\psi_N$, $\psi_D$ relative to the 45° clean sand line. It will be recalled from the discussion of FIG. 15 that if the corrected data point falls on or near the 45° sand line, the hydrocarbon analysis portion of the program is completed. Then, the original data point is analyzed for $V_{sh}$, $\phi_e$, SI. On the other hand, if the corrected data point falls either above or below the clean sand line, further steps must be taken.

In the connection, as represented by the decision element 260, the question "Is $\psi_D$ less than $\psi_N$" is asked. If the answer is no, it is next determined whether $\psi_N$ is approximately equal to $\psi_D$, as represented by the decision element 261, i.e., is the corrected data point on or with in a given range of the 45° clean sand line. If the answer is yes, i.e., if the corrected data point is on or near the clean sand line, the program exits the hydrocarbon analysis routine after setting the corrected $\phi_N$ and $\phi_D$ values, designated $\phi_{NC}$ and $\phi_{DC}$, equal to the original value of $\phi_N$ and $\phi_D$, as represented by the elements 262 and 263.

If the corrected data point had fallen above the 45° line, the underlying assumptions of the method would be satisfied. In other words, since all of the shale indicators are supposed to give indications of $V_{sh}$ which are either equal to or greater than the true $V_{sh}$, the shale corrected data point $\psi_N$, $\psi_D$ should fall either on or above the clean sand line. If the shale corrected data point falls above the clean sand line, it can be assumed that either $(V_{sh})_{ind}$ was too large or that a hydrocarbon effect does exist. Both of these assumptions come within the basic underlying premise of the method. However, if the shale corrected data point falls below the 45° line, it can only be assumed that the derived measurements themselves were inaccurate or did not fit the model, or that one or more of the constants have been incorrectly selected. In this event, the program proceeds to make certain tests to determine what is wrong and to make suitable corrections.

Before continuing with the discussion of the hydrocarbon analysis routine, it would first be desirable to discuss some notations used in this routine. The subscript "C" is placed after data which has been finally corrected. Thus, $\psi_{NC}$ and $\psi_{DC}$ represent the final shale corrected data points and $\phi_{NC}$ and $\psi_{DC}$ represent the final hydrocarbon corrected (if any) data values which are outputted from the hydrocarbon analysis routine. Graphically speaking, in FIG. 15, $\phi_{NC}$, $\phi_{DC}$ would represent the point 58a and $\psi_{NC}$, $\psi_{DC}$ would represent the point 53. Those parameters with numeral subscripts, i.e., $\phi_{N1}$, $\phi_{D2}$, etc. represent interim data values.

Concerning first the case where the shale corrected data point falls below the line, a test is made to determine if $\phi_N$ is less than a given limit value representing the $\phi_N$ value of the limit parabola. If it is not, the shale corrected data point $\psi_N$, $\psi_D$ is moved to the 45° clean sand line along a constant $\phi_D$ line, as represented by the vector 65 in FIG. 15, the original data point is then corrected by the same amount.

Figure 21A:
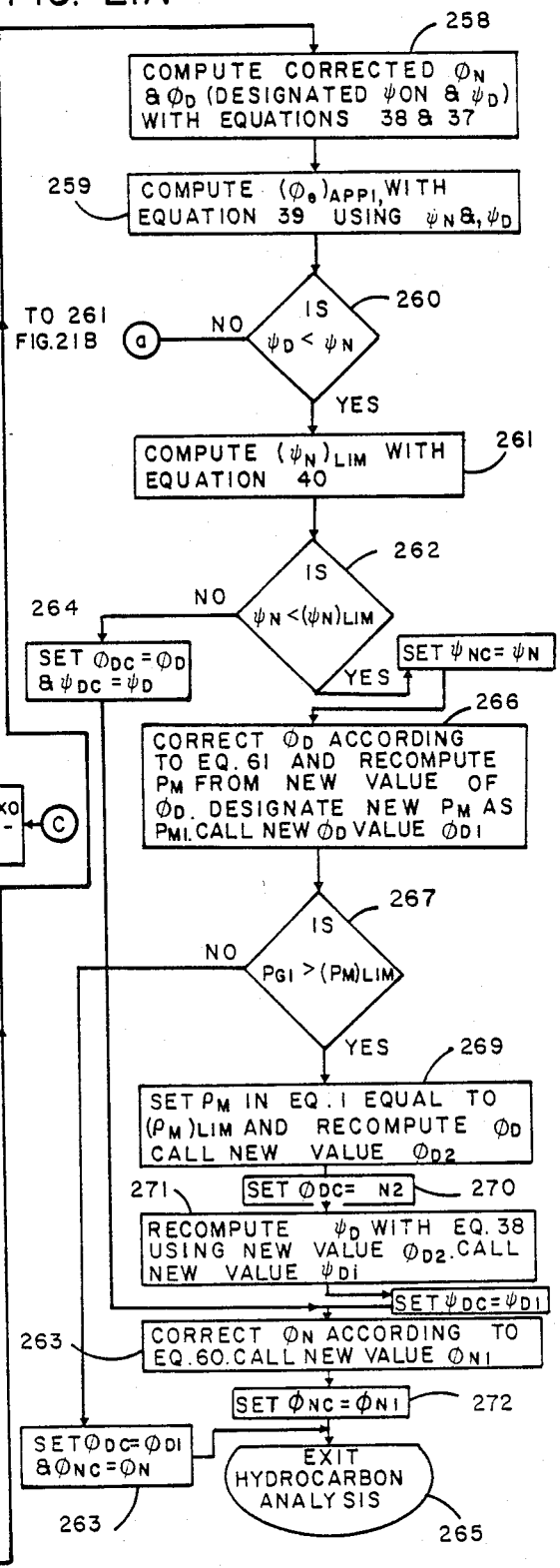
Figure 21B:
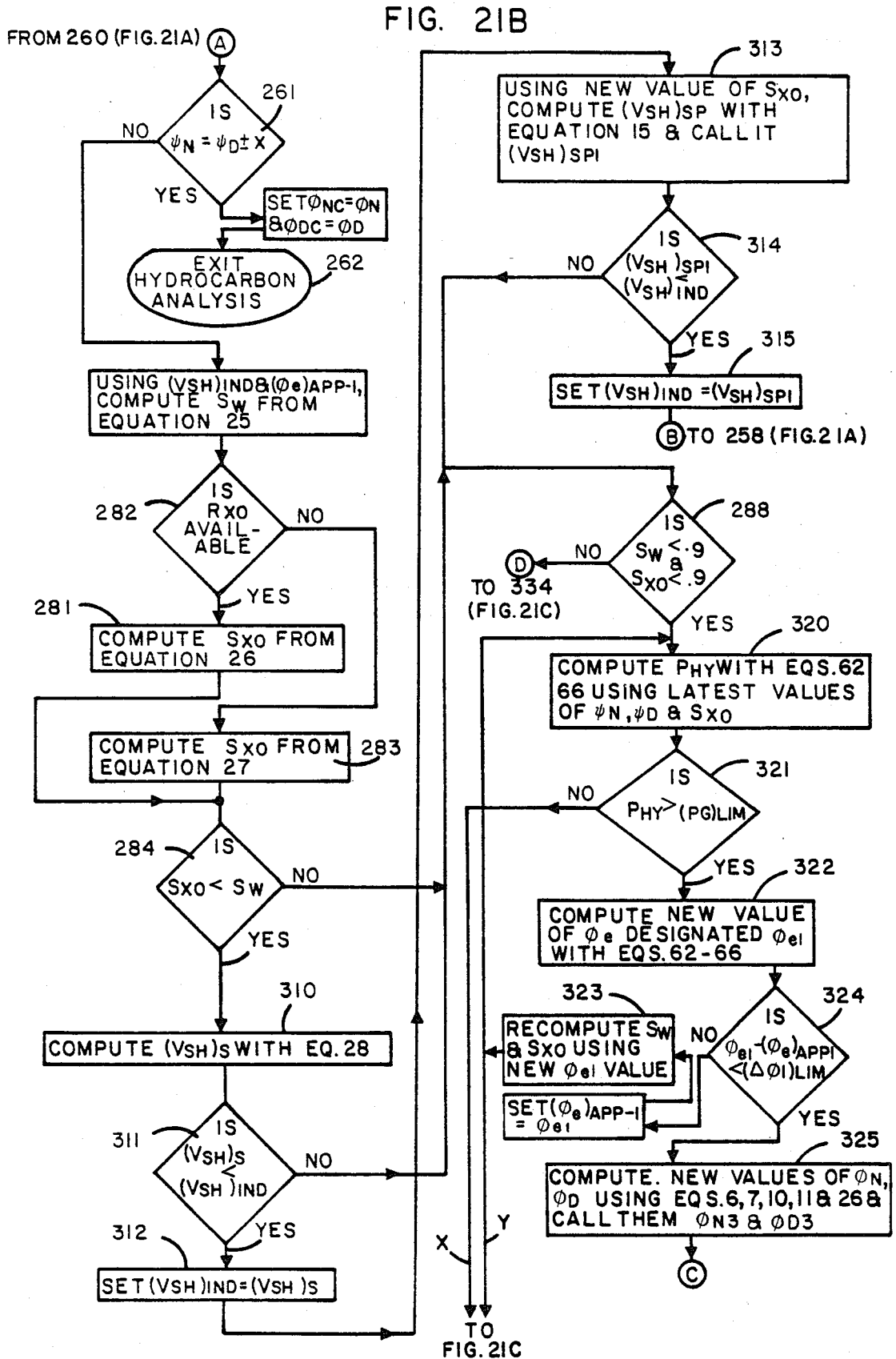

In FIG. 21, to accomplish this, the limit value for $\psi_N$, designated $(\psi_N)_{lim}$, is computed with equation 40, as represented by block 261. Next, as represented by the decision element 262, $\psi_N$ is checked against $(\psi_N)_{lim}$. If $\psi_N$ is greater than $(\psi_N)_{lim}$, i.e., $\psi_N$ is out of limits, as depicted in block 263, a corrected value of $\phi_N$ is computed in accordance with the following expression:

$$\phi_N = \psi_{DC} + (V_{sh})_{ind} \cdot (\phi_N) \quad (60)$$

As depicted by block 264, the final shale corrected density tool value $\psi_{DC}$ is set equal to the $\psi_D$ value computed in step 258. This new value of $\phi_N$ is designated $\phi_{N1}$ to distinguish it from the original $\phi_N$.

The computation of $\phi_{N1}$ in step 263 corresponds to moving the original data point, $\phi_N$, $\phi_D$, an amount equal to the correction applied to the $\psi_N$, $\psi_D$ point. Thus, in FIG. 15, it would correspond to moving the original data point 63 to the point 66a.

Since only the neutron data is altered, the final value of $\phi_D$ outputted from the hydrocarbon analysis, designated $\phi_{DC}$, is set equal to the original measured value $\phi_D$. This operation is depicted by block 264. As depicted by block 272, $\phi_{NC}$ is set equal to $\phi_{N1}$ computed in step 263.

Returning to decision element 262, if $\psi_N$ is within limits, the program proceeds to determine what change of the matrix grain density, $\rho_M$ would be required to move the $\psi_D$, $\psi_N$ point over the 45° line. Then, as represented by the block 266, $\phi_D$ is corrected according to the following expression:

$$\phi_D = \psi_{NC} + (V_{sh})_{ind} \cdot (\phi_D)_{sh} \qquad (61)$$

Since only the density data is being corrected at this time, $\psi_{NC}$ is set equal to $\psi_N$, as represented by block 273.

This new value of $\phi_D$ is designated $\phi_{D1}$. Equation (61) has the effect of moving the data point to the clean sand line by making $\psi_{NC} = \psi_{DC}$.

Using $\phi_{D1}$, the value of $\rho_M$ is recomputed and designated $\rho_{M1}$. With this new matrix density parameter $\rho_{M1}$, it is now possible to check if $\rho_{M1}$ is greater than a value of grain density which is known by local experience to be unlikely to be exceeded. This limit value is labled $(\rho_M)_{lim}$. This function is represented by the decision element 267. If $\rho_{M1}$ is less than $(\rho_M)_{lim}$, it means that the full correction is possible with the density measurement $\phi_D$, i.e., it means that the data point can be moved to the 45° sand line without $\rho_M$ exceeding this limit. Thus, $\phi_{DC}$ is set equal to $\phi_{D1}$ computed in step 266 and $\phi_{NC}$ is set equal to the original data point $\phi_N$. In FIG. 15, this corresponds to moving the data point from the position 63 to the position 68a. This operation is depicted by block 268.

If the total $\phi_D$ correction cannot be made because of $\rho_{M1}$ exceeding its limit, $\rho_M$ in equation 1 is set equal $(\rho_M)_{lim}$ and $\phi_D$ is re-computed, as represented by the block 269. Since this new value of $\phi_D$, designated $\phi_{D2}$, represents the maximum acceptable correction for $\phi_D$, i.e., the maximum movement of the shale corrected data point 64 of FIG. 15 towards the clean sand line, the final corrected value $\phi_{DC}$ can now be set equal to $\phi_{D2}$, as represented by the block 270.

At this stage, the corrected data point has not reached the clean sand line because of the limit $(\rho_M)_{lim}$. To bring the data point the remainder of the way to the clean sand line, $\psi_D$ is re-computed with equation (37) using the new value $\phi_{D2}$, as represeted by the block 271. Then a new value of $\phi_N$ is computed according to equation (60), as represented by the block 263. This new value $\phi_{N1}$ is set equal to $\phi_{NC}$ and the hydrocarbon analysis routine is exited as rpresented by blocks 272 and 265. The operation of blocks 217, 263 and 272 corresponds to, in FIG. 15, moving the shale corrected data point to the 45° sand line by changing $\psi_N$. Thus, the original data point would change to a new $\phi_N$ value.

The discussion to this point in FIG. 21 has concerned the analysis which is undertaken when the shale corrected data point falls below or to the right of the clean sand line. Now consider what happens when the shale corrected data point falls above or the left of the clean sand line. As discussed earlier, this corresponds with the basic premises of the interpretation method of the present invention in that it indicates that either a hydrocarbon effect exists or that $(V_{sh})_{ind}$ is greater than the true $V_{sh}$.

When the shale corrected data point falls above the clean sand line, the deep and shallow resistivity measurements $R_t$ and $R_{xo}$ are utilized to determine which of these two conditions exists. To this end, first approximations of $S_w$ and $S_{xo}$ are computed from equations (25) and (26) using $(V_{sh})_{ind}$ and $(\phi_e)_{app\,1'}$ as represented by blocks 280 and 281. If an $R_{xo}$ measurement is not available, which question is asked by the decision element 282, $S_{xo}$ is computed from equation (27) using the value of $S_w$ derived in step 280, as represented by the block 283.

Now, having first approximation values of $S_{xo}$ and $S_w$, it is possible to compare $S_{xo}$ with $S_w$ to determine if the saturation computations $S_w$ and $S_{xo}$ appear to be feasible. This test is depicted by the decision element 284.

As discussed earlier, it is known that $S_{xo}$ must be equal to or greater than $S_w$. If $S_{xo}$ is greater than $S_w$, i.e., the answer given by decision element 284 is "no", it is initially assumed that something is wrong with $(V_{sh})_{ind}$. (From equations (25) and (26), it can be seen that $V_{sh}$ is a parameter in deriving $S_w$ and $S_{xo}$, the value being used for $V_{sh}$ in these equations at this time being $(V_{sh})_{ind}$.)

In this event, the $R_t$ and $R_{xo}$ measurements are utilized to compute a new shale indicator $(V_{sh})_{SI}$ in an attempt to provide a value of $V_{sh}$ less than $(V_{sh})_{ind}$.

In FIG. 21, $(V_{sh})_s$ is computed utilizing equation 28, as represented by element 310. Then, as represented by the decision element 311, a test is made to determine if $(V_{sh})_s$ is less than $(V_{sh})_{ind}$. If $(V_{sh})_s$ is less, then $(V_{sh})_{ind}$ is set equal to $(V_{sh})_s$ as represented block 312.

A further check can be made on $(V_{sh})_{ind}$. Since test 284 has indicated $S_{xo}$ to be less than $S_w$, and thus presumably less than 1, a new $(V_{sh})_{SP}$ can be computed taking the hydrocarbon effect into account, i.e., a value of $S_{xo}$ from either steps 281 or 283 is available for use in equation (15). (Remember that $S_{xo}$ was initially set equal to "one" in step 250. This operation is depicted by block 313 and the new value of $(V_{sh})_{SP}$ is designated $(V_{sh})_{SP1}$. As represented by the decision element 314, a test is then made to determine if this new value of $V_{sh}$ is less than $(V_{sh})_{ind}$. If it is less, $(V_{sh})_{ind}$ is set equal to this new value $(V_{sh})_{SP1}$ as represented by block 315.

With a new lower value of $(V_{sh})_{ind}$, those computations which require $(V_{sh})_{ind}$ as a parameter can now be improved since a new more accurate value for $(V_{sh})_{ind}$ is available. Thus, after setting $(V_{sh})_{ind}$ equal to $(V_{sh})_{SP1}$, this new value of $(V_{sh})_{ind}$ is introduced back into the program just prior to the $\psi_N$, $\psi_D$ computation step 258. The program then recomputes $\psi_N$ and $\psi_D$ and goes through all of the analysis discussed above. If, after the second time through this portion of the program, $S_{xo}$ is still less than $S_w$, $(V_{sh})_{SP1}$ is recomputed using the newest $(\phi_e)_{app\,1}$ and $S_{xo}$ data. If the newest $(V_{sh})_{SP1}$ value is still less than the new value of $(V_{sh})_{ind}$, the program recycles again. This continues over and over again until this portion of the program is exited either by the $S_{xo} < S_w$ test 284 being satisfied or $V_{sh}$ values lower than the last $(V_{sh})_{ind}$ value being no longer computed.

Upon either event taking place, the program next determines if the $R_t$ and $R_{xo}$ data is indicating the presence of hydrocarbons, i.e., the "no" answers from decision element 284, 311 and 314 carry the program to a dcision element 285. If the resistivity tools indicate the presence of hydrocarbons, it only remains to make the hydrocarbon effect correction to the original measured $\phi_N$, $\phi_D$ data. While this correction is being made, the program insures that the computed hydrocarbon density is at least equal to the density of gas $(\rho_g)_{lim}$ computed in block 256.

To accomplish this in FIG. (21) a test is then made to determine if $S_w$ and $S_{xo}$ are both less than a given value approximating 1. In this example, the given value is 0.9. The asking of this question is depicted by the decision element 285.

Next, as represented by block 320, the hydrocarbon density is computed using the last values of $\psi_N$ and $\psi_D$ computed in step 258 and the last value of $S_{xo}$ computed in either step 281 or 283.

The following equations are solved simultaneously:

$$F = 1 + 7(1 + 2(\phi_e)_{app}S_{xo})\psi_D/\psi_N \tag{62}$$

$$M = 45F \tag{63}$$

$$N = 128 + 77F - 35\frac{\psi_D/\psi_N - 1}{1 - S_{xo}} \tag{64}$$

$$R = 128 + 32F - 224\frac{\psi_D/\psi_N - 1}{1 - S_{xo}} \tag{65}$$

$$M\rho_{hy}^2 - N\rho_{hy} + R = 0 \tag{66}$$

This corresponds to solving for $\rho_{hy}$ in the set of equations giving $\phi_N$, $\phi_D$ for clean formations (8), (9) together with equations (10) and (11) relating $(\phi_D)_{hy}$ and $(\phi_N)_{hy}$ to the density $\rho_{hy}$ and the $S_{xo}$ equation (26). This operation is depicted in block 320.

The value of $\rho_{hy}$ computed in step 320 is compared with $(\rho_G)_{lim}$ which has been previously computed, as represented by the decision element 321. If $\rho_{hy}$ is within limits, i.e., the answer is "yes", a new value of $\phi_e$, designated $\phi_{e1}$, if computed through a simultaneous solution of equations (6), (7), (10), (11) and (26) as represented by the block 322. Next, this $\phi_{e1}$ value is compared with the earlier computed $(\phi_e)_{app\ 1}$, as represented by decision element 324, and if they differ by more than a limit value designated $(\Delta\phi_e)_{lim}$, a new value $(\phi_e)_{app\ 1}$ is taken, equal to $\phi_{e1}$, (block 323a) and new values of $S_w$ and $S_{xo}$ are computed using this new value, as represented by the block 323. This new value is then utilized to compute the new value of $\rho_{hy}$, i.e., the program returns to step 320. The program continues to circle through this loop until the newly computed values of $\phi_{e1}$ and $(\phi_e)_{app\ 1}$ becomes approximately equal, at which time new values of $\phi_N$ and $\phi_D$ are computed using the last computed values of $\phi_{e1}$, $S_{xo}$, and $(V_{sh})_{ind}$ in equations (6), (7), (10), (11) and (26), as represented by the block 325. The new $\phi_N$ and $\phi_D$ values are designated $\phi_{N3}$ and $\phi_{D3}$. These values are the ones corrected for any hydrocarbon effect and therefore may be used to recompute $V_{sh}$, $\phi_{e2}$, SI, $(\phi_D)_{sh}$, $(\phi_N)_{sh}$.

The purpose of this loop is to improve the value of $(\phi_e)_{app\ 1}$ and, therefore the values of $S_{xo}$ and $\rho_{hy}$. Initially the value of $(\phi_e)_{app\ 1}$ was only an approximation which could not take into account the exact value of hydrocarbon effect on the porosity tools, because the exact value of $\rho_{hy}$ was not yet known. After each successive approximation of $\rho_{hy}$ on this loop, more exact values of $\phi_e$ can be evaluated.

After these new values of $\phi_N$ and $\phi_D$ have been computed in step 325, new values of SI, $V_{sh}$ and $\phi_e$ can be computed. Of these values, SI is of particular interest because it was assumed that $SI = SI_o$ when computing $(V_{sh})_{ind}$. The new value SI which is more correct, will be used now to recompute new values of $(V_{sh})_{ind}$ by returning to block 252. Also the true value $S_{xo}$ will be used in the computation of the SP shale indicator. These values are set in block 328 and the data goes through the same analysis again. These new values are entered into the program just ahead of step 252.

It has been found that this recycling operation with the new data values SI and $S_{xo}$ is, at the most, necessary only once. Thus, as represented by decision element 326, the hydrocarbon analysis routine is exited (see element 328) after one pass through this decision element 326.

Referring back to the decision element 321, if the computed $\rho_{hy}$ value had failed the limit test, it is first assumed that $S_{xo}$ is reading too low. As a check on this, another $S_{xo}$ value is computed from equation (27) using the computed value of $S_w$, as represented by the block 330. Then, as represented by element 331, a test is made to determine if $(S_{xo})_w$ is greater than the last computed value of $S_{xo}$ (Step 281 or 323). If it is less than $S_{xo}$, it is assumed that the $R_{xo}$ measurement was erroneous and $S_{xo}$ is set equal to $(S_{xo})_w$, as represented by the block 332. With this new value of $S_{xo}$, the program returns to the step 320 to recompute $\rho_{hy}$.

If the new value of $S_{xo}$ brings the computed value of $\rho_{hy}$ above the limit, the program proceeds as discussed earlier with this new value of $S_{xo}$. On the other hand, if the new computed value $\rho_{hy}$ is still too low, this indicates that the cause of wrong values of $\rho_{hy}$ was not a bad $R_{xo}$ value but excessive value of $(V_{sh})_{ind}$. The program then branches to block 334 by the following process: it recomputes a value of $(S_{xo})_w$ (block 330) which is evidently equal to the value $S_{xo}$ (because $S_{xo}$ has been already set to $(S_{xo})_w$ in block 332).

Then the decision making block 331 recognizes that both $S_{xo}$ and $(S_{xo})_w$ are equal and therefore branches to block 334 whose function is to decrease $(V_{sh})_{ind}$ by 1% before re-entering the program just ahead of step 258 with this new value of $(V_{sh})_{ind}$. Then the program proceeds as explained next.

If $(S_{xo})_w$ computed in step 330 turns out to be greater than $S_{xo}$ derived from equation 27, the program presumes that the $R_{xo}$ measurement is not at fault and instead assumes that $(V_{sh})_{ind}$ is too large. In this event, as represented by block 334, $(V_{sh})_{ind}$ is decreased by 1% and entered into the program just ahead of step 258. The program proceeds to take this lowered value $(V_{sh})_{ind}$ and go through the entire analysis discussed above. The program will continue to recycle and recycle, each time decreasing $(V_{sh})_{ind}$ by 1% until an exit from the hydrocarbon analysis routine is found. For example, graphically speaking, the shale corrected data point may eventually be brought back to a location near the clean sand line and thus the decision element 261 will cause an exit from the hydrocarbon analysis routine, etc.

At this point, the hydrocarbon analysis has been completed and new corrected values of $\phi_N$ and $\phi_D$, designated $\phi_{NC}$ and $\phi_{DC}$, are available for analysis by the remainder of sweep 2.

Now returning to FIG. 20, sweep 2 uses these new values $\phi_{NC}$ and $\phi_{DC}$ to compute a new value of SI using equations (34), (35) and (36), as represented by the block 340. This new value of SI is designated $SI_4$. As before, $SI_4$ is limited to $SI_o$ if it is greater than $SI_o$, as represented by block 341. Along with this, $(\phi_N)_{sh}$ and $(\phi_D)_{sh}$ are limited to $(\phi_N)_{sho}$ and $(\phi_D)_{sho}$ if $SI > SI_o$. Next, new values of $\phi_e$, $V_{sh}$, $V_{Cl}$ and $V_{silt}$ are computed using equations (4), (5), (8) and (9) as represented by block 342. These new values are designated $\phi_{e4}$, $V_{sh4}$, $V_{Cl4}$ and $V_{silt4}$. With these new values of $\phi_{e4}$ and $V_{sh4}$, it is now possible to compute new values of $S_w$ and $S_{xo}$ using equations (25) and (26). This operation is depicted in block 343.

At this point, the analysis of the measured $\phi_N$ and $\phi_D$ data has been completed for sweep 2 and the corrected $\phi_N$ and $\phi_D$ data can now be used to rerun the statistical analyses to define the calibration parameters for the shale indicators.

In addition to recalibrating the shale indicators, sweep 2 also computes the sonic compaction correction factor $C_P$, calibrates the sonic data and produce synthetic spontaneous potential, gamma ray, and resistivity data derived from the equations used in the statistical routines. This synthetic data is then compared with the measured data to give indication of the figure of merit and the statistical routines.

Now concerning how the synthetic data is produced, in FIG. 20, the spontaneous potential is reconstructed using the values of $V_{clay}$, $\phi_e$ and $S_{xo}$ computed in steps 342 and 343, i.e., $V_{clay4}$, $\phi_{e4}$ and $S_{xo4}$, as well as the values of SSP and $SP_{sh}$ computed during sweep 1. The expression for the reconstructed SP is $$SP_{rec} = SSP - \frac{V_{clay}}{\phi_e S_{xo} + W_{clay} V_{clay}} (SSP - SP_{sh}) \quad (67)$$

This function is represented by block 344. This reconstructed SP value is a synthetic value derived from the equation (9a).

If the SP data was properly calibrated, the reconstructed SP value should be substantially the same as the measured SP value.

A figure of merit for the SP, designated $FM_{SP}$, is computed by comparing the reconstructed SP, $SP_{rec}$ with the measured SP, as represented by block 345. The expression for this SP Figure of Merit is:

$$FM_{SP} = \left( \frac{SP_{rec} - SP}{SSP - SP_{sh}} \right) \quad (68)$$

A decision element 346 determines if $V_{sh4}$ is greater than a limit value thereof and bypasses step 345 if $V_{sh4}$ is too large. The reason is that we are interested in the quality of the reconstruction of the SP only where the SP is important as a shale indicator to determine by hydrocarbon effect. Hydrocarbons appear in sands and not shales. Thus, the quality of reconstruction of the SP in shale has no practical significance for present purposes.

A reconstructed gamma ray is also computed from the values of $V_{C14}$ and $V_{silt4}$, as well as the calibration coefficients A, B and C computed in sweep 1, according to equation (16). This function is represented by block 347. The reconstructed gamma ray, designated $GR_{rec}$, is compared with the measured gamma ray and a figure of merit for the gamma ray, designated $FM_{GR}$, is computed according to the following expression:

$$FM_{GR} = \left( \frac{GR_{rec} - GR \cdot \rho_b}{BSI_o + C(1 - SI_o)} \right)^2 \quad (69)$$

This function is represented by block 348. As for the SP, the quality of merit of the reconstruction of GR is of practical importance only when the formation is not too shaly and therefore is computed when $V_{sh}$ is not too large. When this is not the case, the decision element 346 causes the program to bypass the gamma ray reconstruction and comparison.

Both $FM_{SP}$ and $FM_{GR}$ are averaged on a running basis to provide figures of merit for data over the entire formation section of interest.

Next, using $SI_4$, $\phi_{e4}$ and $V_{sh4}$, the deep resistivity measurement $R_t$ is reconstructed, assuming 100% water bearing formation of resistivity $R_w$, in accordance with the following:

$$(R_0)_{rec} = \frac{R_w R_{clay}}{(1 - SI)^2 V_{sh} R_w = 1.25 \phi_e R_{clay}} \quad (70)$$

(The term $R_0$ is used here because it has come to be the designation for the resistivity of a formation where $S_w = 1$.) This function is represented by block 349. The reconstructed $R_t$ is designated $(R_0)_{rec}$. Next as represented by the decision element 350 and block 351, the same operation is performed to reconstruct $R_{xo}$ according to the following equation if an $R_{xo}$ measurement is available:

$$(R_{xo})_{rec} = \frac{R_{mf} R_{clay}}{(1 - SI)^2 V_{sh} R_{mf} + 1.25 \phi_e R_{clay}} \quad (71)$$

These reconstructed resistivity values can be compared with the measured values to determine the presence of hydrocarbons.

Running averages of data to calibrate the SP, gamma ray and resistivity data are computed in the same manner as for sweep 1. Since sweep 2 has considered the hydrocarbon effect, the calibration coefficients will be more accurate after sweep 2 (if there is a hydrocarbon effect) thus after sweep 1.

Next the program enters a statistical routine to compute running averages of data which can be used to compute the acoustic or the sonic compaction correction factor $1/C_p$ and sonic response in shale in accordance with the techniques described in FIGS. 16 and 17.

First, concerning $1/C_p$, it will be recalled from the discussion of FIG. 16 that the slope of the line which best fits data points on a $\phi_S$ versus $\phi_N$ crossplot relative to the slope of the line representing $\phi_S/\phi_N = 1$ gives a statistically averaged value of $1/C_p$. However, as discussed earlier, this statistical averaging must utilize points derived from clean water sands. To insure that only such data points are utilized, a series of tests are run on the data from each depth level.

Referring to FIG. 22, step 210 determines if $V_{sh}$ computed in step 192 is greater than a limit value thereof. If $V_{sh}$ is less than this limit value, a test is made to determine if the sonic travel time readings $\Delta t$ are valid, i.e., to determine if they are low enough to insure the absence of a cycle skip effect. (Cycle skip is caused by a tool malfunction which causes the $\Delta t$ means to be too high. This test is performed by decision element 211. Next, a test is made to determine if the $V_{sh}$ value computed in step 192 is less than a limit value thereof, which limit value is less than the limit value given in decision element 210. This test is represented by the decision element 212.

If the test of decision element 212 is passed, the water saturation $S_w$ is computed from equation (25), as represented by the block 213, and a test is made to determine if $S_w$ is greater than a given limit value thereof as represented by the decision element 214. If the test of decision element 214 is passed, i.e., the clean sand formation is primarily water bearing, then a running average of $\phi_S/\phi_N$ is computed as represented by block 215. Since $\phi_S/\phi_N$ gives the slope of a line between the origin and the data point $\phi_S,\phi_N$ (see FIG. 16), a running average of $\phi_S/\phi_N$ will give the slope of the line 70 in FIG. 16 which represents a statistical fit of all of the points corresponding to a clean water sand. If any of these tests (211, 212 or 214) were failed (answer of No), the sonic statistical routine is exited.

To determine the response of the sonic log in shale, i.e., $(\phi_s)_{sh}$, in accordance with the operation depicted in FIG. 17, running averages of $\phi_S$, SI, SI² and SI×$\phi_s$ are computed for data derived from shale formations. To determine if a formation is primarily shaly, a series of tests are run, the first test being the $V_{sh}$ limit test represented by decision element 210. If this first test is passed, i.e., $V_{sh}$ is greater than the limit value therefor. Thereafter, tests to determine if $\Delta t$, SP and $R_t$ are less than given limits and if the gamma ray count rate is greater than a given limit are made as represented by decision elements 216, 217, 218 and 219. If all of these tests are passed, i.e., if the answer to each test is yes, running sum of $\phi_s$, SI, SI², and SI×$\phi_s$ for N (number of levels) are computed, as represented by block 220. If any one of these tests are failed, the program exits the sonic statistical routine.

The running averages from sweep 2 are stored in memory represented by the block 352. If the data being considered is derived from a depth level other than the last depth level, which question is asked by the decision element 353, the program then goes to the next level as represented by the element 354. If it is the last depth level, new values of SSP, $SP_{sh}$, $R_{Cl}$, $(R_{Cl})_{xo}$, A, B and C are computed from these new running averages, as represented by the block 355.

Additionally, the sonic travel time in shale of silt index $SI_o$, $(\phi_s)_{sh}$ is computed from the Sonic travel time statistics, as represented by block 357, in accordance with the following expressions:

$$(\phi_s)_{sh} = AS - BS(SI) \tag{71a}$$

$$AS = \frac{\Sigma(SI)^2 \Sigma \phi_s - \Sigma(SI) \cdot \phi_s}{N \cdot \Sigma(SI) - (\Sigma(SI))^2}$$

$$BS = \frac{\Sigma(SI)\Sigma \phi_s - \Sigma(SI) \cdot \phi_s}{N\Sigma(SI)^2 - (\Sigma(SI))^2}$$

The average of $\phi_S/\phi_N$ is automatically calibrated in terms of the sonic compaction factor $C_p$. (See block 356.) Then the program proceeds to sweep 2 as represented by the element 231.

Lastly, the program proceeds to sweep 3 as represented by element 358. As with the change from sweep 1 to sweep 2, the calibration coefficients are carried over to sweep 3. The original measured values of $\phi_N$ and $\phi_D$ are used for each depth level, the $\phi_N$, $\phi_D$ values computed during sweep 2 being discarded.

At this point, the shale indicators have been recalibrated to take into account the hydrocarbon effect and figures of merit have been computed to give an indication of the accuracy of the calibration performed during sweep 1. With properly calibrated shale indicators, it is now possible to run a complete analysis of the derived well logging measurements and produce computed output data for presentation. This is the function of sweep 3 which will be described next.

Figure 23A:
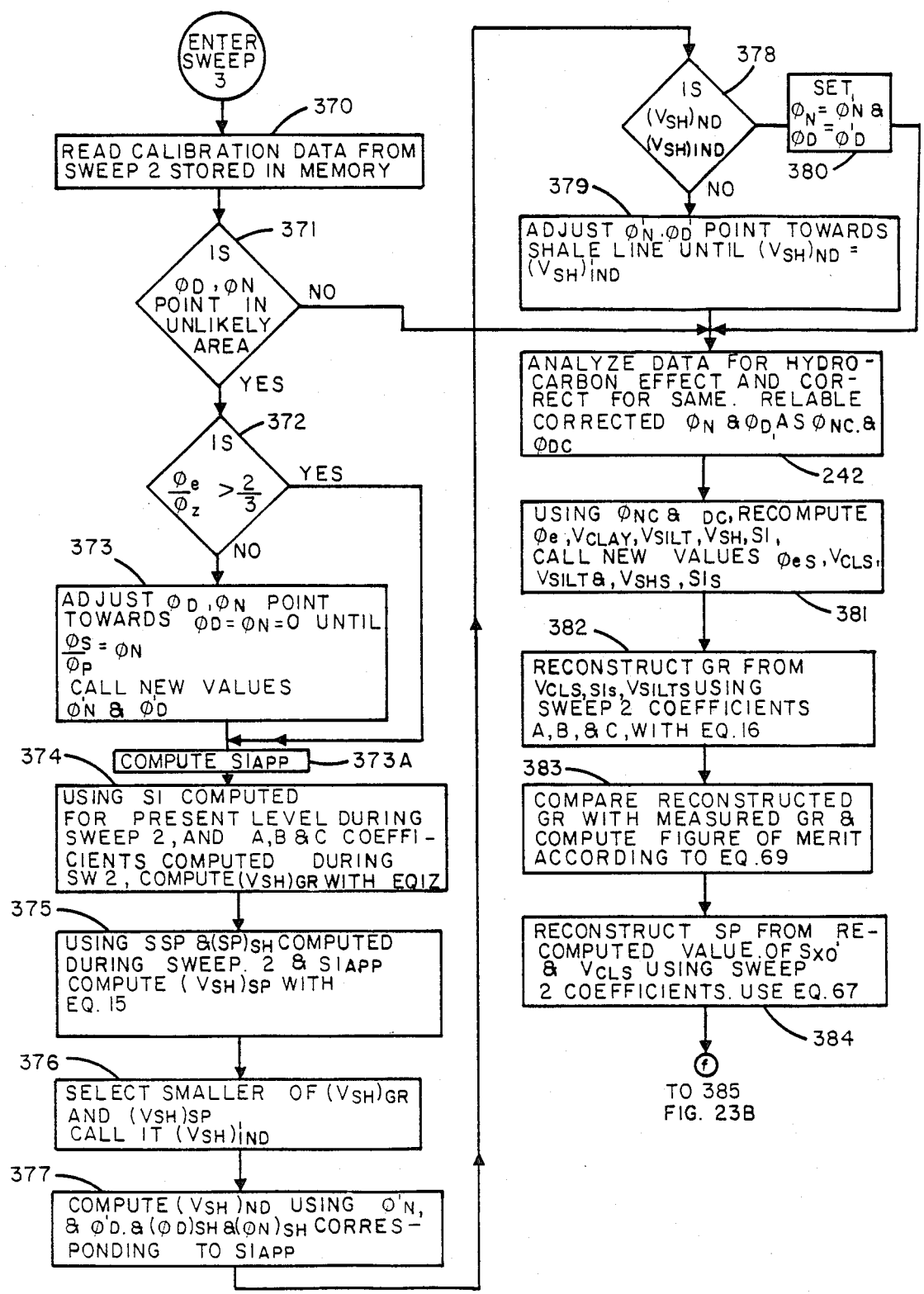

Referring now to FIG. 23, there is shown a flow diagram of the operation of sweep 3. In sweep 3, the calibration data from sweep 2 which has been stored in memory is read for use during sweep 2. It will be recalled that during sweeps 1 and 2, data falling in the unlikely area is discarded because of the possibility of its having an adverse effect on the statistical routines used for selecting the calibration coefficients. In sweep 3, data points in the unlikely area are corrected before being analyzed. The sonic derived porosity $\phi_s$ and $(V_{sh})_{ind}$ are utilized for this purpose.

As represented by the decision element 371, it is first determined whether the plotted data point $\phi_N$, $\phi_D$ is in the unlikely area, as represented by the decision element 371. This same test is performed in blocks 104 and 241 in sweeps 1 and 2. The technique for determining if a $\phi_N$, $\phi_D$ point is in the unlikely area has been discussed earlier.

If the data point does not fall in the unlikely area, the program then proceeds to analyze the data for hydrocarbon effect, as represented by block 242. This hydrocarbon analysis is identical with the analysis undertaken in sweep 2 and need not be discussed further at this point. If the data point does fall in the unlikely area, and if $\phi_e$ is less than two-thirds of $\phi_z$, which question is asked by the decision element 372, the $\phi_D$, $\phi_N$ point is adjusted towards the origin $\phi_D$, $\phi_N=0$ until $\phi_N$ becomes equal to $\phi_s/C_p$, as represented by block 373. These new values for $\phi_N$ and $\phi_D$ are designated $\phi_N'$ and $\phi_D'$.

Next, as represented by blocks 374, 375 and 376, gamma ray and SP shale indicators are utilized to compute $V_{sh}$ and the smaller of the two is selected. Before $(V_{sh})_{SP}$ and $(V_{sh})_{GR}$ can be computed, a value of S1 is neccessary. This value can, for example, be selected as the S1 of the shale point defined by the intersection of the shale line with a line from the sonic corrected data point to a point defined by the intersection of the W-Cl$_d$ line with the $\phi_N=0$ avis (See FIG. 2). How to accomplish this entails standard analytic geometry techniques and need not be discussed further here. The value of S1 so defined is labeled $S1_{app}$ and is computed in step 373a. Step 374 uses $S1_{app}$ and the calibration coefficients A, B and C computed during sweep 2 to compute $(V_{sh})_{GR}$ with equation (12). As represented by block 375, the calibration parameters SSP and $SP_{sh}$ computed during sweep 2, and $S1_{app}$, are utilized to compute $(V_{sh})_{SP}$ with equation (15). Then, as represented by block 376, the smaller of these two values of $V_{sh}$ are selected and called $(V_{sh})'_{ind}$. Next, another value for $V_{sh}$ is computed using the $\phi_N'$ and $\phi_D'$ values produced in step 373 with equations (8) and (9), as represented by block 377. As represented by block 378, a test is made to determine if this computed value of $V_{sh}$ computed in step 377, i.e., $(V_{sh})'_{ind}$ is greater than $(V_{sh})'_{ind}$ computed in step 376. If $(V_{sh})'_{ind}$ is less than $(V_{sh})'_{ind}$ the $\phi_N'$, $\phi_D'$ point is adjusted towards the intersection of the W-$\phi_d$ line with the $\phi_N=0$ line until $(V_{sh})'_{ind}$ is equal to $(V_{sh})'_{ind}$ as represented by block 379. The new values for $\phi_N$ and $\phi_D$ are used to enter the hydrocarbon analysis routine of step 242. If $(V_{sh})'_{ind}$ had been greater than $(V_{sh})'_{ind}$ the parameters $\phi_N'$ and $\phi_D'$ would have been used to enter the hydrocarbon analysis portion of the program.

After the new corrected values of $\phi_N$ and $\phi_D$, i.e., $\phi_{NC}$ and $\phi_{DC}$, have been produced by step 242, these new values are used to compute new values of $\phi_e$, $V_{clay}$, $V_{silt}$, $V_{sh}$ and SI, as represented by block 381. These new values are designated $\phi_{e5}$, $V_{Cl5}$, $V_{silt5}$, $V_{sh5}$ and $SI_5$. With the values of $V_{Cl5}$, $V_{silt5}$ and $SI_5$, as well as the gamma-ray calibration coefficients A, B and C computed during the sweep 2, the gamma ray is reconstructed as represented by block 382. Next, the reconstructed gamma ray is compared with the measured gamma ray and a figure of merit is computed according to equation (69) as represented by block 383.

Figure 24A:
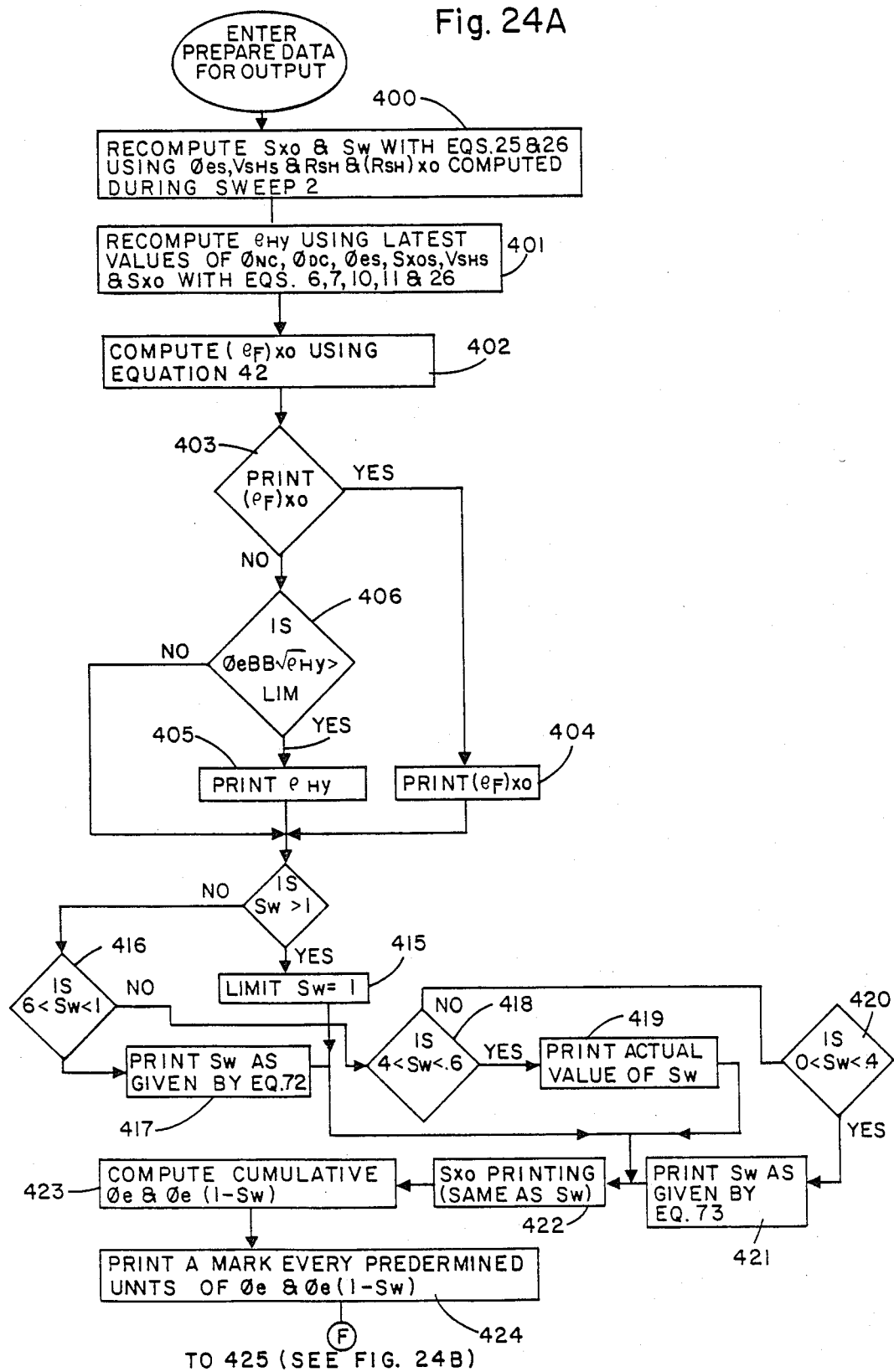
FIGS. 24A and 24B are flow diagram representations of a "prepare data for output" routine which forms a portion of sweep 3 and which will hereinafter be referred to simply as FIG. 24.
Figure 24B:
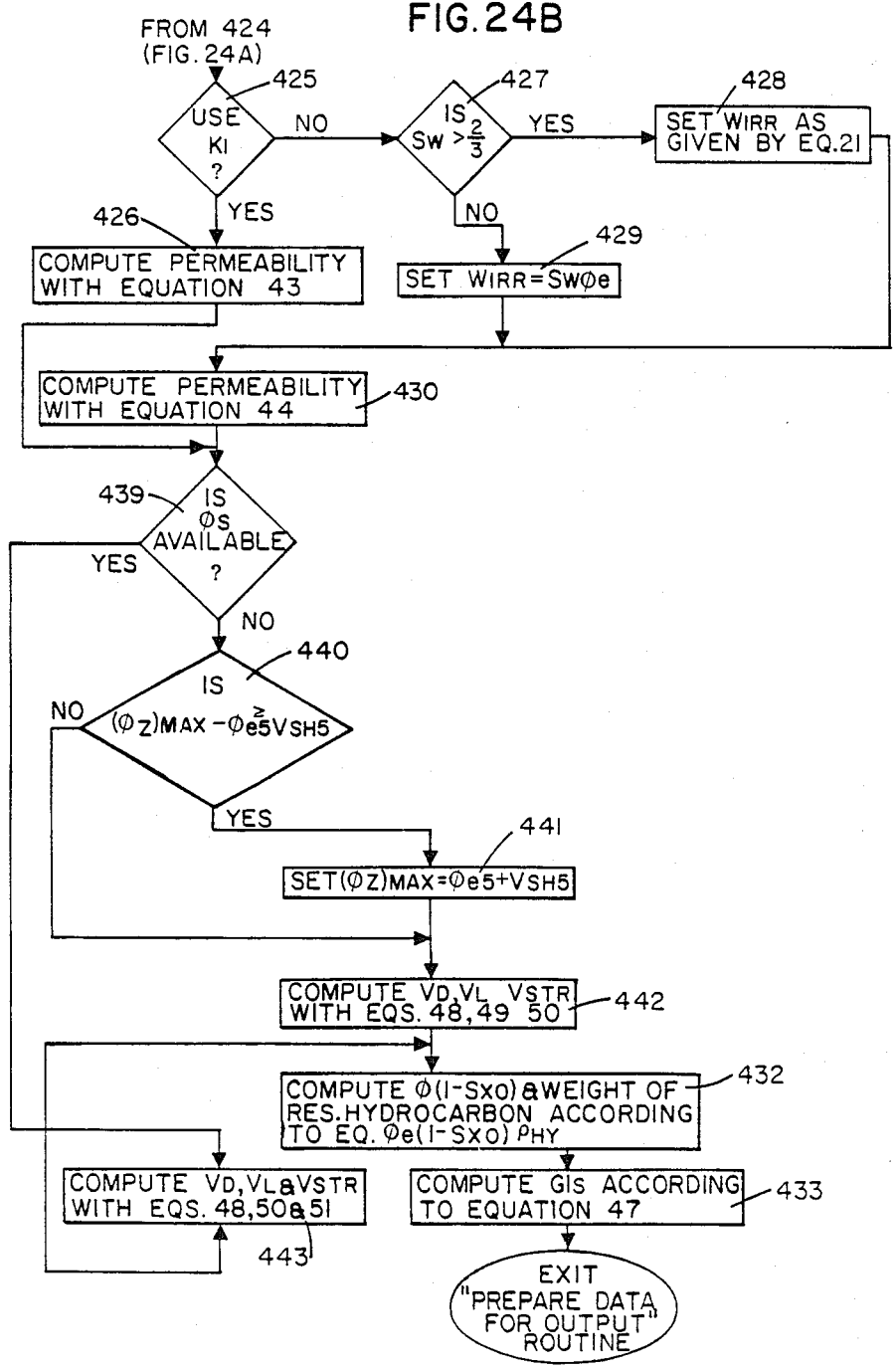

Additionally, the spontaneous potential is reconstructed from the recomputed values of $V_{Cl}$, $V_{Cl5}$ and the values of SSP and $SP_{sh}$ computed during sweep 2, as represented by block 384. The reconstructed SP is then compared with the measured SP and a figure of merit is computed in accordance with equation 68 in the same manner as during sweep 2, as represented by block 385. The data is then prepared for output, as represented by block 386. A detailed flow diagram of how this is accomplished is shown in FIG. 24 and will be discussed next. Lastly, the prepared data is printed out and/or recorded on magnetic tape or a film recorder, as represented by elements 387, 388 and 389.

Now, turning to FIG. 24, there is shown a flow diagram representing the steps performed in preparing the data for output during sweep 3. After the "prepared data for output" routine is entered, new values of $S_{xo}$ and $S_w$ are computed using the latest available data, i.e., that data computed during sweep 2. This function is represented by a block 400. Next the hydrocarbon density $\rho_{hy}$ is recomputed by simultaneously solving equations (6), (7), (10), (11) and (27) using the latest computed values of $\phi_N$, $\phi_D$, $\phi_e$ and $S_{xo}$, as represented by block 401.

When $S_w$ or $S_{xo}$ is close to 1, thus indicating that very little hydrocarbons are present, the computed value of hydrocarbon density $\rho_{hy}$ will show large fluctuations for small errors in the parameters which are used in the computation of $\rho_{hy}$. In this case it might be preferred to compute and print out optionally the fluid density in the invaded zone, $(\rho_f)_{xo}$, instead of $\rho_{hy}$. Thus, the invaded zone fluid density $(\rho_f)_{xo}$ is computed using equation (42) as represented by block 402. A decision element 403 is used to select whether $(\rho_f)_{xo}$ is to be printed out (see block 404). If $(\rho_f)_{xo}$ is not to be printed out, $\rho_{hy}$ is printed out (see block 405) but only if there is a sufficient hydrocarbon effect for the computed value of $\rho_{hy}$ to be meaningful. As represented by decision block 406, the function $\phi_e$, BB, $\rho_{hy}^2$ is computed and compared with a limit value, where $$BB = 5/7 \left[ (1 - \rho_{hy}) \frac{32 - 9\rho_{hy}}{32 - 5\rho_{hy}} (1 - S_{xo}) \right].$$

$\rho_{hy}$ is printed only if this function is greater than the limit value.

The next routine prepares the computed water saturation $S_w$ value for output. When $S_w$ is near 100%, the same type of problem discussed above for the hydrocarbon density $\rho_{hy}$ also affects the water saturation $S_w$. To circumvent this, the computed values of $S_w$ are manipulated such that large fluctuations in $S_w$ on the high end of the scale will produce small fluctuations in the recorded value of $S_w$. Moreover, an expansion 25 of $S_w$ is made for very low computed $S_w$ values to take into account the fact that at this low water saturation, the rock matrix becomes partly oil wet which leads to erroneously low computed values of $S_w$.

Figure 26:
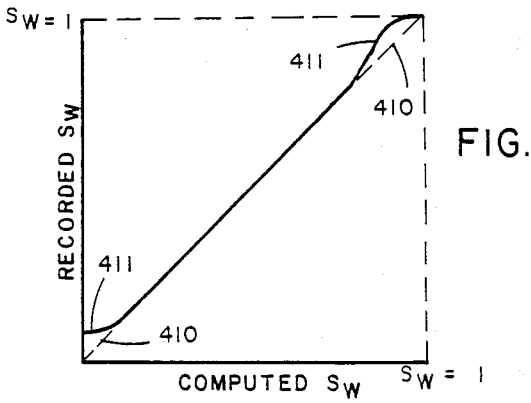
FIG. 26 is a graphical representation depicting an operation performed in the "prepare data for output" routine of FIG. 24.

Turning to FIG. 26, there is shown a plot of measured $S_w$ on the horizontal axis versus recorded $S_w$ on the vertical axis. The dotted line 410 represents the linear one for one relationship of computed $S_w$ versus recorded $S_w$. The solid line curve 411 gives the recording function applied to the computed $S_w$ values. It can be seen from FIG. 17 that for values of computed $S_w$ near 0 and 100%, there is very little fluctuation in the recorded values of $S_w$.

This function is performed in the flow diagram of FIG. 24 as follows. First, the computed $S_w$ is limited to one as represented by block 415. If $S_w$ is between 0.6 and 1.0, which question is asked by decision element 416, $S_w$ is computed in accordance with the following expression:

$$(S_w)_{record} = 1 - \frac{4}{15} \left( \frac{1 - S_w}{.4} \right)^3 \left[ 25 - \frac{(1 - S_w)^3}{.4} \right] \quad (72)$$

(See block 417). If $S_w$ is between 0.4 and 0.6, which question is asked by the decision element 418, the actual computed value of $S_w$ is printed, as represented by block 419. If $S_w$ is between zero and 0.4, which question is asked by the decision element 420, $S_w$ is computed in accordance with the following equation:

$$(S_w)_{record} = S_w + .02 \frac{4 - 10S_w}{1 + 10S_w} \quad (73)$$

$S_{xo}$ is function formed and printed in the same manner as $S_w$ is and need not be discussed further. This function is represented by block 422.

Next, cumulative values of $\phi_e$ and $\phi_e \times (1-S_w)$ are computed. This corresponds to integrating values of $\phi_e$ and $\phi_e \times (1-S_w)$. This function is represented by block 423. A blip is then printed for every predetermined unit of cumulative $\phi_e$ and $\phi_e \times 1-S_w$, as represented by block 424.

The next portion of the "prepare data for output" routine is to compute permeability using either equation (43) or (44). Which equation is to be used is determined by the decision element 425. This decision is set by the operator before running the program.

If equation (44) is to be used, it must first be determined whether $W_{irr}$ is to be set equal to $S_w\phi_e$ or a value determined from solving equations (20) and (21). This is determined by looking at the value of water saturation $S_w$, (see decision element 427). If $S_w$ is greater than two-thirds, $W_{irr}$ is set equal to the value formed from equations (20) and (21), as represented by block 428. On the other hand, if $S_w$ is less than two-thirds, $W_{irr}$ is set equal to $S_w\phi_e$, as represented by block 429.

Step 431 computes the percentages by volume of the different forms of shale with equations (48), (49) or (51) and (50). It will be recalled from the discussion of FIG. 11 that if the measured values of $\phi_N$ and $\phi_D$ give a point on the $\phi_N$-$\phi_D$ crossplot which falls to the left of the dispersed shale line, the originally selected value of $(\phi_s)_{max}$ cannot be correct and still be consistent with the model. Such an occurrence is represented by the point 33. In this event, it is assumed that the original $(\phi_s)_{max}$ is not applicable and a new $\phi_s$ is chosen such that the dispersed shale line will pass through the point 33. This new $\phi_s$ value is then entered into equation 49 for the $\phi_s$ term therein.

To accomplish this in the "prepare data for output" routine of sweep 3, step 440 determines if the measured $\phi_N$, $\phi_D$ point is to the left of the dispersed shale line defined by $(\phi_s)_{max}$ by asking "Is $(\phi_s)_{max}-\phi_{e5}>V_{sh5}$?". If it is, $(\phi_s)_{max}$ is set equal to $\phi_{e5}+V_{sh5}$ (Step 441) for entry into equation 49. $V_D$, $V_L$ and $V_{str}$ are then computed with equations (48), (49) and (50) see step 442. Of course, if sonic data is available (Step 439), equations (48), (50) and (51) are used instead (Step 443).

Then the residual hydrocarbon saturation and weight are computed in accordance with expressions (45) and (46) and printed out, a represented by block 432. Next, the gas index as given by the sonic log is computed according to equation (47), as represented by block 433.

Finally, if the level being considered is not the last level, the program returns to the beginning of sweep 3 to consider data from the next level, as represented by element 434. If it is the last level, the program stops, as represented by element 435.

Figure 25:
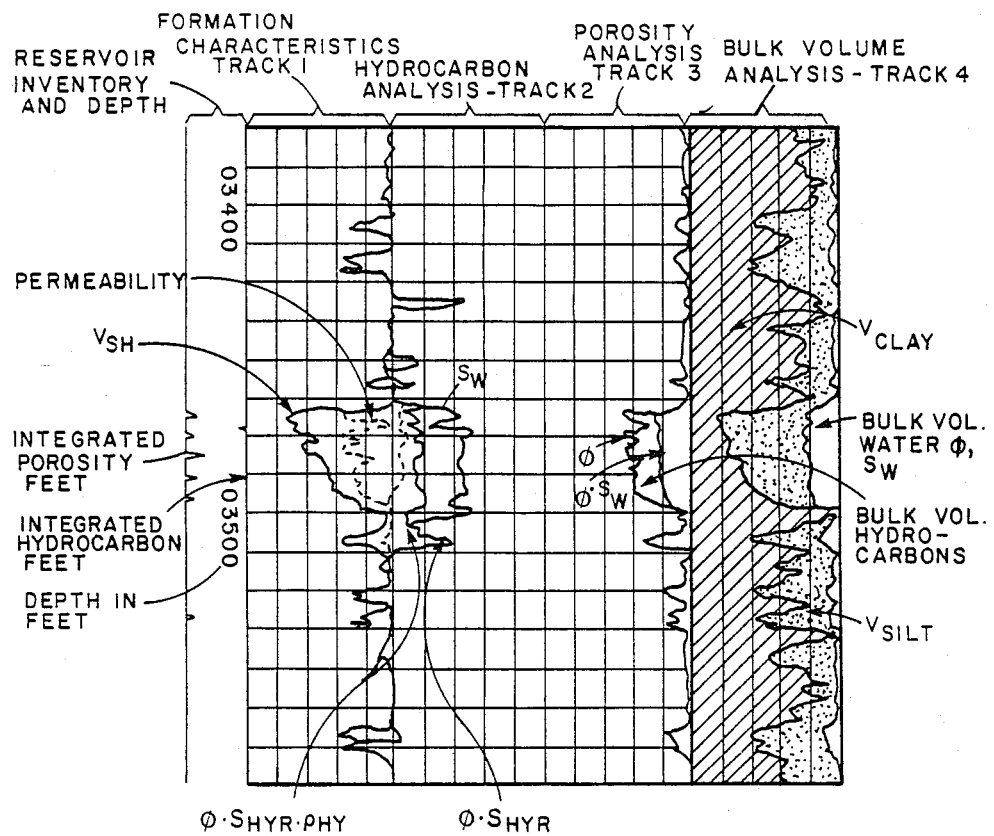
FIG. 25 is an illustrative example of a presentation of the computations made in accordance with the teachings of the present invention.

Now referring to FIG. 25, there is shown an example of a log produced in accordance with the teachings of the present invention. The pip on the left-hand side of the depth track correspond to the integration of porosity. The distance between two consecutive pips represents a selected number of feet of 100% porosity of pore volume per acre. Each pip on the right-hand side of the depth track represents a selected number of feet of hydrocarbon in place.

In track I, $V_{sh}$ and permeability K are recorded. In track II, $S_w$, $\phi \cdot S_{hyr}$ and $\phi \cdot S_{hyr} \rho_{hy}$ for hydrocarbon analysis are recorded. $S_w$ is the fraction of pore volume filled with formation water. $\phi \cdot S_{hyr}$ is the residual hydrocarbon per bulk volume and $\phi \cdot S_{hyr} \rho_{hy}$ is the weight of residual hydrocarbon per bulk volume. The two curves, $\phi \cdot S_{hyr}$ and $\phi \cdot S_{hyr} \rho_{hy}$ coincide in oil zones since the density of oil is close to unity. In light hydrocarbon zones, the two curves diverge. The ratio of $\phi \cdot S_{hyr} \rho_{hy}$ to $\phi \cdot S_{hyr}$ is the hydrocarbon density.

In track III, porosity analysis curves $\phi_e$ and $\phi_e S_w$ are recorded. $\phi_e$ is the formation porosity corrected for hydrocarbon and shale effect and $\phi_e \cdot S_w$ is the water-filled porosity. Thus, the area between the two curves corresponds to hydrocarbon filled porosity. A bulk volume analysis is recorded in track IV. In this regard, $V_{clay}$, $V_{silt}$ and $\phi_e$ are recorded.

It can be seen from the foregoing that new and improved methods have been invented for analyzing shales and shaly sand formations. With these improved methods, more data than has ever before been available can now be computed and displayed to enable a complete interpretation of shaly sand and shale formations.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A machine method for exploring subsurface earth formations to determine the presence and location of hydrocarbon deposits within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of the subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device; and (c) combining said electrical signals indicative of the bulk density and hydrogen content of the formation to produce further electrical signals representative of the volume of structural shale or the portion of silt and clay in the earth formation and making a record thereof over a plurality of depth levels from which the presence and location of hydrocarbon deposits within said subsurface earth formation can be determined.

2. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) combining said electrical signals indicative of the bulk density and hydrogen content to produce electrical signals representative of the characteristic hydrogen content and characteristic bulk density response for the type of shale presumed to be present in the formation; and (d) combining said electrical signals representative of said bulk density and hydrogen content with said electrical signals representative of the characteristic hydrogen content and density shale representations to produce electrical signals representative of the porosity or shale content of the formation and making a record thereof over a plurality of depth levels from which the presence and location of hydrocarbon deposits within said subsurface earth formation can be determined.

3. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
   (a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;
   (b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;
   (c) providing third electrical signals representative of the natural radioactivity content of the formation over a plurality of depth levels of the borehole, said third electrical signals being derived from signals responsive to the reaction of the subsurface earth formation to probing signals emitted from the investigating device into the formation surrounding the borehole; and
   (d) combining said electrical signals representative of the bulk density, hydrogen content and natural radioactivity to produce further electrical signals relating the magnitude of the electrical signals representative of the natural radioactivity content to the shale content of the formation and making a record thereof over a plurality of depth levels from which the presence and location of hydrocarbon deposits within said earth formation can be determined.

4. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
   (a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;
   (b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;
   (c) providing third electrical signals representative of formation spontaneous potential over a plurality of depth levels of the borehole, said third electrical signals being derived from signals responsive to the reaction of the subsurface earth formation to probing signals emitted from the investigating device into the formation surrounding the borehole; and
   (d) combining said electrical signals representative of the bulk density, hydrogen content and spontaneous potential to produce further electrical signals representative of the relationship between the electrical signals representative of the spontaneous potential and shale content of the formation and making a record thereof over a plurality of depth levels from which the presence and location of hydrocarbon deposits within said earth formation can be determined.

5. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
   (a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;
   (b) providing second electrical signals representative of the hydrogen content of the formation over a plurality of depth levels of the borehole, said second electrical signals being derived from signals resonsive to the reaction of the subsurface earth formation to neutrons emitted into the subsurface earth formation surrounding the borehole from a source of neutrons located in said investigating device;
   (c) providing third electrical signals primarily representative of the resistivity of the invaded portion of said subsurface earth formation over a plurality of depth levels of the borehole, said third electrical signals being derived from signals responsive to the reaction of the subsurface earth formation to probing signals emitted from the investigating device into the formation surrounding the borehole; and
   (d) combining said electrical signals repesentative of the bulk density, hydrogen content and resistivity to produce further electrical signals representative of the resistivity of the clay in the invaded portion of the earth formation and making a record thereof over a plurality of depth levels from which the presence and location of hydrocarbon deposits within said subsurface earth formation can be determined.

6. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;
(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;
(c) providing further electrical signals representative of the resistivity of the uninvaded portion of the formation over a plurality of depth levels of the borehole, said further electrical signals being derived from signals responsive to the reaction of the subsurface earth formation to probing signals emitted from the investigating device into the formation surrounding the borehole; and
(d) combining said electrical signals representative of the bulk density, hydrogen content and resistivity to produce further electrical signals representative of the resistivity of clay in the uninvaded portion of the subsurface earth formation and making a record thereof over a plurality of depth levels from which the presence and location of hydrocarbon deposits within the said subsurface earth formation can be determined.

7. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;
(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;
(c) providing third electrical signals representative of resistivity of a portion of the formation over a plurality of depth levels of the borehole, said third electrical signals being derived from signals responsive to the reaction of the subsurface earth formation to probing signals emitted from the investigating device into the earth formation surrounding the borehole; and
(d) combining said electrical signals representative of the bulk density, hydrogen content and resistivity to produce further electrical signals representative of the resistivity of a type of shale in the formation and making a record thereof over a plurality of depth levels from which the presence and location of hydrocarbon deposits within said subsurface earth formation can be determined.

8. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;
(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;
(c) providing third electrical signals representative of formation acoustic travel time or shale content over a plurality of depth levels of the borehole, said third electrical signals being derived from signals responsive to the reaction of the subsurface earth formation to probing signals emitted from the investigating device into the formation surrounding the borehole; and
(d) combining said electrical signals representative of the bulk density, hydrogen content and acoustic travel time to produce further electrical signals representative of the acoustic travel time characteristic response in a shale formation and making a record thereof over a plurality of depth levels from which the presence and location of hydrocarbon deposits in said subsurface earth formation can be determined.

9. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
(a) providing first electrical signals representative of the resistivity of the invaded portion of the formation over a plurality of depth levels of the borehole, said first electrical signals being derived from signals responsive to the reaction of the subsurface earth formation to probing signals emitted from the investigating device into the formation surrounding the borehole;

(b) providing second electrical signals representative of the resistivity of the uninvaded portion of the formation over a plurality of depth levels of the borehole, said second electrical signals being derived from signals responsive to the reaction of the subsurface earth formation to probing signals emitted from the investigating device into the formation surrounding the borehole; and (c) combining said electrical signals representative of the resistivity of the invaded portion of the subsurface earth formation and the uninvaded portion of the subsurface earth formation to produce further electrical signals representative of the shale content of the formation and making a record thereof over a plurality of depth levels from which the presence and location of hydrocarbon deposits within said subsurface earth formation can be determined.

10. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing at least third electrical signals representative of formation shale content over a plurality of depth levels of the borehole, said at least third electrical signals being derived from signals responsive to the reaction of the subsurface earth formation to probing signals emitted from the investigating device into the formation surrounding the borehole; and (d) combining said first, second and third electrical signals to produce further electrical signals representative of one or more of the porosity or shale content of the subsurface earth formation including the step of combining said first, second and third electrical signals a first time to produce calibration electrical signals relating the third electrical signals to the shale content and thereafter combining said first, second and third electrical signals a second time with said calibration electrical signals to produce the electrical signals representative of porosity or shale content and making a record thereof over a plurality of depth levels from from the presence and location of hydrocarbon deposits within said subsurface earth formation can be determined.

11. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing third electrical signals representative of a third formation parameter over a plurality of depth levels of the borehole, said electrical signals being derived from signals responsive to the reaction of the subsurface earth formation to probing signals emitted from the investigating device into the formation surrounding the borehole; and (d) combining said derived electrical signals to produce output synthetic electrical signals representative of one of the spontaneous potential, natural gamma radiation, or resistivity of a formation and making a record thereof over a plurality of depth levels from which the presence and location of hydrocarbon deposits within said subsurface earth formation can be determined.

12. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing third electrical signals representative of a third formation parameter over a plurality of depth levels of the borehole, said electrical signals being derived from signals responsive to the reaction of the subsurface earth formation to probing signals emitted from the investigating device into the formation surrounding the borehole; and (d) combining said electrical signals representative of the bulk density, hydrogen content and third formation parameter to produce further electrical signals relating the magnitude of said third formation parameter electrical signals to shale content and making a record thereof over a plurality of depth levels from which the presence and location of hydrocarbon deposits within said subsurface earth formation can be determined.

13. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) preselecting electrical signals representative of the bulk density and hydrogen content for a characteristic shale and for a characteristic clay over a plurality of depth levels of said borehole;

(d) providing at least third electrical signals representative of formation shale content over a plurality of depth levels of the borehole, said at least third electrical signals being derived from signals responsive to the reaction of the subsurface earth formation to probing signals emitted from the investigating device into the formation surrounding the borehole;

(e) combining said first and second electrical signals for each selected depth level with said preselected electrical signals to provide new electrical signals representative of characteristic shale values at each selected depth level; and (f) combining said first, second and third derived electrical signals with said preselected electrical signals for clay and one of said new or preselected electrical signals for shale to produce further electrical signals indicative of shale content or porosity and making a record thereof over a plurality of depth levels from which the presence and location of hydrocarbon deposits within said subsurface earth formation can be determined.

14. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring said analyzing signals responsive to said probing signals, comprising the steps of:

(a) providing electrical signals representative of two or more of bulk density, hydrogen content, acoustic travel time, spontaneous potential, gamma radiation, resistivity of the invaded zone, resistivity of the uninvaded zone, and caliper, at selected depth levels over a plurality of depth levels of a borehole section, said signals being derived in response to the reaction of the subsurface earth to probing signals emitted from the investigating device into the formation surrounding the borehole and producing first electrical signals related to at least one of said derived electrical signals;

(b) combining at least two of said electrical signals from selected depth levels over said borehole section to provide at least one input electrical signal for said borehole section;

(c) combining at least one of said electrical signals derived in step (a) from selected depth levels with at least one input electrical signal to provide at least one output electrical signal representative of corrected values of at least one of said first electrical signals for selected depth levels; and (d) combining at least one of said electrical signals derived in step (a) with at least one output electrical signal for selected depth levels to provide said at least one input electrical signal a second time for combination with at least one of said plurality of derived electrical signals to produce second output electrical signals representative of at least one formation characteristic and making a record thereof over a plurality of depth levels from which the presence and location of hydrocarbon deposits within said earth formation can be determined.

15. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) combining said first and second electrical signals to produce representations of an index of the relative proportion of silt and clay in the formation;

(d) providing third electrical signals representative of the resistivity of a selected radial portion of the formation over a plurality of depth levels of the borehole, said third electrical signals being derived in response to the reaction of the subsurface earth formation to probing signals emitted from the investigating device into the formation surrounding the borehole; and (e) combining said third electrical signals with said index representations to produce output electrical signals representing characteristic values of the resistivity for clay in the formation and making a record thereof over a plurality of depth levels from which the presence and location of hydrocarbon deposits within the subsurface earth formation can be determined.

16. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals primarily representative of the resistivity of the invaded portion of the formation surrounding the borehole over a plurality of depth levels of the borehole, said first electrical signals being derived from signals responsive to the reaction of the subsurface earth formation to probing signals emitted from the investigating device into the formation surrounding the borehole;

(b) providing second electrical signals primarily representative of the resistivity of the uninvaded portion of the formation surrounding the borehole over a plurality of depth levels of the borehole, said second electrical signals being derived from signals responsive to the reaction of the subsurface earth formation to probing signals emitted from the investigating device into the formation surrounding the borehole;

(c) providing third electrical signals representative of the water saturation in the uninvaded zone of the formation; and (d) combining said resistivity electrical signals and said water saturation electrical signals to produce output electrical signals representative of the shale content of the formation and making a record thereof over a plurality of depth levels from which the presence and location of hydrocarbon deposits in the formation can be determined.

17. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing electrical signals representative of the natural gamma radiation of the formation for a plurality of depth levels of the borehole;

(d) combining said bulk density electrical signals and said hydrogen content electrical signals to produce electrical signals representative of an index of the relative proportion of silt and clay in the formation and the volume of shale in the formation;

(e) comparing, at each depth level, said electrical signals representative of the natural gamma radiation with a predetermined limit value thereof and defining a first category of depth levels wherein said gamma radiation limit value is exceeded and a second category wherein said gamma radiation limit is not exceeded;

(f) comparing at each depth level, for said first category of depth levels, electrical signals reprsentative of the volume of shale with a predetermined limit value and defining a third category of depth levels wherein the volume of shale exceeds its limit value;

(g) comparing said electrical signals representative of said index with a predetermined value thereof for said third category of depth levels and further defining a fourth category of depth levels wherein said index representation exceeds its limit value thereof and a fifth category of depth levels wherein said index representation is less than said limit value thereof;

(h) producing electrical signals representative of running averages of the natural gamma radiation, volume of silt and volume of clay for said fourth and fifth depth level categories separately;

(i) comparing at each depth level for said second category of depth levels the electrical signals representative of the volume of shale with a predetermined limit value thereof;

(j) producing electrical signals representative of running average of the natural gamme radiation, volume of silt and volume of clay for those depth levels in said second category of depth levels wherein the volume of shale is less than said predetermined limit value; and (k) producing, from the electrical signals representative of said running averages, individual electrical signals which relate the natural gamma radiation electrical signals to the relative proportions of silt and clay and the natural gamma radiation of the sand over the borehole section and making a record thereof over a plurality of depth levels from which the presence and locations of hydrocarbons within the subsurface earth formation can be determined.

18. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of at least bulk density, hydrogen content, natural gamma radiation, spontaneous potential and formation resistivity over a plurality of depth levels of the borehole, said first electrical signals being derived from signals responsive to the reaction of the reaction of the subsurface earth formation to probing signals emitted from an investigating device into said subsurface earth formation surrounding the borehole;

(b) combining at a plurality of selected depth levels at least some of said electrical signals to produce further electrical signals representative of formation porosity, volume of shale, volume of clay and water saturation of the invaded zone of the formation for a plurality of selected depth levels;

(c) comparing at a plurality of selected depth levels, electrical signals representative of spontaneous potential with a predetermined limit value thereof and electrical signals representative of volume of shale with a predetermined limit value thereof;

(d) separating said depth levels into a first category wherein the spontaneous potential exceeds the predetermined limit value thereof and the volume of shale is less than the predetermined limit value thereof and a second category wherein the spontaneous potential is less than the predetermined limit value thereof or the volume of shale is greater than the predetermined limit value thereof;

(e) comparing, for said second category of depth levels, the electrical signals representative of the spontaneous potential, natural gamma radiation, formation resistivity and volume of shale respectively with predetermined limit values thereof;

(f) separating from said second category of depth levels a third category of depth levels wherein the electrical signals representative of the spontaneous potential and formation resistivity are less than the predetermined limit values thereof and the electrical signals representative of the natural gamma radiation and volume of shale exceed the predetermined limit values thereof;

(g) producing, over the borehole section, electrical signals representative of the averages of the spontaneous potential and the ratio of the volume of clay to the amount of water in the invaded zone for each of said first and third categories of depth levels; and (h) combining said electrical signals representative of the produced averages to produce still further electrical signals representative of the relationship between the magnitude of the spontaneous potential and shale content and making a record thereof over a plurality of depth levels from which the presence and location of hydrocarbon deposits within the subsurface earth formation can be determined.

19. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing electrical signals representative of the resistivity of selected radial sections of the formation over a plurality of depth levels of the borehole, said electrical signals being derived from signals responsive to the reaction of the subsurface earth formation to probing signals emitted from an investigating device into the earth formation surrounding the borehole;

(d) combining, for each depth level, said electrical signals to produce further electrical signals representative of the porosity, volume of shale and resistivity of shale of the formation;

(e) combining said further electrical signals to produce still further electrical signals representative of the water saturation of a selected radial section of the formation;

(f) comparing said electrical signals representative of the water saturation with a predetermined range of limit values thereof; and (g) adjusting said electrical signals representative of the water saturation when the magnitude of said water saturation electrical signals are within said predetermined range of limit values and making a record thereof over a plurality of depth levels from which the presence and location of hydrocarbon deposits within the subsurface earth formation can be determined.

20. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing third electrical signals representative of formation resistivity of a region near the norehole over a plurality of depth levels of the borehole, said third electrical signals being derived from signals responsive to the reaction of the subsurface earth formation to probing signals emitted from the investigating device into the formation surrounding the borehole; and (d) combining said electrical signals to produce representations of the shale content of the formation and making a record thereof over a plurality of depth levels from which the presence and location of hydrocarbon deposits within the subsurface earth formation can be determined.

21. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing third electrical signals representative of at least one parameter indicative of the shale content of the formation over a plurality of depth levels of the borehole; and (d) combining said first, second and third electrical signals to produce further electrical signals representative of one or more of the porosity and shale content of the formation including the steps of combining said first, second and third electrical signals a first time to produce calibration electrical signals relating the third electrical signals to shale content, thereafter combining said first, second and third electrical signals with said calibration electrical signals to produce new calibration electrical signals and thereafter combining said first, second and third electrical signals with said new calibration electrical signals to produce said porosity or shale content electrical signal representations and making a record thereof over a plurality of depth levels from which the presence and location of hysrocarbon deposits within the subsurface earth formation can be determined.

22. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device; and (c) combining said bulk density and hydrogen content electrical signals to produce further electrical signals representative of the maximum porosity of the formation over a plurality of depth levels of the borehole and the porosity and amount of shale at a plurality of depth levels of the borehole and combining said electrical signals representative of the maximum porosity and the porosity and amount of shale at selected depth levels to produce individual electrical signals representative of the volume of dispersed, laminated and structural shale in the formation and making a record thereof over a plurality of depth levels from which the presence and location of hydrocarbon deposits within the subsurface earth formation can be determined.

23. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) providing third electrical signals representative of formation acoustic travel time or shale content over a plurality of depth levels of the borehole, said third electrical signals being derived from signals responsive to the reaction of the subsurface earth formation to probing signals emitted from the investigating device into the formation surrounding the borehole; and (d) combining said electrical signals to produce output electrical signals indicative of the amount of dispersed structural and laminated shale and making a record thereof over a plurality of depth levels of the formation.

24. A machine method for determining the presence and location of hydrocarbon deposits within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:

(a) providing first electrical signals representative of the bulk density of the formation over a plurality of depth levels of the borehole, said first electrical signals being derived from signals responsive to the reaction of said subsurface earth formation to gamma rays emitted into said subsurface earth formation surrounding the borehole from a source of gamma rays located in said investigating device;

(b) providing second electrical signals representative of the hydrogen content of the formation over a plurality of depth levels of the borehole, said second electrical signals being derived from signals responsive to the reaction of the subsurface earth formation to neutrons emitted into the subsurface earth formation surrounding the borehole from a source of neutrons located in said investigating device;

(c) combining at least one of said electrical signals derived in step (a) from selected depth levels with at least one input electrical signal to provide at least one first output electrical signal representative of corrected values of at least one of said first electrical signals for a plurality of depth levels; and (d) combining at least one of said electrical signals derived in step (a) with at least one first output electrical signal for selected depth levels to produce another input electrical signal for combination with at least one of said plurality of electrical signals to produce a second output electrical signal representative of at least one formation characteristic and making a record thereof over a plurality of depth levels from which the presence and location of hydrocarbon deposits within the subsurface earth formation can be determined.

25. The method of claim 1 wherein said electrical signals are combined in a manner to produce individual electrical signals representative of the volume of dispersed, laminated and structural shale in the subsurface earth formation.

26. The method of claim 6 and further including combining said electrical signals indicative of the hydrogen content, bulk density, uninvaded zone resistivity and clay resistivity measurements to produce further electrical signals representative of the resistivity of the shale in the uninvaded zone.

27. The method of claim 11 wherein said electrical signals are combined to produce electrical signals representative of an index of the relative proportion of silt and clay in the formation.

28. The method of claim 27 and further including the step of combining said derived electrical signals with said index representations to produce electrical signals representative of the volume of one or more of total shale, silt, or clay.

29. The method of claim 27 and further including providing electrical signals representative of a third formation parameter over a plurality of depth levels of the borehole, and combining said third parameter electrical signals with said index representations to produce output electrical signals relating said third parameter electrical signals to a particular formation characteristic.

30. The method of claim 29 wherein said third parameter electrical signals are of the natural gamma radiation, and said third parameter electrical signals and said index representations are combined to produce further electrical signals relating said third parameter electrical signals to the amount of shale in the formation.

31. The method of claim 29 wherein said third parameter electrical signals are of the acoustic travel time in the formation, and said third parameter electrical signals are combined with said index representations to produce output electrical signals representative of the characteristic values of said third parameter for shale or clay formations.

32. The method of claim 28 and further including the step of providing electrical signals representative of a third formation parameter over a plurality of depth levels of the borehole, and combining said third parameter electrical signals with said index representations to produce output electrical signals relating said third parameter electrical signals to a particular formation characteristic, and combining said output electrical signals and said electrical signals representative of one or more of the volume of total shale, silt or clay to produce synthetic output electrical signals representative of said third parameter.

33. The method of claim 32 and further including the step of comparing said third parameter electrical signals with said synthetic output electrical signals to establish a figure of merit for said synthetic output electrical signals relative to said third parameter electrical signals.

34. The method of claim 32 wherein said third electrical signals are representative of the spontaneous potential of the subsurface earth formation.

35. The method of claim 28 and further including the steps of providing electrical signals representative of a third formation parameter which are functionally related to the amount of shale in the formation over a plurality of depth levels of the borehole, and combining said derived electrical signals and the electrical signals representative of said index and one or more of total shale, silt or clay to produce further electrical signals which relate said electrical signals representative of said third formation parameter to shale amount.

36. The method of claim 30 wherein the step of combining electrical signals to produce further electrical signals includes the steps of providing electrical signals representative of the averages, over the borehole section, of the natural gamma radiation, volume of silt and volume of clay for each formation having respectively a relatively high content of sand, silt or clay, and providing, from said averages individual electrical signals which relate the electrical signals representative of the natural gamma radiation to the relative proportions of silt and clay and the natural gamma radiation of the sand over said borehole section.

37. The method of claim 2 wherein said step of combining electrical signals to produce said characteristic response representations includes combining said bulk density and hydrogen content electrical signals in a non-linear manner to produce said characteristic response representations.

38. The method of claim 3 wherein the step of combining electrical signals to produce further electrical signals includes the steps of providing electrical signals representative of the averages over the borehole section of the natural radioactivity in formations which individually have a relatively high content of sand, silt and clay, and providing from said averages, individual electrical signals which relate the electrical signals representative of the natural radio activity to the relative proportions of silt and clay and the natural gamma radiation of the sand over said borehole section.

39. The method of claim 4 wherein the step of combining electrical signals to produce further electrical signals includes the steps of combining said electrical signals representative of the bulk density and hydrogen content to produce output electrical signals representative of the porosity and volume of clay in the formation over the borehole section, combining said output electrical signals representative of porosity and volume of clay to produce output electrical signals representative of the amount of water in the invaded zone for relatively clean sand and shale formations, and combining said electrical signal averages to produce said further electrical signals.

40. The method of claim 4 and further including the step of providing electrical signals representative of the resistivity of a portion of the formation near the borehole over a plurality of depth levels of the borehole, wherein the step of combining electrical signals to produce further electrical signals includes the steps of combining said electrical signals representative of the bulk density and hydrogen content of the formation to produce output electrical signals representative of the porosity, and volume of clay in the formation over the borehole section, combining said output electrical signals representative of the porosity and volume of clay with said electrical signals representative of the resistivity to produce further output electrical signals representative of the amount of water in the invaded zone of the formation, and using some of said further output electrical signals to provide, over the borehole section, averages of the spontaneous potential and the ratio of the volume of clay to the amount of water in the invaded zone for relatively clean sand and shale formations, and combining said averages to produce said first mentioned further electrical signals.

41. The method of claim 29 wherein said third parameter electrical signals are representative of formation resistivity and the step of combining said electrical signals and representations to produce output electrical signals relating said third parameter electrical signals to a particular formation characteristic includes the steps of combining for selected depth levels, said third parameter electrical signals with said index representations to produce an output electrical signal for each selected depth level representative of the resistivity of clay at such selected depth level, and combining said clay resistivity representations for each selected depth level to provide further electrical signals representative of the average value of the clay resistivity over the borehole section.

42. The method of claim 29 wherein said third parameter electrical signals are representative of formation resistivity and the step of combining said electrical signals and representations to produce output electrical signals relating said third parameter electrical signals to a particular formation characteristic includes the steps of selecting electrical signals derived from depth levels where the formation has a relatively high shale content, combining, for said selected depth levels, said third parameter electrical signals with said index representations to produce an output electrical signal for each selected depth level representative of the resistivity of clay at such selected depth levels, and combining said clay resistivity representations for each selected depth level to provide further electrical signals representative of the average value of the clay resistivity over the borehole section.

43. The method of claim 42 wherein the step of selecting electrical signals derived from depth levels having a relatively high shale content includes the steps of providing electrical signals representative of the volume of shale in the formation and comparing, depth level by depth level, one or both of said electrical signals representative of shale volume and formation resistivity with individual predetermined limit values and enabling the combination of said third parameter electrical signals and index representations for only those depth levels where said compared electrical signals representative of shale volume exceeds its limit value and said compared electrical signals representative of resistivity is less than its limit value.

44. The method of claim 43 and further including providing electrical signals representative of the natural gamma radiation of the formation over a plurality of depth levels of the borehole, and wherein the step of selecting electrical signals derived from depth levels having a relatively high shale content includes the steps of comparing depth level by depth level the gamma radiation electrical signals with a limit value and enabling the combination of said third parameter electrical signals said index representations for only those depth levels where said gamma radiation electrical signals exceed said limit value.

45. The method of claim 40 and further including the steps of providing electrical signals representative of the acoustic travel time of the formation over a plurality of depth levels of the borehole, and combining for selected depth levels said acoustic travel time electrical signals and index representations to produce an output electrical signal representative of the acoustic travel time derived porosity for a characteristic shale in the formation.

46. The method of claim 15 wherein said third electrical signal is the resistivity of the formation at a distance from the borehole and the representations of the resistivity of clay is the resistivity of clay at a distance from the borehole.

47. The method of claim 15 wherein said third electrical signals are representative of the resistivity of the formation near the borehole and the representations of the resistivity of clay is the resistivity of clay near the borehole.

48. The method of claim 29 wherein said third parameter electrical signals are representative of the spontaneous potential and said third parameter electrical signals and said index representations are combined to produce said further electrical signals relating said third parameter electrical signals to the amount of shale in the formation.

49. The method of claim 29 wherein said third parameter electrical signals are representative of the resistivity of a selected radial portion of the formation over a plurality of depth levels of the borehole, and said third parameter electrical signals are combined with said index representation to produce output electrical signals representative of the characteristic values of resistivity for shale or clay formations.

50. The method of claim 32 wherein said third parameter is the natural gamma radiation of the formation.

51. The method of claim 32 wherein said third parameter is the resistivity of the formation.

52. The method of claim 16 further comprising the steps of providing electrical signals representative of the bulk density of the formation over a plurality of depth levels of the borehole, both said bulk density and hydrogen content electrical signals being derived in response to the reaction of the subsurface earth formation to probing signals emitted from the investigating device into the formation surrounding the borehole wherein the step of providing electrical signals representative of the water saturation in the uninvaded zone comprises the steps of combining said hydrogen content and bulk density electrical signals to produce intermediate electrical signals representative of the porosity and volume of shale in the formation and combining said intermediate electrical signals with electrical signals representative of the resistivity of the uninvaded zone of the formation to derive electrical signals representative of the water saturation in the uninvaded zone of the formation.

53. The method of claim 52 further comprising the steps of providing electrical signals representative of the water saturation in the invaded zone of the formation and comparing, depth level by depth level, the electrical signals representative of the water saturation in the invaded and uninvaded zones of the formation and producing said output electrical signals representative of the shale content of the formation only for those depth levels where the electrical signals representative of water saturation in the invaded zone is less than the electrical signals representative of the water saturation in the uninvaded zone.

54. The method of claim 19 wherein said selected radial section of the formation is at a distance from the borehole whereby said electrical signals representative of resistivity and said electrical signals representative of water saturation are primarily for the uninvaded zone of the formation.

55. The method of claim 19 wherein said selected radial section of the formation is near the borehole whereby said electrical signals representative of resistivity and said electrical signals representative of water saturation are primarily for the invaded zone of the formation.

56. The method of claim 21 wherein the step of combining said first, second and third electrical signals with said calibration electrical signals to produce new calibration electrical signals includes the step of correcting said bulk density and hydrogen content dependent porosity electrical signals in accordance with said third electrical signals.

57. The method of claim 56 further including the step of comparing the corrected value of said first electrical signals with the corrected value of said second electrical signals and correcting said bulk density and hydrogen content dependent porosity electrical signals until they are approximately equal.

58. The method of claim 54 wherein the step of combining said derived electrical signals with at least one input electrical signal to provide at least one first output electrical signals includes the step of providing at least one intermediate electrical signal relating at least one of said derived electrical signals to the shale content of the formation.

59. The method of claim 23 wherein the step of combining said electrical signals to produce said output electrical signals comprises the steps of combining said bulk density and hydrogen content electrical signals to produce electrical signals representative of an index of the relative proportion of silt and clay, producing at selected depth levels electrical signals representative of the averages of said acoustic travel time electrical signals and said index representations and producing from said averages, electrical signals representative of the acoustic travel time for primarily shaly formations to produce output electrical signals representative of the amount of dispersed, structural and laminated shale in the formation whereby the presence and location of hydrocarbon deposits within a subsurface earth formation can be determined.

60. The method of claim 16 further comprising the steps of providing electrical signals representative of the bulk density and hydrogen content of the formation over the borehole section, wherein the step of providing electrical signals representative of the water saturation in the uninvaded zone comprises the steps of combining said hydrogen content, bulk density and uninvaded zone resistivity electrical signals to produce intermediate electrical signals representative of the porosity and volume of shale in the formation and combining said intermediate electrical signals with said electrical signals representative of the resistivity of the uninvaded zone of the formation to derive electrical signals representative of the water saturation in the uninvaded zone of the formation.

61. The method of claim 5 and further including combining said electrical signals indicative of the hydrogen content, bulk density, invaded zone resistivity and clay resistivity to produce further electrical signals representative of the resistivity of the shale in the invaded zone.

* * * * *